(12) United States Patent
Ristau et al.

(10) Patent No.: US 10,156,149 B2
(45) Date of Patent: Dec. 18, 2018

(54) TURBINE NOZZLE HAVING FILLET, PINBANK, THROAT REGION AND PROFILE

(71) Applicant: General Electric Company, Schenectady, NY (US)

(72) Inventors: Neil Ristau, Simpsonville, SC (US); Russell Pierson DeForest, Simpsonville, SC (US); William Ladd Rutherford, Greenville, SC (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 15/019,476

(22) Filed: Feb. 9, 2016

(65) Prior Publication Data

US 2017/0226879 A1    Aug. 10, 2017

(51) Int. Cl.
    *F01D 9/04*    (2006.01)
    *F01D 25/12*   (2006.01)

(52) U.S. Cl.
    CPC ............ *F01D 9/041* (2013.01); *F01D 25/12* (2013.01); *F05D 2240/122* (2013.01); *F05D 2250/74* (2013.01); *F05D 2260/221* (2013.01)

(58) Field of Classification Search
    CPC .... F01D 9/041; F01D 25/12; F05D 2240/122; F05D 2250/74; F05D 2260/221
    See application file for complete search history.

(56) References Cited

U.S. PATENT DOCUMENTS

| | | | |
|---|---|---|---|
| 2,675,208 | A | 4/1954 | Weinberg |
| 3,628,880 | A * | 12/1971 | Smuland ................ F01D 5/189 |
| | | | 415/175 |
| 4,194,869 | A | 3/1980 | Corcokios |
| 4,257,741 | A | 3/1981 | Betts et al. |
| 4,798,519 | A | 1/1989 | Zipps et al. |
| 4,804,311 | A | 2/1989 | Anderson et al. |
| 4,919,593 | A | 4/1990 | Brown |
| 5,137,426 | A | 8/1992 | Rhoda |
| 5,167,489 | A | 12/1992 | Wadia et al. |
| 5,257,908 | A | 11/1993 | Ortolano |
| 5,397,215 | A | 3/1995 | Spear et al. |
| 5,466,123 | A | 11/1995 | Rose |
| 5,482,435 | A | 1/1996 | Dorris et al. |
| 6,017,186 | A | 1/2000 | Hoeger et al. |

(Continued)

OTHER PUBLICATIONS

U.S. Appl. No. 15/019,516, Office Action 1 dated Nov. 21, 2017, 15 pages.

(Continued)

*Primary Examiner* — Eldon T Brockman
(74) *Attorney, Agent, or Firm* — Ernest G. Cusick; Hoffman Warnick LLC

(57) ABSTRACT

Various embodiments of the invention include turbine nozzles and systems employing such nozzles. Various particular embodiments include a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the airfoil having a fillet at the trailing edge proximate the at least one endwall.

13 Claims, 8 Drawing Sheets

(56) References Cited

U.S. PATENT DOCUMENTS

| | | | |
|---|---|---|---|
| 6,079,948 A * | 6/2000 | Sasaki | F01D 5/141 415/191 |
| 6,503,054 B1 | 1/2003 | Bielek et al. | |
| 6,685,434 B1 | 2/2004 | Humanchuk et al. | |
| 6,736,599 B1 | 5/2004 | Jacks et al. | |
| 6,739,838 B1 | 5/2004 | Bielek et al. | |
| 6,779,980 B1 | 8/2004 | Brittingham et al. | |
| 6,808,368 B1 | 10/2004 | Tomberg et al. | |
| 6,832,897 B2 | 12/2004 | Urban | |
| 6,857,853 B1 | 2/2005 | Tomberg et al. | |
| 6,969,232 B2 | 11/2005 | Zess et al. | |
| 7,063,509 B2 | 6/2006 | Snook et al. | |
| 7,134,842 B2 | 11/2006 | Tam et al. | |
| 7,220,100 B2 | 5/2007 | Lee et al. | |
| 7,249,933 B2 | 7/2007 | Lee et al. | |
| 7,371,046 B2 | 5/2008 | Lee et al. | |
| 7,396,205 B2 | 7/2008 | Dube et al. | |
| 7,527,473 B2 | 5/2009 | Humanchuk et al. | |
| 7,690,890 B2 | 4/2010 | Aotsuka et al. | |
| 7,731,483 B2 | 6/2010 | DeLong et al. | |
| 7,758,311 B2 | 7/2010 | Loehle et al. | |
| 8,070,428 B2 | 12/2011 | Bielek et al. | |
| 8,105,037 B2 | 1/2012 | Grover et al. | |
| 8,182,228 B2 | 5/2012 | Riley et al. | |
| 8,206,115 B2 * | 6/2012 | Gupta | F01D 5/143 415/211.2 |
| 8,313,291 B2 | 11/2012 | Mariolli et al. | |
| 8,439,643 B2 | 5/2013 | Kuhne et al. | |
| 8,469,659 B2 | 6/2013 | Sakamoto et al. | |
| 8,714,930 B2 | 5/2014 | Herzlinger et al. | |
| 8,720,207 B2 | 5/2014 | Gersbach et al. | |
| 8,807,950 B2 | 8/2014 | Bielek et al. | |
| 8,814,511 B2 | 8/2014 | Check et al. | |
| 8,834,129 B2 | 9/2014 | Barnes et al. | |
| 9,085,985 B2 * | 7/2015 | Barr | F01D 5/143 |
| 9,140,128 B2 | 9/2015 | Aggarwala et al. | |
| 9,322,282 B2 | 4/2016 | Chouhan et al. | |
| 9,376,927 B2 | 6/2016 | Stein et al. | |
| 9,551,226 B2 | 1/2017 | Smith et al. | |
| 9,638,041 B2 | 5/2017 | Brozyna et al. | |
| 2005/0106025 A1 | 5/2005 | Snook et al. | |
| 2005/0169761 A1 | 8/2005 | Dube et al. | |
| 2006/0233641 A1 | 10/2006 | Lee et al. | |
| 2010/0080708 A1 * | 4/2010 | Gupta | F01D 5/143 416/223 A |
| 2010/0143139 A1 | 6/2010 | Pandey et al. | |
| 2010/0196154 A1 | 8/2010 | Sakamoto et al. | |
| 2010/0254797 A1 | 10/2010 | Grover et al. | |
| 2010/0278644 A1 | 11/2010 | Gersbach et al. | |
| 2011/0044818 A1 | 2/2011 | Kuhne et al. | |
| 2012/0201688 A1 | 8/2012 | Mahle et al. | |
| 2013/0164137 A1 | 6/2013 | Barnes et al. | |
| 2014/0090380 A1 | 4/2014 | Aggarwala et al. | |
| 2014/0119923 A1 | 5/2014 | Chouhan | |
| 2014/0154079 A1 | 6/2014 | Chouhan et al. | |
| 2015/0110618 A1 | 4/2015 | Stein | |
| 2015/0211373 A1 | 7/2015 | Subbareddyar et al. | |
| 2017/0089203 A1 | 3/2017 | Lohaus | |
| 2017/0183972 A1 | 6/2017 | McDufford | |
| 2017/0183973 A1 | 6/2017 | McDufford et al. | |
| 2017/0183974 A1 | 6/2017 | McDufford | |

OTHER PUBLICATIONS

U.S. Appl. No. 15/019,426, Office Action 1 dated Dec. 29, 2017, 11 pages.
U.S. Appl. No. 15/019,442, Office Action 1 dated Dec. 29, 2017, 12 pages.
U.S. Appl. No. 15/019,461, Office Action 1 dated Jan. 5, 2018, 14 pages.
U.S. Appl. No. 15/019,487, Office Action 1 dated Jan. 5, 2018, 13 pages.
U.S. Appl. No. 15/019,502, Office Action 1 dated Jan. 5, 2018, 13 pages.
U.S. Appl. No. 15/019,379, Office Action, dated Mar. 19, 2018, 21 pages.
U.S. Appl. No. 15/019,516, Notice of Allowance dated Apr. 6, 2018, 14 pages.
U.S. Appl. No. 15/019,426, Office Action dated Jun. 12, 2018, 19 pages.
U.S. Appl. No. 15/019,487, Final Office Action dated Jun. 14, 2018, 17 pages.
U.S. Appl. No. 15/019,442, Final Office Action dated Jun. 29, 2018, 16 pages.
U.S. Appl. No. 15/019,461, Final Office Action dated Jun. 29, 2018, 16 pages.
U.S. Appl. No. 15/019,502, Final Office Action dated Jun. 29, 2018, 16 pages.
U.S. Appl. No. 15/019,426, Notice of Allowance dated Sep. 12, 2018, 11 pages.
U.S. Appl. No. 15/019,461, Notice of Allowance dated Sep. 17, 2018, 11 pages.
U.S. Appl. No. 15/019,487, Notice of Allowance dated Sep. 18, 2018, 13 pages.
U.S. Appl. No. 15/019,442, Notice of Allowance dated Sep. 24, 2018, 6 pages.
U.S. Appl. No. 15/019,379, Notice of Allowance dated Sep. 25, 2018, 9 pages.
U.S. Appl. No. 15/019,502, Notice of Allowance dated Oct. 24, 2018, 11 pages.

* cited by examiner

US 10,156,149 B2

TURBINE NOZZLE HAVING FILLET, PINBANK, THROAT REGION AND PROFILE

FIELD OF THE INVENTION

The subject matter disclosed herein relates to turbomachines. More particularly, the subject matter disclosed herein relates to components within turbomachines such as gas and/or steam turbines.

BACKGROUND OF THE INVENTION

Some aircraft and/or power plant systems, for example certain jet aircraft, nuclear, simple cycle and combined cycle power plant systems, employ turbines (also referred to as turbomachines) in their design and operation. Some of these turbines employ airfoils (e.g., turbine blades, blades, airfoils, etc.) which during operation are exposed to fluid flows. These airfoils are configured to aerodynamically interact with the fluid flows and generate energy (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils have an impact on system and turbine operation, performance, thrust, efficiency, and power.

BRIEF DESCRIPTION OF THE INVENTION

Various embodiments of the invention include turbine nozzles and systems employing such nozzles. Various particular embodiments include a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the airfoil having a fillet at the trailing edge proximate the at least one endwall.

A first aspect of the invention includes a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the airfoil having a fillet at the trailing edge proximate the at least one endwall.

A second aspect of the invention includes a static nozzle section having: a set of static nozzles, the set of static nozzles including at least one nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the airfoil having a fillet at the trailing edge proximate the at least one endwall, wherein at least one of the suction side or the pressure side of the airfoil includes a nominal profile substantially in accordance with Cartesian coordinate values of X, Y and Z set forth in TABLE I, wherein the coordinate values are non-dimensional values convertible to distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

A third aspect of the invention includes a turbine nozzle comprising: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, wherein at least one of the pressure side or the suction side of the airfoil includes a nominal profile substantially in accordance with Cartesian coordinate values of X, Y and Z set forth in TABLE I, wherein the coordinate values are non-dimensional values convertible to distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
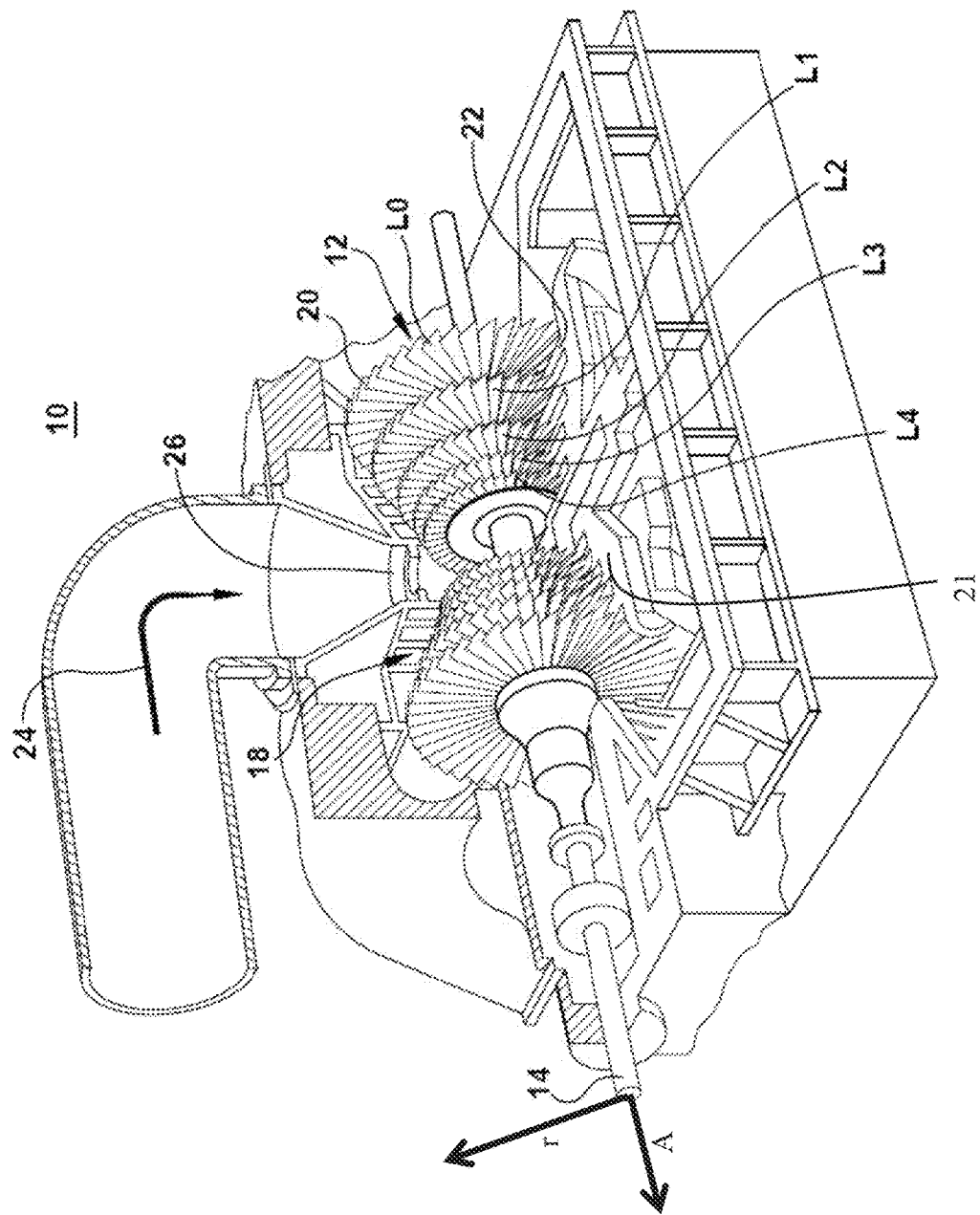
FIG. 1 shows a three-dimensional partial cut-away perspective view of a portion of a turbine according to an embodiment of the disclosure.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

As noted herein, various aspects of the invention are directed toward turbine nozzles. Particular aspects of the invention include turbine nozzles having an enhanced fillet, a throat distribution contour, and a pinbank.

In contrast to conventional turbine nozzles, aspects of the invention include a turbine nozzle (e.g., a static nozzle for directing a working fluid such as gas or steam) having a fillet (e.g., enhanced fillet) at the trailing edge of the nozzle proximate the endwall. This fillet can increase the axial chord (relative to conventional nozzles) from approximately fifteen percent from the endwall, and can help to reduce nozzle cracking at high temperatures and stresses when compared with conventional nozzles. In various embodiments, the turbine nozzle may also have a throat distribution which lowers downstream blade tip temperatures, relative to conventional nozzles. Additionally, the turbine nozzle may also include one or more pin banks for transferring heat from the nozzle, e.g., proximate the trailing edge.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location. Further, the terms leading edge/pressure side refer to components and/or surfaces which are oriented upstream relative to the fluid flow of the system, and the terms trailing edge/suction side refer to components and/or surfaces which are oriented downstream relative to the fluid flow of the system.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Referring to the drawings, FIG. 1 shows a perspective partial cut-away illustration of a turbine 10 (e.g., a gas or steam turbine and/or an aviation jet engine) according to various embodiments of the invention. Turbine 10 includes a rotor 12 that includes a rotating shaft 14 and a plurality of axially spaced rotor wheels 18. A plurality of rotating buckets 20 are mechanically coupled to each rotor wheel 18. More specifically, buckets 20 are arranged in rows that extend circumferentially around each rotor wheel 18. A static nozzle section 21 is shown including a plurality of stationary nozzles 22 that circumferentially around shaft 14, and the nozzles 22 are axially positioned between adjacent rows of buckets 20. Stationary nozzles 22 cooperate with buckets 20 to form a stage of the turbine 10, and to define a portion of a flow path through turbine 10. As shown, the static nozzle section 21 at least partially surrounds the rotor 12 (shown in this cut-away view). It is understood that the turbine 10 shown is a dual-flow turbine 10 that includes an axially centered inlet mouth which feeds two sets of turbine stages. It is understood that various teachings can be applied to axial turbines, e.g., axial inlet gas turbines that inlet a combustion gas from a first axial end and outlet that combustion gas to a second axial end after the gas has performed mechanical work on the turbine.

Returning to FIG. 1, in operation, gas 24 enters an inlet 26 of turbine 10 and is channeled through stationary nozzles 22. Nozzles 22 direct gas 24 against blades 20. Gas 24 passes through the remaining stages imparting a force on buckets 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine. In another embodiment, turbine 10 may comprise an aircraft engine used to produce thrust.

Figure 2:
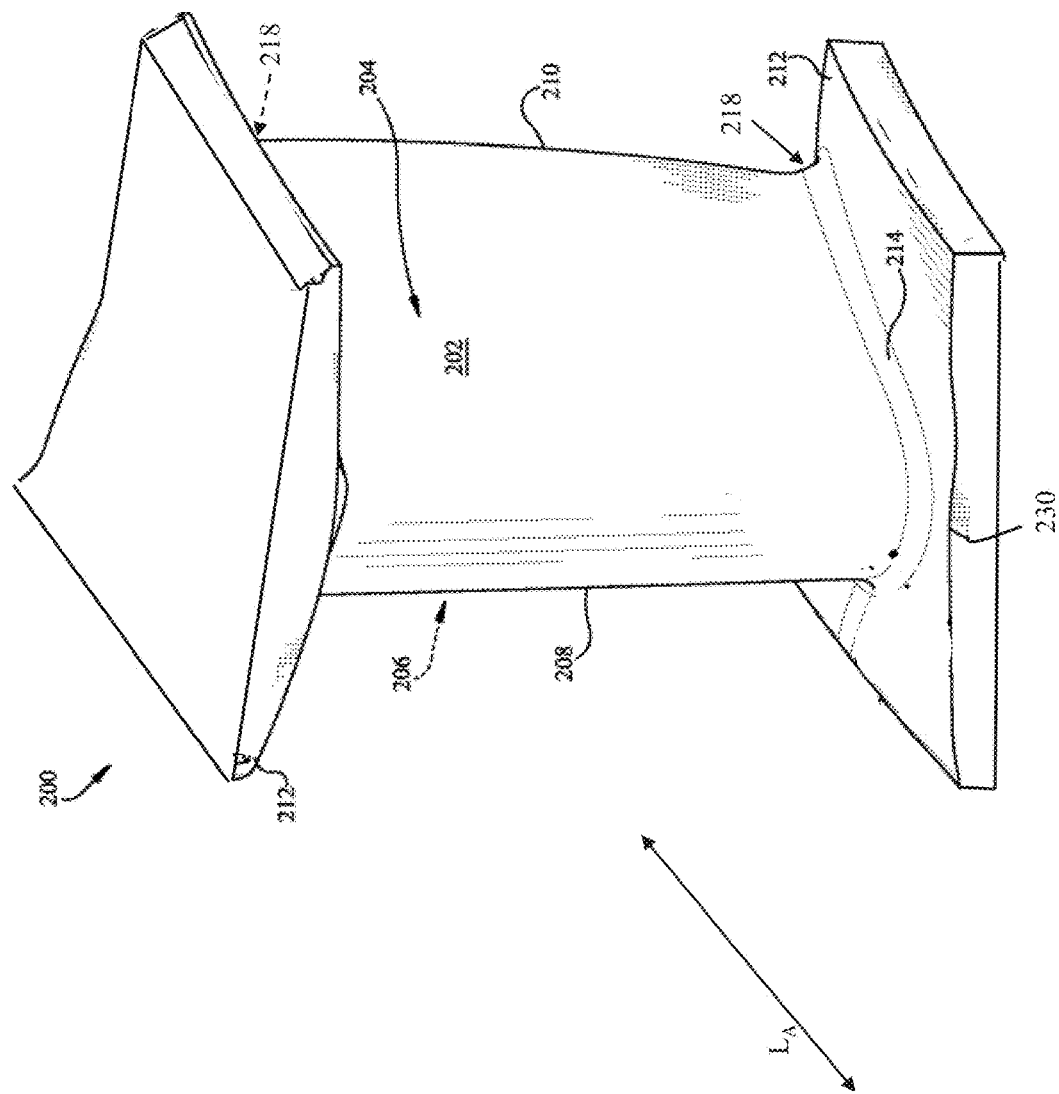
FIG. 2 shows a schematic three-dimensional depiction of a turbine nozzle including an airfoil and endwalls according to various embodiments of the disclosure.
Figure 3:
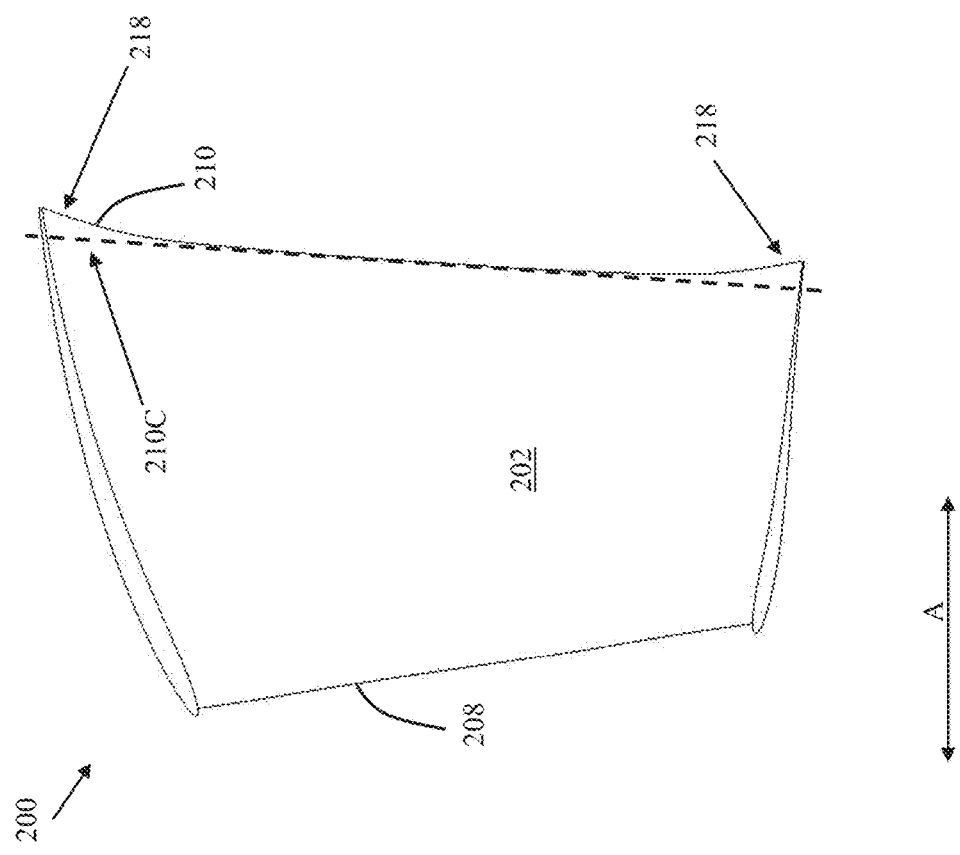
FIG. 3 shows a partial schematic view of the airfoil of FIG. 2 according to various embodiments of the disclosure.

Turning to FIG. 2, a schematic three-dimensional depiction of a turbine nozzle (or simply, nozzle) 200 is shown according to various embodiments. The nozzle 200 is a stationary nozzle which forms an annulus of stationary nozzles in a stage of a turbine (e.g., turbine 10). That is, during operation of a turbine (e.g., turbine 10), the nozzle 200 will remain stationary in order to direct the flow of working fluid (e.g., gas or steam) to one or more movable buckets (e.g., buckets 20), causing those movable buckets to initiate rotation of a rotor shaft (e.g., shaft 14). It is understood that nozzle 200 is configured to couple (mechanically couple via fasteners, welds, slot/grooves, etc.) with a plurality of similar or distinct nozzles (e.g., nozzles 200 or other nozzles) to form an annulus of nozzles in a stage of the turbine.

Returning to FIG. 2, the turbine nozzle 200 can include an airfoil 202 having a suction side 204, and a pressure side 206 (obstructed in this view) opposing the suction side 204. The nozzle 200 can also include a leading edge 208 spanning between the pressure side 206 and the suction side 204, and a trailing edge 210 opposing the leading edge 208 and spanning between the pressure side 206 and the suction side 204.

As shown, the nozzle 200 can also include at least one endwall 212 (two shown) connected with the airfoil 202. The nozzle 200 can be connected with the airfoil 202 along the suction side 204, pressure side 206, trailing edge 210 and the leading edge 208. In various embodiments, the nozzle includes a fillet 214 connecting the nozzle 210 and each endwall 212. The fillet 214 can include a weld or braze fillet, which may be formed via conventional MIG welding, TIG welding, brazing, etc.

As described herein, and in contrast to conventional turbine nozzles, the turbine nozzle 200 can include a fillet 218 at the trailing edge 210 proximate endwall 212. In various embodiments, nozzle 200 includes an enhanced fillet 218 at trailing edge 210 proximate both endwalls 212. In various embodiments, enhanced fillet 218 increases the axial chord locally from approximately fifteen (15) percent from endwalls 212, and in some cases includes a five (5) percent extension in axial chord at endwalls 212, relative to conventional nozzles. The partial schematic view of FIG. 3 demonstrates the difference between the trailing edge 210 in nozzle 200 (extended axially, along A axis, with axial length as LA, due to fillet 218) and a conventional trailing edge 210C, which has a shorter axial length. In various embodiments, fillet 218 helps to limit cracking of nozzle 200 at high temperatures and stresses.

With reference to FIG. 1, in various embodiments, the nozzle 200 can include a third stage nozzle (L2) or a fourth stage nozzle (L1). In particular embodiments, the nozzle 200 is a third stage nozzle (L2), and the improved flow profile across the airfoil 200 and endwall 212 interface allows that third stage nozzle (L2) to withstand the high-temperature gas entering the turbine 10 at that third stage. In various embodiments, the turbine 10 can include a set of nozzles 200 in only the third stage (L2) of the turbine 10, or in only the third stage (L2) and the fourth stage (L1) of the turbine 10.

Figure 4:
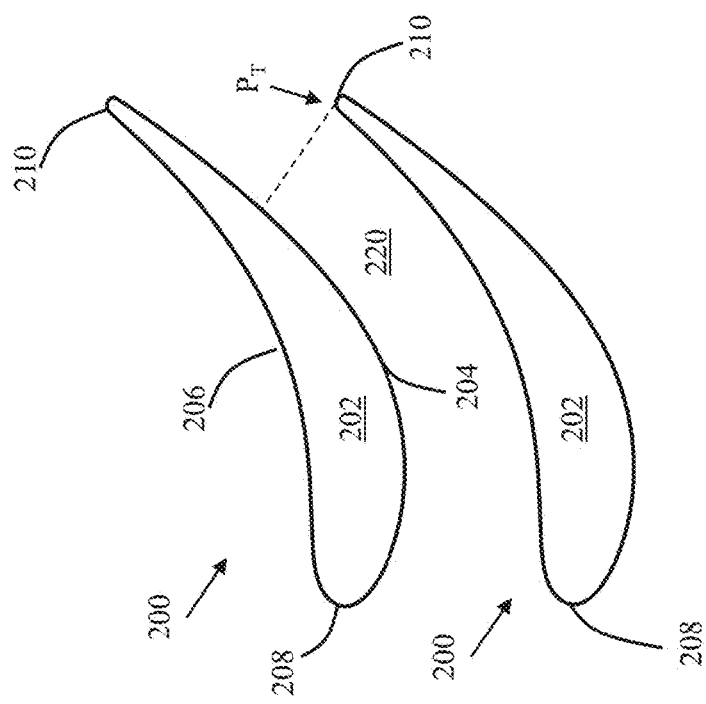
FIG. 4 shows a schematic cut-away view of a plurality of turbine airfoils according to various embodiments of the disclosure.

Turning to FIG. 4, a partial cut-away schematic view of adjacent nozzles 200 is shown according to various embodiments. As shown, according to various embodiments, nozzle 200 can further define a throat region 220 which tapers (closes) from the leading edge 208 to the trailing edge 210 between adjacent airfoils 202. Throat is defined as the minimum distance from the tangency point PT of one airfoil's 202 trailing edge 210 to the adjacent airfoil's 202 suction side 204.

Figure 5:
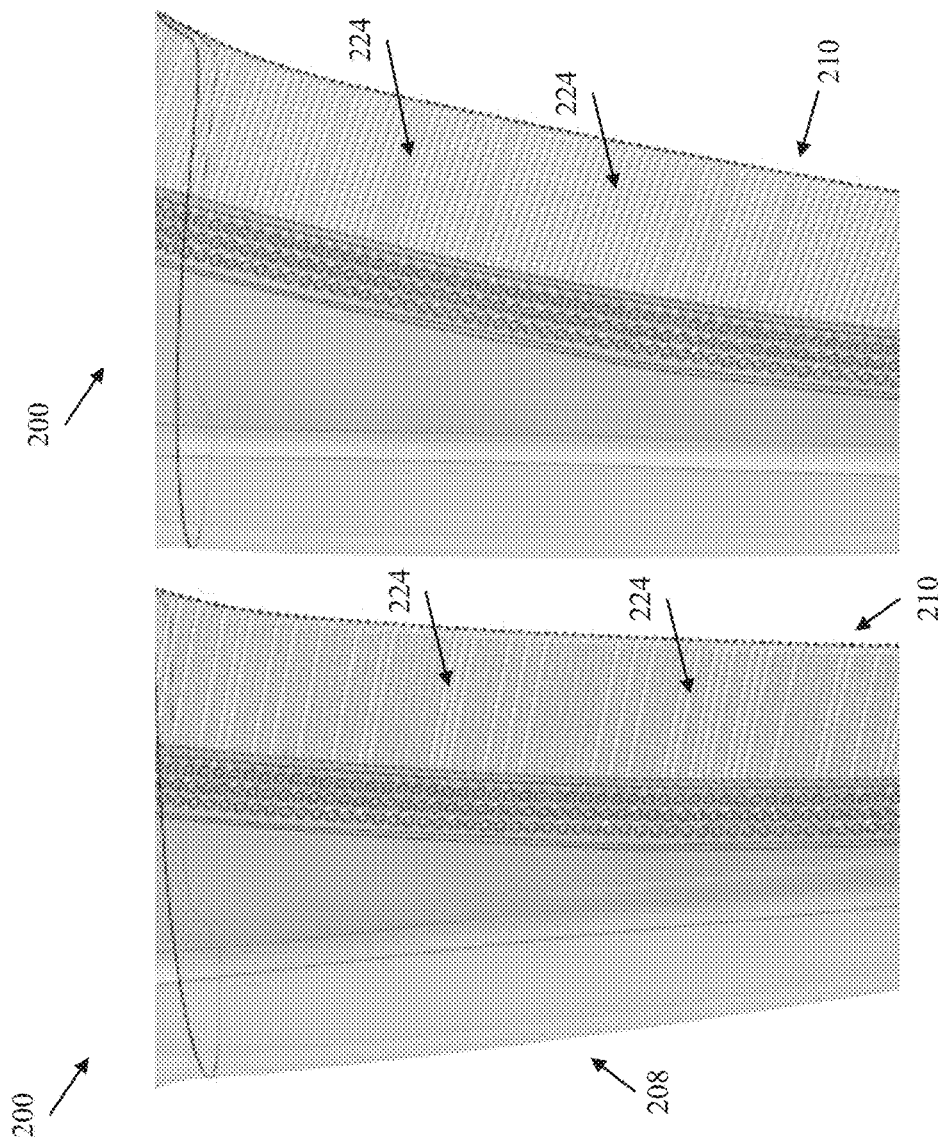
FIG. 5 shows a partially transparent perspective view of a plurality of turbine airfoils according to various embodiments of the disclosure.

FIG. 5, which shows a partially transparent view of a section of adjacent nozzles 200, illustrates a set of pin banks 224 according to various embodiments. In various embodiments, pin banks 224 extend through a portion of trailing edge 210 of airfoil 202, and provide conduits for fluid flow in order to enhance cooling of airfoils 202. In particular, pin banks 224 can allow for effective cooling of airfoil 202 at trailing edge 210 given the increased heating caused by throat region 220 and enhanced fillet 218 when compared with conventional nozzles.

It is understood that in various embodiments, other apex locations and pitches are possible, and those values given herein are merely illustrative of several of the many possible embodiments in accordance with the disclosure.

Figure 6:
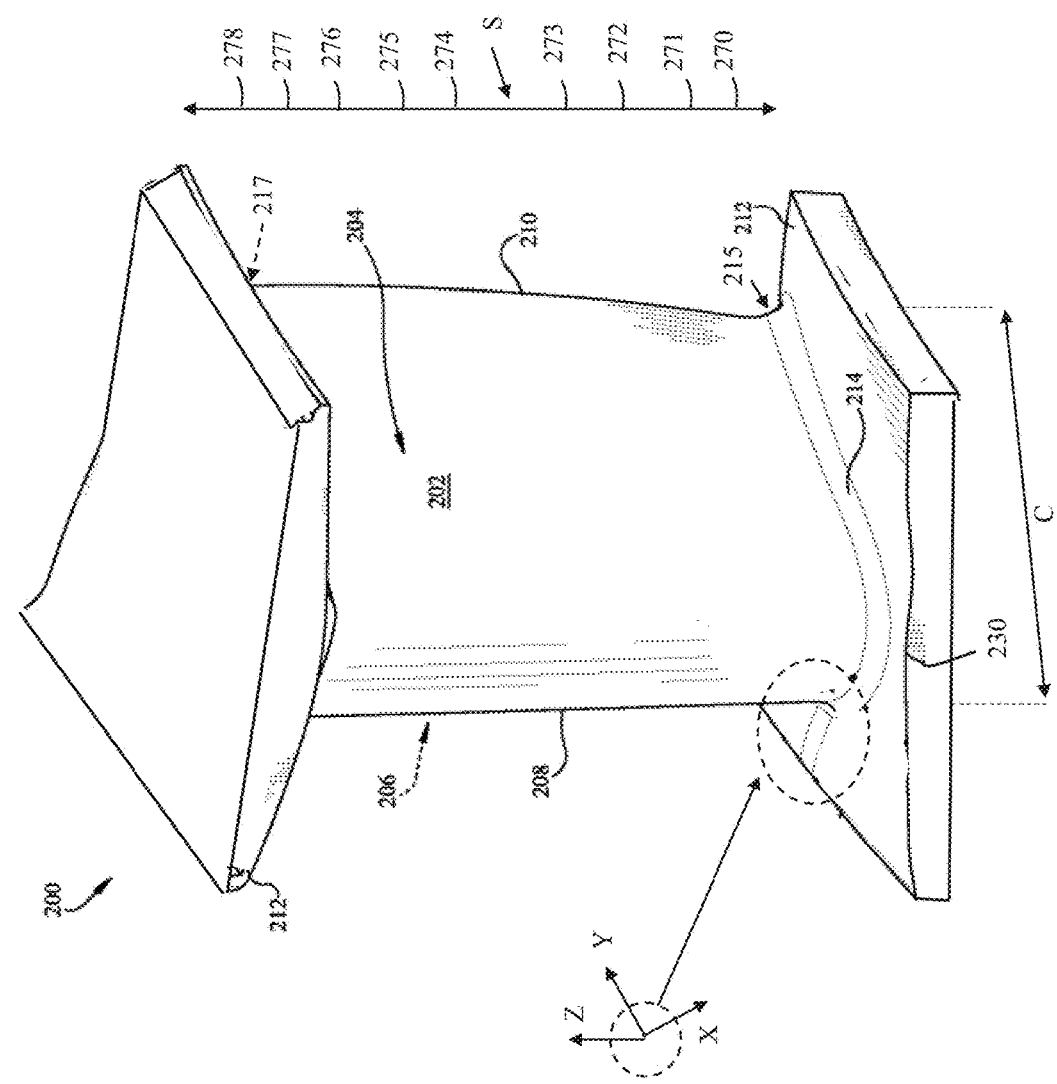
FIG. 6 shows a schematic three-dimensional depiction of a turbine nozzle according to various embodiments of the disclosure.

With reference to FIG. 6 (and continuing reference to FIGS. 2-5), a plurality of points 270-278 along span S, including root 215 and tip 217, can correspond to Z coordinate values of chord lines, and a cross section of airfoil 202 at each point can be described by a respective set of X and Y coordinates. For example, 100 points can be listed for each cross section 270-278, though it should be apparent that more or fewer points can be used for each cross section, and more or fewer cross sections can be used, as may be desired and/or appropriate. The X, Y, and Z coordinate values in TABLE I have been expressed in normalized or non-dimensionalized form in values, but it should be apparent that any or all of the coordinate values could instead be expressed in distance units so long as the proportions are maintained. To convert an X, Y or Z value of TABLE I to a respective X, Y or Z coordinate value in units of distance, such as inches or meters, the non-dimensional X, Y or Z value given in TABLE I can be multiplied by an airfoil height of airfoil 202 in such units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the airfoil profile.

The values in TABLE I are generated and shown to four decimal places for determining the profile of at least one of a suction side or a pressure side of a nominal airfoil 202 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I, particularly to the X and Y values therein. For example, a tolerance of about 10-20 percent of a thickness of the trailing edge in a direction normal to any surface location along the airfoil profile can define an airfoil profile envelope for a nozzle airfoil design at cold or room temperature. In other words, a distance of about 10-20 percent of a thickness of the trailing edge in a direction normal to any surface location along the airfoil profile can define a range of variation between measured points on an actual airfoil surface and ideal positions of those points, particularly at a cold or room temperature, as embodied by the invention. The nozzle airfoil design, as embodied by the invention, is robust to this range of variation without impairment of mechanical and aerodynamic functions. Likewise, the profile and/or design can be scaled up or down, such as geometrically, without impairment of operation, and such scaling can be facilitated by use of normalized coordinate values, i.e. multiplying the normalized values by a scaling factor, or a larger or smaller number of distance units than might have originally been used. For example, the values in TABLE I, particularly the X and Y values, could be multiplied by a scaling factor of 2, 0.5, or any other desired scaling factor. Alternatively, the values could be multiplied by a larger or smaller desired span. As referenced herein, the origin of the X, Y, Z coordinate system is the root of the leading edge (junction 232) of the airfoil 202.

It is understood that coordinate values shown in TABLE I account for dimensions at and proximate to endwall(s) 212, for example, regions including fillet 218. The coordinate lines intersecting fillet 218, proximate endwall(s) 212 may extend at least partially tangentially with respect to lines extending through airfoil 202 which are not proximate endwall(s) 212.

TABLE I

| Non-Dimensionalized (X Y Z/Span Height) | | | | |
|---|---|---|---|---|
| N | Location | X | Y | Z |
| 1 | Suction-Side | 0.0001 | −0.0013 | 0.0000 |
| 2 | Suction-Side | 0.0017 | −0.0110 | −0.0003 |
| 3 | Suction-Side | 0.0051 | −0.0202 | −0.0010 |
| 4 | Suction-Side | 0.0098 | −0.0287 | −0.0019 |
| 5 | Suction-Side | 0.0156 | −0.0366 | −0.0030 |
| 6 | Suction-Side | 0.0222 | −0.0438 | −0.0043 |
| 7 | Suction-Side | 0.0293 | −0.0504 | −0.0057 |
| 8 | Suction-Side | 0.0369 | −0.0564 | −0.0072 |
| 9 | Suction-Side | 0.0449 | −0.0619 | −0.0087 |
| 10 | Suction-Side | 0.0532 | −0.0670 | −0.0103 |
| 11 | Suction-Side | 0.0617 | −0.0716 | −0.0119 |
| 12 | Suction-Side | 0.0704 | −0.0758 | −0.0136 |
| 13 | Suction-Side | 0.0793 | −0.0796 | −0.0153 |
| 14 | Suction-Side | 0.0884 | −0.0830 | −0.0171 |
| 15 | Suction-Side | 0.0975 | −0.0860 | −0.0189 |
| 16 | Suction-Side | 0.1068 | −0.0886 | −0.0207 |
| 17 | Suction-Side | 0.1162 | −0.0909 | −0.0225 |
| 18 | Suction-Side | 0.1257 | −0.0928 | −0.0243 |
| 19 | Suction-Side | 0.1352 | −0.0943 | −0.0262 |
| 20 | Suction-Side | 0.1448 | −0.0955 | −0.0280 |
| 21 | Suction-Side | 0.1544 | −0.0963 | −0.0299 |

TABLE I-continued

Non-Dimensionalized (X Y Z/Span Height)

| N | Location | X | Y | Z |
|---|---|---|---|---|
| 22 | Suction-Side | 0.1640 | −0.0967 | −0.0317 |
| 23 | Suction-Side | 0.1737 | −0.0968 | −0.0336 |
| 24 | Suction-Side | 0.1833 | −0.0964 | −0.0355 |
| 25 | Suction-Side | 0.1929 | −0.0957 | −0.0373 |
| 26 | Suction-Side | 0.2025 | −0.0947 | −0.0392 |
| 27 | Suction-Side | 0.2121 | −0.0932 | −0.0410 |
| 28 | Suction-Side | 0.2216 | −0.0915 | −0.0429 |
| 29 | Suction-Side | 0.2310 | −0.0893 | −0.0447 |
| 30 | Suction-Side | 0.2403 | −0.0868 | −0.0465 |
| 31 | Suction-Side | 0.2495 | −0.0840 | −0.0483 |
| 32 | Suction-Side | 0.2587 | −0.0808 | −0.0500 |
| 33 | Suction-Side | 0.2677 | −0.0773 | −0.0518 |
| 34 | Suction-Side | 0.2766 | −0.0735 | −0.0535 |
| 35 | Suction-Side | 0.2853 | −0.0694 | −0.0552 |
| 36 | Suction-Side | 0.2940 | −0.0650 | −0.0569 |
| 37 | Suction-Side | 0.3025 | −0.0604 | −0.0585 |
| 38 | Suction-Side | 0.3108 | −0.0555 | −0.0601 |
| 39 | Suction-Side | 0.3190 | −0.0504 | −0.0617 |
| 40 | Suction-Side | 0.3271 | −0.0450 | −0.0633 |
| 41 | Suction-Side | 0.3350 | −0.0394 | −0.0648 |
| 42 | Suction-Side | 0.3428 | −0.0336 | −0.0663 |
| 43 | Suction-Side | 0.3505 | −0.0276 | −0.0678 |
| 44 | Suction-Side | 0.3580 | −0.0215 | −0.0693 |
| 45 | Suction-Side | 0.3654 | −0.0151 | −0.0707 |
| 46 | Suction-Side | 0.3726 | −0.0087 | −0.0721 |
| 47 | Suction-Side | 0.3798 | −0.0020 | −0.0735 |
| 48 | Suction-Side | 0.3868 | 0.0047 | −0.0748 |
| 49 | Suction-Side | 0.3936 | 0.0116 | −0.0762 |
| 50 | Suction-Side | 0.4004 | 0.0186 | −0.0775 |
| 51 | Suction-Side | 0.4071 | 0.0257 | −0.0788 |
| 52 | Suction-Side | 0.4136 | 0.0329 | −0.0800 |
| 53 | Suction-Side | 0.4201 | 0.0402 | −0.0813 |
| 54 | Suction-Side | 0.4264 | 0.0476 | −0.0825 |
| 55 | Suction-Side | 0.4327 | 0.0551 | −0.0837 |
| 56 | Suction-Side | 0.4389 | 0.0627 | −0.0849 |
| 57 | Suction-Side | 0.4449 | 0.0703 | −0.0861 |
| 58 | Suction-Side | 0.4510 | 0.0780 | −0.0872 |
| 59 | Suction-Side | 0.4569 | 0.0857 | −0.0884 |
| 60 | Suction-Side | 0.4627 | 0.0935 | −0.0895 |
| 61 | Suction-Side | 0.4685 | 0.1014 | −0.0906 |
| 62 | Suction-Side | 0.4742 | 0.1093 | −0.0918 |
| 63 | Suction-Side | 0.4799 | 0.1173 | −0.0928 |
| 64 | Suction-Side | 0.4855 | 0.1253 | −0.0939 |
| 65 | Suction-Side | 0.4910 | 0.1333 | −0.0950 |
| 66 | Suction-Side | 0.4965 | 0.1414 | −0.0961 |
| 67 | Suction-Side | 0.5019 | 0.1495 | −0.0971 |
| 68 | Suction-Side | 0.5073 | 0.1577 | −0.0981 |
| 69 | Suction-Side | 0.5126 | 0.1659 | −0.0992 |
| 70 | Suction-Side | 0.5179 | 0.1741 | −0.1002 |
| 71 | Suction-Side | 0.5231 | 0.1823 | −0.1012 |
| 72 | Suction-Side | 0.5283 | 0.1906 | −0.1022 |
| 73 | Suction-Side | 0.5334 | 0.1989 | −0.1032 |
| 74 | Suction-Side | 0.5386 | 0.2073 | −0.1042 |
| 75 | Suction-Side | 0.5436 | 0.2156 | −0.1052 |
| 76 | Suction-Side | 0.5487 | 0.2240 | −0.1062 |
| 77 | Suction-Side | 0.5537 | 0.2324 | −0.1071 |
| 78 | Suction-Side | 0.5586 | 0.2408 | −0.1081 |
| 79 | Suction-Side | 0.5635 | 0.2493 | −0.1090 |
| 80 | Suction-Side | 0.5684 | 0.2578 | −0.1100 |
| 81 | Suction-Side | 0.5733 | 0.2663 | −0.1109 |
| 82 | Suction-Side | 0.5781 | 0.2748 | −0.1118 |
| 83 | Suction-Side | 0.5829 | 0.2833 | −0.1128 |
| 84 | Suction-Side | 0.5876 | 0.2919 | −0.1137 |
| 85 | Suction-Side | 0.5923 | 0.3004 | −0.1146 |
| 86 | Suction-Side | 0.5970 | 0.3090 | −0.1155 |
| 87 | Suction-Side | 0.6016 | 0.3176 | −0.1164 |
| 88 | Suction-Side | 0.6062 | 0.3263 | −0.1173 |
| 89 | Suction-Side | 0.6108 | 0.3349 | −0.1182 |
| 90 | Suction-Side | 0.6153 | 0.3436 | −0.1191 |
| 91 | Suction-Side | 0.6198 | 0.3523 | −0.1199 |
| 92 | Suction-Side | 0.6243 | 0.3610 | −0.1208 |
| 93 | Suction-Side | 0.6288 | 0.3697 | −0.1217 |
| 94 | Suction-Side | 0.6332 | 0.3784 | −0.1225 |
| 95 | Suction-Side | 0.6376 | 0.3872 | −0.1234 |
| 96 | Suction-Side | 0.6395 | 0.3914 | −0.1237 |
| 97 | Suction-Side | 0.6401 | 0.3949 | −0.1238 |
| 98 | Suction-Side | 0.6394 | 0.3984 | −0.1237 |
| 99 | Suction-Side | 0.6377 | 0.4014 | −0.1234 |
| 100 | Suction-Side | 0.6350 | 0.4037 | −0.1229 |
| 101 | Pressure-Side | 0.0001 | −0.0013 | 0.0000 |
| 102 | Pressure-Side | 0.0003 | 0.0071 | −0.0001 |
| 103 | Pressure-Side | 0.0020 | 0.0153 | −0.0004 |
| 104 | Pressure-Side | 0.0050 | 0.0231 | −0.0010 |
| 105 | Pressure-Side | 0.0094 | 0.0302 | −0.0018 |
| 106 | Pressure-Side | 0.0150 | 0.0363 | −0.0029 |
| 107 | Pressure-Side | 0.0216 | 0.0413 | −0.0042 |
| 108 | Pressure-Side | 0.0289 | 0.0453 | −0.0056 |
| 109 | Pressure-Side | 0.0365 | 0.0484 | −0.0071 |
| 110 | Pressure-Side | 0.0444 | 0.0508 | −0.0086 |
| 111 | Pressure-Side | 0.0524 | 0.0527 | −0.0101 |
| 112 | Pressure-Side | 0.0605 | 0.0542 | −0.0117 |
| 113 | Pressure-Side | 0.0687 | 0.0555 | −0.0133 |
| 114 | Pressure-Side | 0.0769 | 0.0565 | −0.0149 |
| 115 | Pressure-Side | 0.0851 | 0.0574 | −0.0165 |
| 116 | Pressure-Side | 0.0933 | 0.0582 | −0.0180 |
| 117 | Pressure-Side | 0.1015 | 0.0589 | −0.0196 |
| 118 | Pressure-Side | 0.1097 | 0.0596 | −0.0212 |
| 119 | Pressure-Side | 0.1179 | 0.0603 | −0.0228 |
| 120 | Pressure-Side | 0.1261 | 0.0610 | −0.0244 |
| 121 | Pressure-Side | 0.1344 | 0.0617 | −0.0260 |
| 122 | Pressure-Side | 0.1426 | 0.0625 | −0.0276 |
| 123 | Pressure-Side | 0.1508 | 0.0634 | −0.0292 |
| 124 | Pressure-Side | 0.1590 | 0.0644 | −0.0308 |
| 125 | Pressure-Side | 0.1671 | 0.0654 | −0.0323 |
| 126 | Pressure-Side | 0.1753 | 0.0666 | −0.0339 |
| 127 | Pressure-Side | 0.1834 | 0.0678 | −0.0355 |
| 128 | Pressure-Side | 0.1916 | 0.0692 | −0.0371 |
| 129 | Pressure-Side | 0.1997 | 0.0707 | −0.0386 |
| 130 | Pressure-Side | 0.2078 | 0.0724 | −0.0402 |
| 131 | Pressure-Side | 0.2158 | 0.0741 | −0.0418 |
| 132 | Pressure-Side | 0.2239 | 0.0760 | −0.0433 |
| 133 | Pressure-Side | 0.2319 | 0.0781 | −0.0449 |
| 134 | Pressure-Side | 0.2398 | 0.0803 | −0.0464 |
| 135 | Pressure-Side | 0.2477 | 0.0826 | −0.0479 |
| 136 | Pressure-Side | 0.2556 | 0.0851 | −0.0494 |
| 137 | Pressure-Side | 0.2634 | 0.0878 | −0.0510 |
| 138 | Pressure-Side | 0.2712 | 0.0906 | −0.0525 |
| 139 | Pressure-Side | 0.2789 | 0.0935 | −0.0540 |
| 140 | Pressure-Side | 0.2866 | 0.0966 | −0.0554 |
| 141 | Pressure-Side | 0.2942 | 0.0998 | −0.0569 |
| 142 | Pressure-Side | 0.3018 | 0.1032 | −0.0584 |
| 143 | Pressure-Side | 0.3093 | 0.1067 | −0.0598 |
| 144 | Pressure-Side | 0.3167 | 0.1103 | −0.0613 |
| 145 | Pressure-Side | 0.3240 | 0.1141 | −0.0627 |
| 146 | Pressure-Side | 0.3314 | 0.1180 | −0.0641 |
| 147 | Pressure-Side | 0.3386 | 0.1220 | −0.0655 |
| 148 | Pressure-Side | 0.3458 | 0.1261 | −0.0669 |
| 149 | Pressure-Side | 0.3529 | 0.1304 | −0.0683 |
| 150 | Pressure-Side | 0.3599 | 0.1347 | −0.0696 |
| 151 | Pressure-Side | 0.3669 | 0.1392 | −0.0710 |
| 152 | Pressure-Side | 0.3738 | 0.1438 | −0.0723 |
| 153 | Pressure-Side | 0.3806 | 0.1485 | −0.0736 |
| 154 | Pressure-Side | 0.3874 | 0.1533 | −0.0750 |
| 155 | Pressure-Side | 0.3941 | 0.1582 | −0.0762 |
| 156 | Pressure-Side | 0.4007 | 0.1632 | −0.0775 |
| 157 | Pressure-Side | 0.4073 | 0.1682 | −0.0788 |
| 158 | Pressure-Side | 0.4138 | 0.1734 | −0.0801 |
| 159 | Pressure-Side | 0.4203 | 0.1786 | −0.0813 |
| 160 | Pressure-Side | 0.4267 | 0.1839 | −0.0825 |
| 161 | Pressure-Side | 0.4330 | 0.1893 | −0.0838 |
| 162 | Pressure-Side | 0.4393 | 0.1948 | −0.0850 |
| 163 | Pressure-Side | 0.4455 | 0.2003 | −0.0862 |
| 164 | Pressure-Side | 0.4516 | 0.2059 | −0.0874 |
| 165 | Pressure-Side | 0.4577 | 0.2115 | −0.0886 |
| 166 | Pressure-Side | 0.4637 | 0.2172 | −0.0897 |
| 167 | Pressure-Side | 0.4697 | 0.2230 | −0.0909 |
| 168 | Pressure-Side | 0.4757 | 0.2288 | −0.0920 |
| 169 | Pressure-Side | 0.4816 | 0.2347 | −0.0932 |
| 170 | Pressure-Side | 0.4874 | 0.2406 | −0.0943 |
| 171 | Pressure-Side | 0.4932 | 0.2466 | −0.0954 |
| 172 | Pressure-Side | 0.4989 | 0.2526 | −0.0965 |
| 173 | Pressure-Side | 0.5046 | 0.2587 | −0.0976 |

TABLE I-continued

Non-Dimensionalized (X Y Z/Span Height)

| N | Location | X | Y | Z |
|---|---|---|---|---|
| 174 | Pressure-Side | 0.5103 | 0.2648 | −0.0987 |
| 175 | Pressure-Side | 0.5159 | 0.2710 | −0.0998 |
| 176 | Pressure-Side | 0.5215 | 0.2771 | −0.1009 |
| 177 | Pressure-Side | 0.5270 | 0.2834 | −0.1020 |
| 178 | Pressure-Side | 0.5325 | 0.2896 | −0.1030 |
| 179 | Pressure-Side | 0.5380 | 0.2959 | −0.1041 |
| 180 | Pressure-Side | 0.5434 | 0.3022 | −0.1051 |
| 181 | Pressure-Side | 0.5488 | 0.3086 | −0.1062 |
| 182 | Pressure-Side | 0.5542 | 0.3150 | −0.1072 |
| 183 | Pressure-Side | 0.5595 | 0.3214 | −0.1082 |
| 184 | Pressure-Side | 0.5648 | 0.3278 | −0.1093 |
| 185 | Pressure-Side | 0.5701 | 0.3343 | −0.1103 |
| 186 | Pressure-Side | 0.5753 | 0.3407 | −0.1113 |
| 187 | Pressure-Side | 0.5805 | 0.3472 | −0.1123 |
| 188 | Pressure-Side | 0.5857 | 0.3538 | −0.1133 |
| 189 | Pressure-Side | 0.5908 | 0.3603 | −0.1143 |
| 190 | Pressure-Side | 0.5960 | 0.3669 | −0.1153 |
| 191 | Pressure-Side | 0.6010 | 0.3735 | −0.1163 |
| 192 | Pressure-Side | 0.6061 | 0.3802 | −0.1173 |
| 193 | Pressure-Side | 0.6112 | 0.3868 | −0.1182 |
| 194 | Pressure-Side | 0.6162 | 0.3935 | −0.1192 |
| 195 | Pressure-Side | 0.6211 | 0.4002 | −0.1202 |
| 196 | Pressure-Side | 0.6239 | 0.4031 | −0.1207 |
| 197 | Pressure-Side | 0.6265 | 0.4045 | −0.1212 |
| 198 | Pressure-Side | 0.6294 | 0.4051 | −0.1218 |
| 199 | Pressure-Side | 0.6323 | 0.4048 | −0.1223 |
| 200 | Pressure-Side | 0.6350 | 0.4037 | −0.1229 |
| 1 | Suction-Side | −0.0042 | −0.0037 | 0.0500 |
| 2 | Suction-Side | −0.0038 | −0.0135 | 0.0500 |
| 3 | Suction-Side | −0.0015 | −0.0230 | 0.0500 |
| 4 | Suction-Side | 0.0023 | −0.0320 | 0.0500 |
| 5 | Suction-Side | 0.0073 | −0.0404 | 0.0500 |
| 6 | Suction-Side | 0.0132 | −0.0482 | 0.0500 |
| 7 | Suction-Side | 0.0198 | −0.0554 | 0.0500 |
| 8 | Suction-Side | 0.0270 | −0.0620 | 0.0500 |
| 9 | Suction-Side | 0.0346 | −0.0681 | 0.0500 |
| 10 | Suction-Side | 0.0426 | −0.0738 | 0.0500 |
| 11 | Suction-Side | 0.0508 | −0.0791 | 0.0500 |
| 12 | Suction-Side | 0.0593 | −0.0839 | 0.0500 |
| 13 | Suction-Side | 0.0680 | −0.0884 | 0.0500 |
| 14 | Suction-Side | 0.0770 | −0.0924 | 0.0500 |
| 15 | Suction-Side | 0.0860 | −0.0961 | 0.0500 |
| 16 | Suction-Side | 0.0952 | −0.0994 | 0.0500 |
| 17 | Suction-Side | 0.1045 | −0.1024 | 0.0500 |
| 18 | Suction-Side | 0.1140 | −0.1050 | 0.0500 |
| 19 | Suction-Side | 0.1235 | −0.1073 | 0.0500 |
| 20 | Suction-Side | 0.1331 | −0.1091 | 0.0500 |
| 21 | Suction-Side | 0.1427 | −0.1107 | 0.0500 |
| 22 | Suction-Side | 0.1524 | −0.1118 | 0.0500 |
| 23 | Suction-Side | 0.1622 | −0.1126 | 0.0500 |
| 24 | Suction-Side | 0.1720 | −0.1130 | 0.0500 |
| 25 | Suction-Side | 0.1818 | −0.1131 | 0.0500 |
| 26 | Suction-Side | 0.1915 | −0.1127 | 0.0500 |
| 27 | Suction-Side | 0.2013 | −0.1120 | 0.0500 |
| 28 | Suction-Side | 0.2110 | −0.1109 | 0.0500 |
| 29 | Suction-Side | 0.2207 | −0.1095 | 0.0500 |
| 30 | Suction-Side | 0.2303 | −0.1077 | 0.0500 |
| 31 | Suction-Side | 0.2398 | −0.1055 | 0.0500 |
| 32 | Suction-Side | 0.2493 | −0.1029 | 0.0500 |
| 33 | Suction-Side | 0.2586 | −0.1000 | 0.0500 |
| 34 | Suction-Side | 0.2678 | −0.0968 | 0.0500 |
| 35 | Suction-Side | 0.2769 | −0.0932 | 0.0500 |
| 36 | Suction-Side | 0.2859 | −0.0893 | 0.0500 |
| 37 | Suction-Side | 0.2947 | −0.0851 | 0.0500 |
| 38 | Suction-Side | 0.3034 | −0.0806 | 0.0500 |
| 39 | Suction-Side | 0.3120 | −0.0759 | 0.0500 |
| 40 | Suction-Side | 0.3204 | −0.0708 | 0.0500 |
| 41 | Suction-Side | 0.3286 | −0.0656 | 0.0500 |
| 42 | Suction-Side | 0.3367 | −0.0601 | 0.0500 |
| 43 | Suction-Side | 0.3446 | −0.0544 | 0.0500 |
| 44 | Suction-Side | 0.3524 | −0.0484 | 0.0500 |
| 45 | Suction-Side | 0.3600 | −0.0423 | 0.0500 |
| 46 | Suction-Side | 0.3675 | −0.0360 | 0.0500 |
| 47 | Suction-Side | 0.3748 | −0.0295 | 0.0500 |
| 48 | Suction-Side | 0.3820 | −0.0229 | 0.0500 |
| 49 | Suction-Side | 0.3891 | −0.0161 | 0.0500 |
| 50 | Suction-Side | 0.3960 | −0.0092 | 0.0500 |
| 51 | Suction-Side | 0.4028 | −0.0022 | 0.0500 |
| 52 | Suction-Side | 0.4095 | 0.0050 | 0.0500 |
| 53 | Suction-Side | 0.4160 | 0.0123 | 0.0500 |
| 54 | Suction-Side | 0.4224 | 0.0196 | 0.0500 |
| 55 | Suction-Side | 0.4288 | 0.0271 | 0.0500 |
| 56 | Suction-Side | 0.4350 | 0.0347 | 0.0500 |
| 57 | Suction-Side | 0.4411 | 0.0423 | 0.0500 |
| 58 | Suction-Side | 0.4471 | 0.0500 | 0.0500 |
| 59 | Suction-Side | 0.4530 | 0.0578 | 0.0500 |
| 60 | Suction-Side | 0.4589 | 0.0656 | 0.0500 |
| 61 | Suction-Side | 0.4646 | 0.0736 | 0.0500 |
| 62 | Suction-Side | 0.4703 | 0.0815 | 0.0500 |
| 63 | Suction-Side | 0.4759 | 0.0896 | 0.0500 |
| 64 | Suction-Side | 0.4814 | 0.0976 | 0.0500 |
| 65 | Suction-Side | 0.4868 | 0.1058 | 0.0500 |
| 66 | Suction-Side | 0.4922 | 0.1139 | 0.0500 |
| 67 | Suction-Side | 0.4975 | 0.1222 | 0.0500 |
| 68 | Suction-Side | 0.5028 | 0.1304 | 0.0500 |
| 69 | Suction-Side | 0.5079 | 0.1387 | 0.0500 |
| 70 | Suction-Side | 0.5131 | 0.1470 | 0.0500 |
| 71 | Suction-Side | 0.5181 | 0.1554 | 0.0500 |
| 72 | Suction-Side | 0.5232 | 0.1638 | 0.0500 |
| 73 | Suction-Side | 0.5282 | 0.1722 | 0.0500 |
| 74 | Suction-Side | 0.5331 | 0.1806 | 0.0500 |
| 75 | Suction-Side | 0.5380 | 0.1891 | 0.0500 |
| 76 | Suction-Side | 0.5428 | 0.1976 | 0.0500 |
| 77 | Suction-Side | 0.5476 | 0.2061 | 0.0500 |
| 78 | Suction-Side | 0.5524 | 0.2147 | 0.0500 |
| 79 | Suction-Side | 0.5571 | 0.2233 | 0.0500 |
| 80 | Suction-Side | 0.5618 | 0.2318 | 0.0500 |
| 81 | Suction-Side | 0.5664 | 0.2404 | 0.0500 |
| 82 | Suction-Side | 0.5711 | 0.2491 | 0.0500 |
| 83 | Suction-Side | 0.5757 | 0.2577 | 0.0500 |
| 84 | Suction-Side | 0.5802 | 0.2664 | 0.0500 |
| 85 | Suction-Side | 0.5847 | 0.2750 | 0.0500 |
| 86 | Suction-Side | 0.5892 | 0.2837 | 0.0500 |
| 87 | Suction-Side | 0.5937 | 0.2924 | 0.0500 |
| 88 | Suction-Side | 0.5981 | 0.3011 | 0.0500 |
| 89 | Suction-Side | 0.6025 | 0.3099 | 0.0500 |
| 90 | Suction-Side | 0.6069 | 0.3186 | 0.0500 |
| 91 | Suction-Side | 0.6113 | 0.3274 | 0.0500 |
| 92 | Suction-Side | 0.6156 | 0.3362 | 0.0500 |
| 93 | Suction-Side | 0.6199 | 0.3449 | 0.0500 |
| 94 | Suction-Side | 0.6242 | 0.3537 | 0.0500 |
| 95 | Suction-Side | 0.6285 | 0.3625 | 0.0500 |
| 96 | Suction-Side | 0.6315 | 0.3688 | 0.0500 |
| 97 | Suction-Side | 0.6325 | 0.3728 | 0.0500 |
| 98 | Suction-Side | 0.6319 | 0.3768 | 0.0500 |
| 99 | Suction-Side | 0.6299 | 0.3803 | 0.0500 |
| 100 | Suction-Side | 0.6266 | 0.3828 | 0.0500 |
| 101 | Pressure-Side | −0.0042 | −0.0037 | 0.0500 |
| 102 | Pressure-Side | −0.0031 | 0.0044 | 0.0500 |
| 103 | Pressure-Side | −0.0007 | 0.0122 | 0.0500 |
| 104 | Pressure-Side | 0.0030 | 0.0194 | 0.0500 |
| 105 | Pressure-Side | 0.0082 | 0.0257 | 0.0500 |
| 106 | Pressure-Side | 0.0145 | 0.0309 | 0.0500 |
| 107 | Pressure-Side | 0.0217 | 0.0349 | 0.0500 |
| 108 | Pressure-Side | 0.0292 | 0.0380 | 0.0500 |
| 109 | Pressure-Side | 0.0371 | 0.0403 | 0.0500 |
| 110 | Pressure-Side | 0.0450 | 0.0420 | 0.0500 |
| 111 | Pressure-Side | 0.0531 | 0.0433 | 0.0500 |
| 112 | Pressure-Side | 0.0612 | 0.0443 | 0.0500 |
| 113 | Pressure-Side | 0.0694 | 0.0451 | 0.0500 |
| 114 | Pressure-Side | 0.0775 | 0.0457 | 0.0500 |
| 115 | Pressure-Side | 0.0857 | 0.0462 | 0.0500 |
| 116 | Pressure-Side | 0.0938 | 0.0467 | 0.0500 |
| 117 | Pressure-Side | 0.1020 | 0.0470 | 0.0500 |
| 118 | Pressure-Side | 0.1102 | 0.0474 | 0.0500 |
| 119 | Pressure-Side | 0.1183 | 0.0478 | 0.0500 |
| 120 | Pressure-Side | 0.1265 | 0.0482 | 0.0500 |
| 121 | Pressure-Side | 0.1347 | 0.0486 | 0.0500 |
| 122 | Pressure-Side | 0.1428 | 0.0491 | 0.0500 |
| 123 | Pressure-Side | 0.1510 | 0.0497 | 0.0500 |
| 124 | Pressure-Side | 0.1591 | 0.0504 | 0.0500 |
| 125 | Pressure-Side | 0.1673 | 0.0512 | 0.0500 |

TABLE I-continued

Non-Dimensionalized (X Y Z/Span Height)

| N | Location | X | Y | Z |
|---|---|---|---|---|
| 126 | Pressure-Side | 0.1754 | 0.0521 | 0.0500 |
| 127 | Pressure-Side | 0.1835 | 0.0531 | 0.0500 |
| 128 | Pressure-Side | 0.1916 | 0.0542 | 0.0500 |
| 129 | Pressure-Side | 0.1997 | 0.0554 | 0.0500 |
| 130 | Pressure-Side | 0.2077 | 0.0568 | 0.0500 |
| 131 | Pressure-Side | 0.2158 | 0.0583 | 0.0500 |
| 132 | Pressure-Side | 0.2238 | 0.0600 | 0.0500 |
| 133 | Pressure-Side | 0.2317 | 0.0618 | 0.0500 |
| 134 | Pressure-Side | 0.2397 | 0.0638 | 0.0500 |
| 135 | Pressure-Side | 0.2476 | 0.0659 | 0.0500 |
| 136 | Pressure-Side | 0.2554 | 0.0682 | 0.0500 |
| 137 | Pressure-Side | 0.2632 | 0.0706 | 0.0500 |
| 138 | Pressure-Side | 0.2710 | 0.0732 | 0.0500 |
| 139 | Pressure-Side | 0.2787 | 0.0759 | 0.0500 |
| 140 | Pressure-Side | 0.2863 | 0.0788 | 0.0500 |
| 141 | Pressure-Side | 0.2939 | 0.0818 | 0.0500 |
| 142 | Pressure-Side | 0.3014 | 0.0850 | 0.0500 |
| 143 | Pressure-Side | 0.3089 | 0.0884 | 0.0500 |
| 144 | Pressure-Side | 0.3163 | 0.0918 | 0.0500 |
| 145 | Pressure-Side | 0.3236 | 0.0954 | 0.0500 |
| 146 | Pressure-Side | 0.3309 | 0.0992 | 0.0500 |
| 147 | Pressure-Side | 0.3381 | 0.1031 | 0.0500 |
| 148 | Pressure-Side | 0.3452 | 0.1071 | 0.0500 |
| 149 | Pressure-Side | 0.3523 | 0.1112 | 0.0500 |
| 150 | Pressure-Side | 0.3593 | 0.1155 | 0.0500 |
| 151 | Pressure-Side | 0.3662 | 0.1198 | 0.0500 |
| 152 | Pressure-Side | 0.3730 | 0.1243 | 0.0500 |
| 153 | Pressure-Side | 0.3798 | 0.1289 | 0.0500 |
| 154 | Pressure-Side | 0.3865 | 0.1336 | 0.0500 |
| 155 | Pressure-Side | 0.3931 | 0.1384 | 0.0500 |
| 156 | Pressure-Side | 0.3996 | 0.1432 | 0.0500 |
| 157 | Pressure-Side | 0.4061 | 0.1482 | 0.0500 |
| 158 | Pressure-Side | 0.4125 | 0.1533 | 0.0500 |
| 159 | Pressure-Side | 0.4189 | 0.1585 | 0.0500 |
| 160 | Pressure-Side | 0.4252 | 0.1637 | 0.0500 |
| 161 | Pressure-Side | 0.4314 | 0.1690 | 0.0500 |
| 162 | Pressure-Side | 0.4375 | 0.1744 | 0.0500 |
| 163 | Pressure-Side | 0.4436 | 0.1799 | 0.0500 |
| 164 | Pressure-Side | 0.4496 | 0.1854 | 0.0500 |
| 165 | Pressure-Side | 0.4556 | 0.1910 | 0.0500 |
| 166 | Pressure-Side | 0.4615 | 0.1966 | 0.0500 |
| 167 | Pressure-Side | 0.4673 | 0.2024 | 0.0500 |
| 168 | Pressure-Side | 0.4731 | 0.2081 | 0.0500 |
| 169 | Pressure-Side | 0.4788 | 0.2140 | 0.0500 |
| 170 | Pressure-Side | 0.4845 | 0.2198 | 0.0500 |
| 171 | Pressure-Side | 0.4901 | 0.2258 | 0.0500 |
| 172 | Pressure-Side | 0.4957 | 0.2318 | 0.0500 |
| 173 | Pressure-Side | 0.5012 | 0.2378 | 0.0500 |
| 174 | Pressure-Side | 0.5067 | 0.2439 | 0.0500 |
| 175 | Pressure-Side | 0.5121 | 0.2500 | 0.0500 |
| 176 | Pressure-Side | 0.5175 | 0.2562 | 0.0500 |
| 177 | Pressure-Side | 0.5228 | 0.2623 | 0.0500 |
| 178 | Pressure-Side | 0.5281 | 0.2686 | 0.0500 |
| 179 | Pressure-Side | 0.5334 | 0.2748 | 0.0500 |
| 180 | Pressure-Side | 0.5386 | 0.2811 | 0.0500 |
| 181 | Pressure-Side | 0.5437 | 0.2875 | 0.0500 |
| 182 | Pressure-Side | 0.5489 | 0.2938 | 0.0500 |
| 183 | Pressure-Side | 0.5540 | 0.3002 | 0.0500 |
| 184 | Pressure-Side | 0.5591 | 0.3066 | 0.0500 |
| 185 | Pressure-Side | 0.5641 | 0.3131 | 0.0500 |
| 186 | Pressure-Side | 0.5691 | 0.3195 | 0.0500 |
| 187 | Pressure-Side | 0.5741 | 0.3260 | 0.0500 |
| 188 | Pressure-Side | 0.5790 | 0.3325 | 0.0500 |
| 189 | Pressure-Side | 0.5839 | 0.3390 | 0.0500 |
| 190 | Pressure-Side | 0.5888 | 0.3456 | 0.0500 |
| 191 | Pressure-Side | 0.5937 | 0.3521 | 0.0500 |
| 192 | Pressure-Side | 0.5986 | 0.3587 | 0.0500 |
| 193 | Pressure-Side | 0.6034 | 0.3653 | 0.0500 |
| 194 | Pressure-Side | 0.6082 | 0.3719 | 0.0500 |
| 195 | Pressure-Side | 0.6130 | 0.3786 | 0.0500 |
| 196 | Pressure-Side | 0.6156 | 0.3815 | 0.0500 |
| 197 | Pressure-Side | 0.6181 | 0.3830 | 0.0500 |
| 198 | Pressure-Side | 0.6209 | 0.3838 | 0.0500 |
| 199 | Pressure-Side | 0.6238 | 0.3837 | 0.0500 |
| 200 | Pressure-Side | 0.6266 | 0.3828 | 0.0500 |
| 1 | Suction-Side | −0.0168 | −0.0254 | 0.2000 |
| 2 | Suction-Side | −0.0165 | −0.0356 | 0.2000 |
| 3 | Suction-Side | −0.0140 | −0.0454 | 0.2000 |
| 4 | Suction-Side | −0.0100 | −0.0547 | 0.2000 |
| 5 | Suction-Side | −0.0047 | −0.0634 | 0.2000 |
| 6 | Suction-Side | 0.0015 | −0.0714 | 0.2000 |
| 7 | Suction-Side | 0.0084 | −0.0788 | 0.2000 |
| 8 | Suction-Side | 0.0159 | −0.0857 | 0.2000 |
| 9 | Suction-Side | 0.0238 | −0.0921 | 0.2000 |
| 10 | Suction-Side | 0.0320 | −0.0980 | 0.2000 |
| 11 | Suction-Side | 0.0406 | −0.1035 | 0.2000 |
| 12 | Suction-Side | 0.0493 | −0.1085 | 0.2000 |
| 13 | Suction-Side | 0.0584 | −0.1132 | 0.2000 |
| 14 | Suction-Side | 0.0676 | −0.1175 | 0.2000 |
| 15 | Suction-Side | 0.0769 | −0.1214 | 0.2000 |
| 16 | Suction-Side | 0.0865 | −0.1249 | 0.2000 |
| 17 | Suction-Side | 0.0961 | −0.1281 | 0.2000 |
| 18 | Suction-Side | 0.1058 | −0.1309 | 0.2000 |
| 19 | Suction-Side | 0.1157 | −0.1334 | 0.2000 |
| 20 | Suction-Side | 0.1256 | −0.1355 | 0.2000 |
| 21 | Suction-Side | 0.1356 | −0.1372 | 0.2000 |
| 22 | Suction-Side | 0.1457 | −0.1385 | 0.2000 |
| 23 | Suction-Side | 0.1558 | −0.1395 | 0.2000 |
| 24 | Suction-Side | 0.1659 | −0.1401 | 0.2000 |
| 25 | Suction-Side | 0.1761 | −0.1403 | 0.2000 |
| 26 | Suction-Side | 0.1863 | −0.1401 | 0.2000 |
| 27 | Suction-Side | 0.1964 | −0.1396 | 0.2000 |
| 28 | Suction-Side | 0.2065 | −0.1386 | 0.2000 |
| 29 | Suction-Side | 0.2166 | −0.1373 | 0.2000 |
| 30 | Suction-Side | 0.2266 | −0.1356 | 0.2000 |
| 31 | Suction-Side | 0.2365 | −0.1335 | 0.2000 |
| 32 | Suction-Side | 0.2464 | −0.1311 | 0.2000 |
| 33 | Suction-Side | 0.2561 | −0.1282 | 0.2000 |
| 34 | Suction-Side | 0.2657 | −0.1251 | 0.2000 |
| 35 | Suction-Side | 0.2753 | −0.1215 | 0.2000 |
| 36 | Suction-Side | 0.2846 | −0.1176 | 0.2000 |
| 37 | Suction-Side | 0.2939 | −0.1134 | 0.2000 |
| 38 | Suction-Side | 0.3030 | −0.1089 | 0.2000 |
| 39 | Suction-Side | 0.3119 | −0.1041 | 0.2000 |
| 40 | Suction-Side | 0.3207 | −0.0990 | 0.2000 |
| 41 | Suction-Side | 0.3293 | −0.0936 | 0.2000 |
| 42 | Suction-Side | 0.3377 | −0.0880 | 0.2000 |
| 43 | Suction-Side | 0.3460 | −0.0821 | 0.2000 |
| 44 | Suction-Side | 0.3541 | −0.0760 | 0.2000 |
| 45 | Suction-Side | 0.3621 | −0.0697 | 0.2000 |
| 46 | Suction-Side | 0.3698 | −0.0631 | 0.2000 |
| 47 | Suction-Side | 0.3774 | −0.0564 | 0.2000 |
| 48 | Suction-Side | 0.3849 | −0.0495 | 0.2000 |
| 49 | Suction-Side | 0.3922 | −0.0425 | 0.2000 |
| 50 | Suction-Side | 0.3994 | −0.0353 | 0.2000 |
| 51 | Suction-Side | 0.4064 | −0.0279 | 0.2000 |
| 52 | Suction-Side | 0.4132 | −0.0205 | 0.2000 |
| 53 | Suction-Side | 0.4200 | −0.0129 | 0.2000 |
| 54 | Suction-Side | 0.4266 | −0.0051 | 0.2000 |
| 55 | Suction-Side | 0.4330 | 0.0027 | 0.2000 |
| 56 | Suction-Side | 0.4394 | 0.0106 | 0.2000 |
| 57 | Suction-Side | 0.4456 | 0.0186 | 0.2000 |
| 58 | Suction-Side | 0.4518 | 0.0267 | 0.2000 |
| 59 | Suction-Side | 0.4578 | 0.0349 | 0.2000 |
| 60 | Suction-Side | 0.4637 | 0.0431 | 0.2000 |
| 61 | Suction-Side | 0.4696 | 0.0514 | 0.2000 |
| 62 | Suction-Side | 0.4753 | 0.0598 | 0.2000 |
| 63 | Suction-Side | 0.4810 | 0.0682 | 0.2000 |
| 64 | Suction-Side | 0.4865 | 0.0767 | 0.2000 |
| 65 | Suction-Side | 0.4920 | 0.0852 | 0.2000 |
| 66 | Suction-Side | 0.4974 | 0.0938 | 0.2000 |
| 67 | Suction-Side | 0.5028 | 0.1024 | 0.2000 |
| 68 | Suction-Side | 0.5081 | 0.1111 | 0.2000 |
| 69 | Suction-Side | 0.5133 | 0.1198 | 0.2000 |
| 70 | Suction-Side | 0.5185 | 0.1286 | 0.2000 |
| 71 | Suction-Side | 0.5236 | 0.1373 | 0.2000 |
| 72 | Suction-Side | 0.5286 | 0.1461 | 0.2000 |
| 73 | Suction-Side | 0.5336 | 0.1550 | 0.2000 |
| 74 | Suction-Side | 0.5386 | 0.1638 | 0.2000 |
| 75 | Suction-Side | 0.5435 | 0.1727 | 0.2000 |
| 76 | Suction-Side | 0.5483 | 0.1817 | 0.2000 |
| 77 | Suction-Side | 0.5531 | 0.1906 | 0.2000 |

TABLE I-continued

Non-Dimensionalized (X Y Z/Span Height)

| N | Location | X | Y | Z |
|---|---|---|---|---|
| 78 | Suction-Side | 0.5579 | 0.1995 | 0.2000 |
| 79 | Suction-Side | 0.5626 | 0.2085 | 0.2000 |
| 80 | Suction-Side | 0.5674 | 0.2175 | 0.2000 |
| 81 | Suction-Side | 0.5720 | 0.2265 | 0.2000 |
| 82 | Suction-Side | 0.5766 | 0.2356 | 0.2000 |
| 83 | Suction-Side | 0.5812 | 0.2446 | 0.2000 |
| 84 | Suction-Side | 0.5858 | 0.2537 | 0.2000 |
| 85 | Suction-Side | 0.5903 | 0.2628 | 0.2000 |
| 86 | Suction-Side | 0.5948 | 0.2719 | 0.2000 |
| 87 | Suction-Side | 0.5993 | 0.2810 | 0.2000 |
| 88 | Suction-Side | 0.6037 | 0.2902 | 0.2000 |
| 89 | Suction-Side | 0.6081 | 0.2993 | 0.2000 |
| 90 | Suction-Side | 0.6125 | 0.3085 | 0.2000 |
| 91 | Suction-Side | 0.6168 | 0.3176 | 0.2000 |
| 92 | Suction-Side | 0.6211 | 0.3268 | 0.2000 |
| 93 | Suction-Side | 0.6254 | 0.3360 | 0.2000 |
| 94 | Suction-Side | 0.6297 | 0.3452 | 0.2000 |
| 95 | Suction-Side | 0.6340 | 0.3544 | 0.2000 |
| 96 | Suction-Side | 0.6370 | 0.3610 | 0.2000 |
| 97 | Suction-Side | 0.6379 | 0.3649 | 0.2000 |
| 98 | Suction-Side | 0.6374 | 0.3688 | 0.2000 |
| 99 | Suction-Side | 0.6354 | 0.3722 | 0.2000 |
| 100 | Suction-Side | 0.6322 | 0.3747 | 0.2000 |
| 101 | Pressure-Side | −0.0168 | −0.0254 | 0.2000 |
| 102 | Pressure-Side | −0.0154 | −0.0171 | 0.2000 |
| 103 | Pressure-Side | −0.0125 | −0.0092 | 0.2000 |
| 104 | Pressure-Side | −0.0082 | −0.0020 | 0.2000 |
| 105 | Pressure-Side | −0.0024 | 0.0041 | 0.2000 |
| 106 | Pressure-Side | 0.0044 | 0.0090 | 0.2000 |
| 107 | Pressure-Side | 0.0120 | 0.0128 | 0.2000 |
| 108 | Pressure-Side | 0.0199 | 0.0156 | 0.2000 |
| 109 | Pressure-Side | 0.0281 | 0.0177 | 0.2000 |
| 110 | Pressure-Side | 0.0364 | 0.0192 | 0.2000 |
| 111 | Pressure-Side | 0.0447 | 0.0204 | 0.2000 |
| 112 | Pressure-Side | 0.0531 | 0.0213 | 0.2000 |
| 113 | Pressure-Side | 0.0615 | 0.0219 | 0.2000 |
| 114 | Pressure-Side | 0.0700 | 0.0225 | 0.2000 |
| 115 | Pressure-Side | 0.0784 | 0.0229 | 0.2000 |
| 116 | Pressure-Side | 0.0868 | 0.0233 | 0.2000 |
| 117 | Pressure-Side | 0.0952 | 0.0237 | 0.2000 |
| 118 | Pressure-Side | 0.1037 | 0.0241 | 0.2000 |
| 119 | Pressure-Side | 0.1121 | 0.0245 | 0.2000 |
| 120 | Pressure-Side | 0.1205 | 0.0249 | 0.2000 |
| 121 | Pressure-Side | 0.1289 | 0.0254 | 0.2000 |
| 122 | Pressure-Side | 0.1373 | 0.0260 | 0.2000 |
| 123 | Pressure-Side | 0.1457 | 0.0267 | 0.2000 |
| 124 | Pressure-Side | 0.1541 | 0.0275 | 0.2000 |
| 125 | Pressure-Side | 0.1625 | 0.0283 | 0.2000 |
| 126 | Pressure-Side | 0.1709 | 0.0293 | 0.2000 |
| 127 | Pressure-Side | 0.1793 | 0.0304 | 0.2000 |
| 128 | Pressure-Side | 0.1876 | 0.0316 | 0.2000 |
| 129 | Pressure-Side | 0.1959 | 0.0330 | 0.2000 |
| 130 | Pressure-Side | 0.2042 | 0.0345 | 0.2000 |
| 131 | Pressure-Side | 0.2125 | 0.0362 | 0.2000 |
| 132 | Pressure-Side | 0.2207 | 0.0379 | 0.2000 |
| 133 | Pressure-Side | 0.2290 | 0.0399 | 0.2000 |
| 134 | Pressure-Side | 0.2371 | 0.0420 | 0.2000 |
| 135 | Pressure-Side | 0.2453 | 0.0442 | 0.2000 |
| 136 | Pressure-Side | 0.2533 | 0.0466 | 0.2000 |
| 137 | Pressure-Side | 0.2614 | 0.0491 | 0.2000 |
| 138 | Pressure-Side | 0.2694 | 0.0518 | 0.2000 |
| 139 | Pressure-Side | 0.2773 | 0.0546 | 0.2000 |
| 140 | Pressure-Side | 0.2852 | 0.0576 | 0.2000 |
| 141 | Pressure-Side | 0.2930 | 0.0608 | 0.2000 |
| 142 | Pressure-Side | 0.3008 | 0.0641 | 0.2000 |
| 143 | Pressure-Side | 0.3085 | 0.0675 | 0.2000 |
| 144 | Pressure-Side | 0.3161 | 0.0711 | 0.2000 |
| 145 | Pressure-Side | 0.3237 | 0.0748 | 0.2000 |
| 146 | Pressure-Side | 0.3312 | 0.0787 | 0.2000 |
| 147 | Pressure-Side | 0.3386 | 0.0827 | 0.2000 |
| 148 | Pressure-Side | 0.3460 | 0.0868 | 0.2000 |
| 149 | Pressure-Side | 0.3533 | 0.0910 | 0.2000 |
| 150 | Pressure-Side | 0.3605 | 0.0954 | 0.2000 |
| 151 | Pressure-Side | 0.3676 | 0.0999 | 0.2000 |
| 152 | Pressure-Side | 0.3747 | 0.1046 | 0.2000 |
| 153 | Pressure-Side | 0.3816 | 0.1093 | 0.2000 |
| 154 | Pressure-Side | 0.3885 | 0.1141 | 0.2000 |
| 155 | Pressure-Side | 0.3954 | 0.1191 | 0.2000 |
| 156 | Pressure-Side | 0.4021 | 0.1242 | 0.2000 |
| 157 | Pressure-Side | 0.4088 | 0.1293 | 0.2000 |
| 158 | Pressure-Side | 0.4154 | 0.1346 | 0.2000 |
| 159 | Pressure-Side | 0.4219 | 0.1400 | 0.2000 |
| 160 | Pressure-Side | 0.4283 | 0.1454 | 0.2000 |
| 161 | Pressure-Side | 0.4347 | 0.1509 | 0.2000 |
| 162 | Pressure-Side | 0.4410 | 0.1565 | 0.2000 |
| 163 | Pressure-Side | 0.4472 | 0.1622 | 0.2000 |
| 164 | Pressure-Side | 0.4533 | 0.1680 | 0.2000 |
| 165 | Pressure-Side | 0.4594 | 0.1739 | 0.2000 |
| 166 | Pressure-Side | 0.4654 | 0.1798 | 0.2000 |
| 167 | Pressure-Side | 0.4714 | 0.1858 | 0.2000 |
| 168 | Pressure-Side | 0.4773 | 0.1918 | 0.2000 |
| 169 | Pressure-Side | 0.4831 | 0.1979 | 0.2000 |
| 170 | Pressure-Side | 0.4888 | 0.2041 | 0.2000 |
| 171 | Pressure-Side | 0.4945 | 0.2103 | 0.2000 |
| 172 | Pressure-Side | 0.5002 | 0.2166 | 0.2000 |
| 173 | Pressure-Side | 0.5057 | 0.2229 | 0.2000 |
| 174 | Pressure-Side | 0.5113 | 0.2293 | 0.2000 |
| 175 | Pressure-Side | 0.5167 | 0.2357 | 0.2000 |
| 176 | Pressure-Side | 0.5221 | 0.2422 | 0.2000 |
| 177 | Pressure-Side | 0.5275 | 0.2487 | 0.2000 |
| 178 | Pressure-Side | 0.5328 | 0.2552 | 0.2000 |
| 179 | Pressure-Side | 0.5381 | 0.2618 | 0.2000 |
| 180 | Pressure-Side | 0.5434 | 0.2684 | 0.2000 |
| 181 | Pressure-Side | 0.5486 | 0.2750 | 0.2000 |
| 182 | Pressure-Side | 0.5537 | 0.2817 | 0.2000 |
| 183 | Pressure-Side | 0.5589 | 0.2884 | 0.2000 |
| 184 | Pressure-Side | 0.5639 | 0.2951 | 0.2000 |
| 185 | Pressure-Side | 0.5690 | 0.3019 | 0.2000 |
| 186 | Pressure-Side | 0.5740 | 0.3086 | 0.2000 |
| 187 | Pressure-Side | 0.5790 | 0.3154 | 0.2000 |
| 188 | Pressure-Side | 0.5840 | 0.3222 | 0.2000 |
| 189 | Pressure-Side | 0.5890 | 0.3291 | 0.2000 |
| 190 | Pressure-Side | 0.5939 | 0.3359 | 0.2000 |
| 191 | Pressure-Side | 0.5988 | 0.3428 | 0.2000 |
| 192 | Pressure-Side | 0.6037 | 0.3496 | 0.2000 |
| 193 | Pressure-Side | 0.6086 | 0.3565 | 0.2000 |
| 194 | Pressure-Side | 0.6134 | 0.3634 | 0.2000 |
| 195 | Pressure-Side | 0.6182 | 0.3703 | 0.2000 |
| 196 | Pressure-Side | 0.6208 | 0.3734 | 0.2000 |
| 197 | Pressure-Side | 0.6234 | 0.3750 | 0.2000 |
| 198 | Pressure-Side | 0.6263 | 0.3757 | 0.2000 |
| 199 | Pressure-Side | 0.6294 | 0.3756 | 0.2000 |
| 200 | Pressure-Side | 0.6322 | 0.3747 | 0.2000 |
| 1 | Suction-Side | −0.0254 | −0.0400 | 0.3000 |
| 2 | Suction-Side | −0.0250 | −0.0504 | 0.3000 |
| 3 | Suction-Side | −0.0223 | −0.0604 | 0.3000 |
| 4 | Suction-Side | −0.0180 | −0.0699 | 0.3000 |
| 5 | Suction-Side | −0.0124 | −0.0787 | 0.3000 |
| 6 | Suction-Side | −0.0060 | −0.0868 | 0.3000 |
| 7 | Suction-Side | 0.0012 | −0.0944 | 0.3000 |
| 8 | Suction-Side | 0.0089 | −0.1014 | 0.3000 |
| 9 | Suction-Side | 0.0170 | −0.1079 | 0.3000 |
| 10 | Suction-Side | 0.0255 | −0.1139 | 0.3000 |
| 11 | Suction-Side | 0.0342 | −0.1196 | 0.3000 |
| 12 | Suction-Side | 0.0432 | −0.1248 | 0.3000 |
| 13 | Suction-Side | 0.0525 | −0.1296 | 0.3000 |
| 14 | Suction-Side | 0.0619 | −0.1340 | 0.3000 |
| 15 | Suction-Side | 0.0715 | −0.1380 | 0.3000 |
| 16 | Suction-Side | 0.0812 | −0.1417 | 0.3000 |
| 17 | Suction-Side | 0.0911 | −0.1450 | 0.3000 |
| 18 | Suction-Side | 0.1011 | −0.1479 | 0.3000 |
| 19 | Suction-Side | 0.1112 | −0.1505 | 0.3000 |
| 20 | Suction-Side | 0.1213 | −0.1527 | 0.3000 |
| 21 | Suction-Side | 0.1316 | −0.1545 | 0.3000 |
| 22 | Suction-Side | 0.1419 | −0.1559 | 0.3000 |
| 23 | Suction-Side | 0.1522 | −0.1570 | 0.3000 |
| 24 | Suction-Side | 0.1626 | −0.1576 | 0.3000 |
| 25 | Suction-Side | 0.1730 | −0.1579 | 0.3000 |
| 26 | Suction-Side | 0.1834 | −0.1578 | 0.3000 |
| 27 | Suction-Side | 0.1938 | −0.1573 | 0.3000 |
| 28 | Suction-Side | 0.2042 | −0.1564 | 0.3000 |
| 29 | Suction-Side | 0.2145 | −0.1551 | 0.3000 |

TABLE I-continued

Non-Dimensionalized (X Y Z/Span Height)

| N | Location | X | Y | Z |
|---|---|---|---|---|
| 30 | Suction-Side | 0.2248 | −0.1534 | 0.3000 |
| 31 | Suction-Side | 0.2350 | −0.1513 | 0.3000 |
| 32 | Suction-Side | 0.2451 | −0.1488 | 0.3000 |
| 33 | Suction-Side | 0.2551 | −0.1460 | 0.3000 |
| 34 | Suction-Side | 0.2650 | −0.1427 | 0.3000 |
| 35 | Suction-Side | 0.2748 | −0.1391 | 0.3000 |
| 36 | Suction-Side | 0.2844 | −0.1352 | 0.3000 |
| 37 | Suction-Side | 0.2939 | −0.1309 | 0.3000 |
| 38 | Suction-Side | 0.3032 | −0.1263 | 0.3000 |
| 39 | Suction-Side | 0.3124 | −0.1214 | 0.3000 |
| 40 | Suction-Side | 0.3214 | −0.1161 | 0.3000 |
| 41 | Suction-Side | 0.3302 | −0.1106 | 0.3000 |
| 42 | Suction-Side | 0.3388 | −0.1048 | 0.3000 |
| 43 | Suction-Side | 0.3473 | −0.0988 | 0.3000 |
| 44 | Suction-Side | 0.3556 | −0.0925 | 0.3000 |
| 45 | Suction-Side | 0.3637 | −0.0860 | 0.3000 |
| 46 | Suction-Side | 0.3717 | −0.0793 | 0.3000 |
| 47 | Suction-Side | 0.3794 | −0.0724 | 0.3000 |
| 48 | Suction-Side | 0.3870 | −0.0653 | 0.3000 |
| 49 | Suction-Side | 0.3945 | −0.0580 | 0.3000 |
| 50 | Suction-Side | 0.4018 | −0.0506 | 0.3000 |
| 51 | Suction-Side | 0.4089 | −0.0430 | 0.3000 |
| 52 | Suction-Side | 0.4159 | −0.0353 | 0.3000 |
| 53 | Suction-Side | 0.4228 | −0.0274 | 0.3000 |
| 54 | Suction-Side | 0.4295 | −0.0195 | 0.3000 |
| 55 | Suction-Side | 0.4360 | −0.0114 | 0.3000 |
| 56 | Suction-Side | 0.4425 | −0.0032 | 0.3000 |
| 57 | Suction-Side | 0.4488 | 0.0050 | 0.3000 |
| 58 | Suction-Side | 0.4550 | 0.0134 | 0.3000 |
| 59 | Suction-Side | 0.4611 | 0.0218 | 0.3000 |
| 60 | Suction-Side | 0.4671 | 0.0303 | 0.3000 |
| 61 | Suction-Side | 0.4730 | 0.0389 | 0.3000 |
| 62 | Suction-Side | 0.4788 | 0.0475 | 0.3000 |
| 63 | Suction-Side | 0.4845 | 0.0562 | 0.3000 |
| 64 | Suction-Side | 0.4902 | 0.0650 | 0.3000 |
| 65 | Suction-Side | 0.4957 | 0.0738 | 0.3000 |
| 66 | Suction-Side | 0.5012 | 0.0826 | 0.3000 |
| 67 | Suction-Side | 0.5066 | 0.0915 | 0.3000 |
| 68 | Suction-Side | 0.5119 | 0.1005 | 0.3000 |
| 69 | Suction-Side | 0.5171 | 0.1095 | 0.3000 |
| 70 | Suction-Side | 0.5223 | 0.1185 | 0.3000 |
| 71 | Suction-Side | 0.5275 | 0.1275 | 0.3000 |
| 72 | Suction-Side | 0.5326 | 0.1366 | 0.3000 |
| 73 | Suction-Side | 0.5376 | 0.1457 | 0.3000 |
| 74 | Suction-Side | 0.5426 | 0.1549 | 0.3000 |
| 75 | Suction-Side | 0.5475 | 0.1640 | 0.3000 |
| 76 | Suction-Side | 0.5524 | 0.1732 | 0.3000 |
| 77 | Suction-Side | 0.5572 | 0.1824 | 0.3000 |
| 78 | Suction-Side | 0.5620 | 0.1917 | 0.3000 |
| 79 | Suction-Side | 0.5668 | 0.2009 | 0.3000 |
| 80 | Suction-Side | 0.5715 | 0.2102 | 0.3000 |
| 81 | Suction-Side | 0.5762 | 0.2195 | 0.3000 |
| 82 | Suction-Side | 0.5808 | 0.2288 | 0.3000 |
| 83 | Suction-Side | 0.5854 | 0.2381 | 0.3000 |
| 84 | Suction-Side | 0.5900 | 0.2475 | 0.3000 |
| 85 | Suction-Side | 0.5946 | 0.2568 | 0.3000 |
| 86 | Suction-Side | 0.5991 | 0.2662 | 0.3000 |
| 87 | Suction-Side | 0.6035 | 0.2756 | 0.3000 |
| 88 | Suction-Side | 0.6080 | 0.2850 | 0.3000 |
| 89 | Suction-Side | 0.6124 | 0.2945 | 0.3000 |
| 90 | Suction-Side | 0.6167 | 0.3039 | 0.3000 |
| 91 | Suction-Side | 0.6211 | 0.3134 | 0.3000 |
| 92 | Suction-Side | 0.6254 | 0.3228 | 0.3000 |
| 93 | Suction-Side | 0.6297 | 0.3323 | 0.3000 |
| 94 | Suction-Side | 0.6340 | 0.3418 | 0.3000 |
| 95 | Suction-Side | 0.6383 | 0.3513 | 0.3000 |
| 96 | Suction-Side | 0.6413 | 0.3580 | 0.3000 |
| 97 | Suction-Side | 0.6422 | 0.3619 | 0.3000 |
| 98 | Suction-Side | 0.6416 | 0.3658 | 0.3000 |
| 99 | Suction-Side | 0.6396 | 0.3692 | 0.3000 |
| 100 | Suction-Side | 0.6364 | 0.3716 | 0.3000 |
| 101 | Pressure-Side | −0.0254 | −0.0400 | 0.3000 |
| 102 | Pressure-Side | −0.0237 | −0.0316 | 0.3000 |
| 103 | Pressure-Side | −0.0205 | −0.0236 | 0.3000 |
| 104 | Pressure-Side | −0.0159 | −0.0163 | 0.3000 |
| 105 | Pressure-Side | −0.0099 | −0.0101 | 0.3000 |
| 106 | Pressure-Side | −0.0028 | −0.0052 | 0.3000 |
| 107 | Pressure-Side | 0.0050 | −0.0015 | 0.3000 |
| 108 | Pressure-Side | 0.0131 | 0.0013 | 0.3000 |
| 109 | Pressure-Side | 0.0215 | 0.0033 | 0.3000 |
| 110 | Pressure-Side | 0.0300 | 0.0049 | 0.3000 |
| 111 | Pressure-Side | 0.0385 | 0.0060 | 0.3000 |
| 112 | Pressure-Side | 0.0471 | 0.0069 | 0.3000 |
| 113 | Pressure-Side | 0.0557 | 0.0075 | 0.3000 |
| 114 | Pressure-Side | 0.0643 | 0.0081 | 0.3000 |
| 115 | Pressure-Side | 0.0729 | 0.0086 | 0.3000 |
| 116 | Pressure-Side | 0.0816 | 0.0090 | 0.3000 |
| 117 | Pressure-Side | 0.0902 | 0.0094 | 0.3000 |
| 118 | Pressure-Side | 0.0988 | 0.0098 | 0.3000 |
| 119 | Pressure-Side | 0.1074 | 0.0103 | 0.3000 |
| 120 | Pressure-Side | 0.1160 | 0.0108 | 0.3000 |
| 121 | Pressure-Side | 0.1246 | 0.0114 | 0.3000 |
| 122 | Pressure-Side | 0.1332 | 0.0120 | 0.3000 |
| 123 | Pressure-Side | 0.1418 | 0.0127 | 0.3000 |
| 124 | Pressure-Side | 0.1504 | 0.0135 | 0.3000 |
| 125 | Pressure-Side | 0.1590 | 0.0145 | 0.3000 |
| 126 | Pressure-Side | 0.1675 | 0.0156 | 0.3000 |
| 127 | Pressure-Side | 0.1761 | 0.0167 | 0.3000 |
| 128 | Pressure-Side | 0.1846 | 0.0180 | 0.3000 |
| 129 | Pressure-Side | 0.1931 | 0.0195 | 0.3000 |
| 130 | Pressure-Side | 0.2016 | 0.0210 | 0.3000 |
| 131 | Pressure-Side | 0.2100 | 0.0227 | 0.3000 |
| 132 | Pressure-Side | 0.2185 | 0.0246 | 0.3000 |
| 133 | Pressure-Side | 0.2268 | 0.0266 | 0.3000 |
| 134 | Pressure-Side | 0.2352 | 0.0287 | 0.3000 |
| 135 | Pressure-Side | 0.2435 | 0.0310 | 0.3000 |
| 136 | Pressure-Side | 0.2518 | 0.0335 | 0.3000 |
| 137 | Pressure-Side | 0.2600 | 0.0361 | 0.3000 |
| 138 | Pressure-Side | 0.2682 | 0.0388 | 0.3000 |
| 139 | Pressure-Side | 0.2763 | 0.0417 | 0.3000 |
| 140 | Pressure-Side | 0.2844 | 0.0448 | 0.3000 |
| 141 | Pressure-Side | 0.2924 | 0.0480 | 0.3000 |
| 142 | Pressure-Side | 0.3003 | 0.0514 | 0.3000 |
| 143 | Pressure-Side | 0.3082 | 0.0549 | 0.3000 |
| 144 | Pressure-Side | 0.3160 | 0.0586 | 0.3000 |
| 145 | Pressure-Side | 0.3237 | 0.0624 | 0.3000 |
| 146 | Pressure-Side | 0.3314 | 0.0663 | 0.3000 |
| 147 | Pressure-Side | 0.3390 | 0.0704 | 0.3000 |
| 148 | Pressure-Side | 0.3465 | 0.0746 | 0.3000 |
| 149 | Pressure-Side | 0.3540 | 0.0790 | 0.3000 |
| 150 | Pressure-Side | 0.3613 | 0.0835 | 0.3000 |
| 151 | Pressure-Side | 0.3686 | 0.0881 | 0.3000 |
| 152 | Pressure-Side | 0.3758 | 0.0928 | 0.3000 |
| 153 | Pressure-Side | 0.3829 | 0.0977 | 0.3000 |
| 154 | Pressure-Side | 0.3900 | 0.1027 | 0.3000 |
| 155 | Pressure-Side | 0.3969 | 0.1078 | 0.3000 |
| 156 | Pressure-Side | 0.4038 | 0.1130 | 0.3000 |
| 157 | Pressure-Side | 0.4106 | 0.1183 | 0.3000 |
| 158 | Pressure-Side | 0.4173 | 0.1237 | 0.3000 |
| 159 | Pressure-Side | 0.4239 | 0.1292 | 0.3000 |
| 160 | Pressure-Side | 0.4305 | 0.1348 | 0.3000 |
| 161 | Pressure-Side | 0.4370 | 0.1405 | 0.3000 |
| 162 | Pressure-Side | 0.4434 | 0.1463 | 0.3000 |
| 163 | Pressure-Side | 0.4497 | 0.1522 | 0.3000 |
| 164 | Pressure-Side | 0.4559 | 0.1581 | 0.3000 |
| 165 | Pressure-Side | 0.4621 | 0.1642 | 0.3000 |
| 166 | Pressure-Side | 0.4682 | 0.1703 | 0.3000 |
| 167 | Pressure-Side | 0.4742 | 0.1764 | 0.3000 |
| 168 | Pressure-Side | 0.4801 | 0.1827 | 0.3000 |
| 169 | Pressure-Side | 0.4860 | 0.1890 | 0.3000 |
| 170 | Pressure-Side | 0.4918 | 0.1954 | 0.3000 |
| 171 | Pressure-Side | 0.4976 | 0.2018 | 0.3000 |
| 172 | Pressure-Side | 0.5033 | 0.2083 | 0.3000 |
| 173 | Pressure-Side | 0.5089 | 0.2148 | 0.3000 |
| 174 | Pressure-Side | 0.5145 | 0.2214 | 0.3000 |
| 175 | Pressure-Side | 0.5200 | 0.2280 | 0.3000 |
| 176 | Pressure-Side | 0.5255 | 0.2347 | 0.3000 |
| 177 | Pressure-Side | 0.5309 | 0.2414 | 0.3000 |
| 178 | Pressure-Side | 0.5363 | 0.2481 | 0.3000 |
| 179 | Pressure-Side | 0.5416 | 0.2549 | 0.3000 |
| 180 | Pressure-Side | 0.5469 | 0.2617 | 0.3000 |
| 181 | Pressure-Side | 0.5521 | 0.2686 | 0.3000 |

TABLE I-continued

Non-Dimensionalized (X Y Z/Span Height)

| N | Location | X | Y | Z |
|---|---|---|---|---|
| 182 | Pressure-Side | 0.5573 | 0.2755 | 0.3000 |
| 183 | Pressure-Side | 0.5625 | 0.2824 | 0.3000 |
| 184 | Pressure-Side | 0.5676 | 0.2893 | 0.3000 |
| 185 | Pressure-Side | 0.5727 | 0.2963 | 0.3000 |
| 186 | Pressure-Side | 0.5777 | 0.3033 | 0.3000 |
| 187 | Pressure-Side | 0.5828 | 0.3103 | 0.3000 |
| 188 | Pressure-Side | 0.5878 | 0.3173 | 0.3000 |
| 189 | Pressure-Side | 0.5928 | 0.3243 | 0.3000 |
| 190 | Pressure-Side | 0.5977 | 0.3314 | 0.3000 |
| 191 | Pressure-Side | 0.6027 | 0.3385 | 0.3000 |
| 192 | Pressure-Side | 0.6076 | 0.3455 | 0.3000 |
| 193 | Pressure-Side | 0.6125 | 0.3526 | 0.3000 |
| 194 | Pressure-Side | 0.6174 | 0.3597 | 0.3000 |
| 195 | Pressure-Side | 0.6222 | 0.3669 | 0.3000 |
| 196 | Pressure-Side | 0.6248 | 0.3701 | 0.3000 |
| 197 | Pressure-Side | 0.6274 | 0.3718 | 0.3000 |
| 198 | Pressure-Side | 0.6304 | 0.3726 | 0.3000 |
| 199 | Pressure-Side | 0.6335 | 0.3726 | 0.3000 |
| 200 | Pressure-Side | 0.6364 | 0.3716 | 0.3000 |
| 1 | Suction-Side | −0.0340 | −0.0566 | 0.4000 |
| 2 | Suction-Side | −0.0330 | −0.0672 | 0.4000 |
| 3 | Suction-Side | −0.0298 | −0.0773 | 0.4000 |
| 4 | Suction-Side | −0.0250 | −0.0868 | 0.4000 |
| 5 | Suction-Side | −0.0190 | −0.0956 | 0.4000 |
| 6 | Suction-Side | −0.0122 | −0.1037 | 0.4000 |
| 7 | Suction-Side | −0.0047 | −0.1113 | 0.4000 |
| 8 | Suction-Side | 0.0032 | −0.1184 | 0.4000 |
| 9 | Suction-Side | 0.0116 | −0.1249 | 0.4000 |
| 10 | Suction-Side | 0.0203 | −0.1310 | 0.4000 |
| 11 | Suction-Side | 0.0294 | −0.1367 | 0.4000 |
| 12 | Suction-Side | 0.0386 | −0.1419 | 0.4000 |
| 13 | Suction-Side | 0.0481 | −0.1468 | 0.4000 |
| 14 | Suction-Side | 0.0577 | −0.1513 | 0.4000 |
| 15 | Suction-Side | 0.0676 | −0.1553 | 0.4000 |
| 16 | Suction-Side | 0.0775 | −0.1591 | 0.4000 |
| 17 | Suction-Side | 0.0876 | −0.1624 | 0.4000 |
| 18 | Suction-Side | 0.0979 | −0.1654 | 0.4000 |
| 19 | Suction-Side | 0.1082 | −0.1679 | 0.4000 |
| 20 | Suction-Side | 0.1186 | −0.1702 | 0.4000 |
| 21 | Suction-Side | 0.1291 | −0.1720 | 0.4000 |
| 22 | Suction-Side | 0.1396 | −0.1734 | 0.4000 |
| 23 | Suction-Side | 0.1502 | −0.1745 | 0.4000 |
| 24 | Suction-Side | 0.1608 | −0.1751 | 0.4000 |
| 25 | Suction-Side | 0.1715 | −0.1754 | 0.4000 |
| 26 | Suction-Side | 0.1821 | −0.1752 | 0.4000 |
| 27 | Suction-Side | 0.1927 | −0.1747 | 0.4000 |
| 28 | Suction-Side | 0.2033 | −0.1737 | 0.4000 |
| 29 | Suction-Side | 0.2139 | −0.1723 | 0.4000 |
| 30 | Suction-Side | 0.2244 | −0.1705 | 0.4000 |
| 31 | Suction-Side | 0.2348 | −0.1683 | 0.4000 |
| 32 | Suction-Side | 0.2451 | −0.1657 | 0.4000 |
| 33 | Suction-Side | 0.2553 | −0.1627 | 0.4000 |
| 34 | Suction-Side | 0.2654 | −0.1593 | 0.4000 |
| 35 | Suction-Side | 0.2754 | −0.1556 | 0.4000 |
| 36 | Suction-Side | 0.2852 | −0.1514 | 0.4000 |
| 37 | Suction-Side | 0.2948 | −0.1470 | 0.4000 |
| 38 | Suction-Side | 0.3043 | −0.1421 | 0.4000 |
| 39 | Suction-Side | 0.3136 | −0.1370 | 0.4000 |
| 40 | Suction-Side | 0.3228 | −0.1316 | 0.4000 |
| 41 | Suction-Side | 0.3317 | −0.1258 | 0.4000 |
| 42 | Suction-Side | 0.3405 | −0.1198 | 0.4000 |
| 43 | Suction-Side | 0.3491 | −0.1135 | 0.4000 |
| 44 | Suction-Side | 0.3575 | −0.1070 | 0.4000 |
| 45 | Suction-Side | 0.3657 | −0.1003 | 0.4000 |
| 46 | Suction-Side | 0.3738 | −0.0933 | 0.4000 |
| 47 | Suction-Side | 0.3817 | −0.0861 | 0.4000 |
| 48 | Suction-Side | 0.3894 | −0.0788 | 0.4000 |
| 49 | Suction-Side | 0.3969 | −0.0713 | 0.4000 |
| 50 | Suction-Side | 0.4043 | −0.0636 | 0.4000 |
| 51 | Suction-Side | 0.4115 | −0.0558 | 0.4000 |
| 52 | Suction-Side | 0.4185 | −0.0478 | 0.4000 |
| 53 | Suction-Side | 0.4255 | −0.0397 | 0.4000 |
| 54 | Suction-Side | 0.4322 | −0.0315 | 0.4000 |
| 55 | Suction-Side | 0.4389 | −0.0232 | 0.4000 |
| 56 | Suction-Side | 0.4454 | −0.0148 | 0.4000 |
| 57 | Suction-Side | 0.4518 | −0.0063 | 0.4000 |
| 58 | Suction-Side | 0.4580 | 0.0023 | 0.4000 |
| 59 | Suction-Side | 0.4642 | 0.0110 | 0.4000 |
| 60 | Suction-Side | 0.4702 | 0.0198 | 0.4000 |
| 61 | Suction-Side | 0.4762 | 0.0286 | 0.4000 |
| 62 | Suction-Side | 0.4820 | 0.0375 | 0.4000 |
| 63 | Suction-Side | 0.4878 | 0.0464 | 0.4000 |
| 64 | Suction-Side | 0.4935 | 0.0554 | 0.4000 |
| 65 | Suction-Side | 0.4991 | 0.0645 | 0.4000 |
| 66 | Suction-Side | 0.5046 | 0.0736 | 0.4000 |
| 67 | Suction-Side | 0.5100 | 0.0827 | 0.4000 |
| 68 | Suction-Side | 0.5154 | 0.0919 | 0.4000 |
| 69 | Suction-Side | 0.5207 | 0.1012 | 0.4000 |
| 70 | Suction-Side | 0.5259 | 0.1104 | 0.4000 |
| 71 | Suction-Side | 0.5311 | 0.1197 | 0.4000 |
| 72 | Suction-Side | 0.5362 | 0.1291 | 0.4000 |
| 73 | Suction-Side | 0.5412 | 0.1384 | 0.4000 |
| 74 | Suction-Side | 0.5462 | 0.1478 | 0.4000 |
| 75 | Suction-Side | 0.5512 | 0.1572 | 0.4000 |
| 76 | Suction-Side | 0.5561 | 0.1667 | 0.4000 |
| 77 | Suction-Side | 0.5610 | 0.1761 | 0.4000 |
| 78 | Suction-Side | 0.5658 | 0.1856 | 0.4000 |
| 79 | Suction-Side | 0.5705 | 0.1951 | 0.4000 |
| 80 | Suction-Side | 0.5753 | 0.2047 | 0.4000 |
| 81 | Suction-Side | 0.5800 | 0.2142 | 0.4000 |
| 82 | Suction-Side | 0.5846 | 0.2238 | 0.4000 |
| 83 | Suction-Side | 0.5893 | 0.2334 | 0.4000 |
| 84 | Suction-Side | 0.5939 | 0.2430 | 0.4000 |
| 85 | Suction-Side | 0.5984 | 0.2526 | 0.4000 |
| 86 | Suction-Side | 0.6029 | 0.2622 | 0.4000 |
| 87 | Suction-Side | 0.6074 | 0.2719 | 0.4000 |
| 88 | Suction-Side | 0.6118 | 0.2816 | 0.4000 |
| 89 | Suction-Side | 0.6162 | 0.2912 | 0.4000 |
| 90 | Suction-Side | 0.6206 | 0.3009 | 0.4000 |
| 91 | Suction-Side | 0.6250 | 0.3107 | 0.4000 |
| 92 | Suction-Side | 0.6293 | 0.3204 | 0.4000 |
| 93 | Suction-Side | 0.6336 | 0.3301 | 0.4000 |
| 94 | Suction-Side | 0.6379 | 0.3398 | 0.4000 |
| 95 | Suction-Side | 0.6422 | 0.3496 | 0.4000 |
| 96 | Suction-Side | 0.6452 | 0.3565 | 0.4000 |
| 97 | Suction-Side | 0.6461 | 0.3605 | 0.4000 |
| 98 | Suction-Side | 0.6453 | 0.3645 | 0.4000 |
| 99 | Suction-Side | 0.6431 | 0.3680 | 0.4000 |
| 100 | Suction-Side | 0.6398 | 0.3703 | 0.4000 |
| 101 | Pressure-Side | −0.0340 | −0.0566 | 0.4000 |
| 102 | Pressure-Side | −0.0327 | −0.0479 | 0.4000 |
| 103 | Pressure-Side | −0.0297 | −0.0396 | 0.4000 |
| 104 | Pressure-Side | −0.0252 | −0.0320 | 0.4000 |
| 105 | Pressure-Side | −0.0192 | −0.0255 | 0.4000 |
| 106 | Pressure-Side | −0.0121 | −0.0203 | 0.4000 |
| 107 | Pressure-Side | −0.0042 | −0.0162 | 0.4000 |
| 108 | Pressure-Side | 0.0041 | −0.0132 | 0.4000 |
| 109 | Pressure-Side | 0.0126 | −0.0110 | 0.4000 |
| 110 | Pressure-Side | 0.0213 | −0.0093 | 0.4000 |
| 111 | Pressure-Side | 0.0301 | −0.0080 | 0.4000 |
| 112 | Pressure-Side | 0.0388 | −0.0070 | 0.4000 |
| 113 | Pressure-Side | 0.0476 | −0.0063 | 0.4000 |
| 114 | Pressure-Side | 0.0565 | −0.0056 | 0.4000 |
| 115 | Pressure-Side | 0.0653 | −0.0051 | 0.4000 |
| 116 | Pressure-Side | 0.0741 | −0.0046 | 0.4000 |
| 117 | Pressure-Side | 0.0829 | −0.0041 | 0.4000 |
| 118 | Pressure-Side | 0.0918 | −0.0037 | 0.4000 |
| 119 | Pressure-Side | 0.1006 | −0.0032 | 0.4000 |
| 120 | Pressure-Side | 0.1094 | −0.0026 | 0.4000 |
| 121 | Pressure-Side | 0.1182 | −0.0021 | 0.4000 |
| 122 | Pressure-Side | 0.1271 | −0.0014 | 0.4000 |
| 123 | Pressure-Side | 0.1359 | −0.0006 | 0.4000 |
| 124 | Pressure-Side | 0.1447 | 0.0002 | 0.4000 |
| 125 | Pressure-Side | 0.1534 | 0.0012 | 0.4000 |
| 126 | Pressure-Side | 0.1622 | 0.0022 | 0.4000 |
| 127 | Pressure-Side | 0.1710 | 0.0034 | 0.4000 |
| 128 | Pressure-Side | 0.1797 | 0.0047 | 0.4000 |
| 129 | Pressure-Side | 0.1885 | 0.0062 | 0.4000 |
| 130 | Pressure-Side | 0.1971 | 0.0077 | 0.4000 |
| 131 | Pressure-Side | 0.2058 | 0.0095 | 0.4000 |
| 132 | Pressure-Side | 0.2145 | 0.0113 | 0.4000 |
| 133 | Pressure-Side | 0.2231 | 0.0133 | 0.4000 |

TABLE I-continued

Non-Dimensionalized (X Y Z/Span Height)

| N | Location | X | Y | Z |
|---|---|---|---|---|
| 134 | Pressure-Side | 0.2316 | 0.0155 | 0.4000 |
| 135 | Pressure-Side | 0.2402 | 0.0178 | 0.4000 |
| 136 | Pressure-Side | 0.2487 | 0.0203 | 0.4000 |
| 137 | Pressure-Side | 0.2571 | 0.0229 | 0.4000 |
| 138 | Pressure-Side | 0.2655 | 0.0257 | 0.4000 |
| 139 | Pressure-Side | 0.2738 | 0.0287 | 0.4000 |
| 140 | Pressure-Side | 0.2821 | 0.0318 | 0.4000 |
| 141 | Pressure-Side | 0.2903 | 0.0351 | 0.4000 |
| 142 | Pressure-Side | 0.2984 | 0.0385 | 0.4000 |
| 143 | Pressure-Side | 0.3065 | 0.0421 | 0.4000 |
| 144 | Pressure-Side | 0.3145 | 0.0459 | 0.4000 |
| 145 | Pressure-Side | 0.3225 | 0.0498 | 0.4000 |
| 146 | Pressure-Side | 0.3303 | 0.0538 | 0.4000 |
| 147 | Pressure-Side | 0.3381 | 0.0580 | 0.4000 |
| 148 | Pressure-Side | 0.3458 | 0.0624 | 0.4000 |
| 149 | Pressure-Side | 0.3534 | 0.0669 | 0.4000 |
| 150 | Pressure-Side | 0.3609 | 0.0715 | 0.4000 |
| 151 | Pressure-Side | 0.3684 | 0.0762 | 0.4000 |
| 152 | Pressure-Side | 0.3757 | 0.0811 | 0.4000 |
| 153 | Pressure-Side | 0.3830 | 0.0862 | 0.4000 |
| 154 | Pressure-Side | 0.3902 | 0.0913 | 0.4000 |
| 155 | Pressure-Side | 0.3973 | 0.0966 | 0.4000 |
| 156 | Pressure-Side | 0.4043 | 0.1020 | 0.4000 |
| 157 | Pressure-Side | 0.4112 | 0.1075 | 0.4000 |
| 158 | Pressure-Side | 0.4181 | 0.1131 | 0.4000 |
| 159 | Pressure-Side | 0.4248 | 0.1188 | 0.4000 |
| 160 | Pressure-Side | 0.4315 | 0.1246 | 0.4000 |
| 161 | Pressure-Side | 0.4381 | 0.1305 | 0.4000 |
| 162 | Pressure-Side | 0.4446 | 0.1365 | 0.4000 |
| 163 | Pressure-Side | 0.4510 | 0.1426 | 0.4000 |
| 164 | Pressure-Side | 0.4573 | 0.1488 | 0.4000 |
| 165 | Pressure-Side | 0.4636 | 0.1550 | 0.4000 |
| 166 | Pressure-Side | 0.4697 | 0.1613 | 0.4000 |
| 167 | Pressure-Side | 0.4759 | 0.1677 | 0.4000 |
| 168 | Pressure-Side | 0.4819 | 0.1742 | 0.4000 |
| 169 | Pressure-Side | 0.4878 | 0.1807 | 0.4000 |
| 170 | Pressure-Side | 0.4937 | 0.1873 | 0.4000 |
| 171 | Pressure-Side | 0.4996 | 0.1939 | 0.4000 |
| 172 | Pressure-Side | 0.5053 | 0.2006 | 0.4000 |
| 173 | Pressure-Side | 0.5110 | 0.2074 | 0.4000 |
| 174 | Pressure-Side | 0.5167 | 0.2142 | 0.4000 |
| 175 | Pressure-Side | 0.5223 | 0.2210 | 0.4000 |
| 176 | Pressure-Side | 0.5278 | 0.2279 | 0.4000 |
| 177 | Pressure-Side | 0.5333 | 0.2349 | 0.4000 |
| 178 | Pressure-Side | 0.5387 | 0.2419 | 0.4000 |
| 179 | Pressure-Side | 0.5441 | 0.2489 | 0.4000 |
| 180 | Pressure-Side | 0.5494 | 0.2559 | 0.4000 |
| 181 | Pressure-Side | 0.5547 | 0.2630 | 0.4000 |
| 182 | Pressure-Side | 0.5600 | 0.2701 | 0.4000 |
| 183 | Pressure-Side | 0.5652 | 0.2773 | 0.4000 |
| 184 | Pressure-Side | 0.5704 | 0.2844 | 0.4000 |
| 185 | Pressure-Side | 0.5755 | 0.2916 | 0.4000 |
| 186 | Pressure-Side | 0.5806 | 0.2988 | 0.4000 |
| 187 | Pressure-Side | 0.5857 | 0.3060 | 0.4000 |
| 188 | Pressure-Side | 0.5908 | 0.3133 | 0.4000 |
| 189 | Pressure-Side | 0.5958 | 0.3206 | 0.4000 |
| 190 | Pressure-Side | 0.6008 | 0.3278 | 0.4000 |
| 191 | Pressure-Side | 0.6058 | 0.3351 | 0.4000 |
| 192 | Pressure-Side | 0.6108 | 0.3425 | 0.4000 |
| 193 | Pressure-Side | 0.6157 | 0.3498 | 0.4000 |
| 194 | Pressure-Side | 0.6207 | 0.3571 | 0.4000 |
| 195 | Pressure-Side | 0.6256 | 0.3645 | 0.4000 |
| 196 | Pressure-Side | 0.6281 | 0.3679 | 0.4000 |
| 197 | Pressure-Side | 0.6306 | 0.3698 | 0.4000 |
| 198 | Pressure-Side | 0.6335 | 0.3709 | 0.4000 |
| 199 | Pressure-Side | 0.6367 | 0.3711 | 0.4000 |
| 200 | Pressure-Side | 0.6398 | 0.3703 | 0.4000 |
| 1 | Suction-Side | −0.0424 | −0.0715 | 0.5000 |
| 2 | Suction-Side | −0.0412 | −0.0823 | 0.5000 |
| 3 | Suction-Side | −0.0378 | −0.0927 | 0.5000 |
| 4 | Suction-Side | −0.0327 | −0.1023 | 0.5000 |
| 5 | Suction-Side | −0.0265 | −0.1112 | 0.5000 |
| 6 | Suction-Side | −0.0194 | −0.1195 | 0.5000 |
| 7 | Suction-Side | −0.0117 | −0.1272 | 0.5000 |
| 8 | Suction-Side | −0.0035 | −0.1344 | 0.5000 |
| 9 | Suction-Side | 0.0051 | −0.1410 | 0.5000 |
| 10 | Suction-Side | 0.0141 | −0.1473 | 0.5000 |
| 11 | Suction-Side | 0.0233 | −0.1530 | 0.5000 |
| 12 | Suction-Side | 0.0328 | −0.1584 | 0.5000 |
| 13 | Suction-Side | 0.0425 | −0.1633 | 0.5000 |
| 14 | Suction-Side | 0.0524 | −0.1679 | 0.5000 |
| 15 | Suction-Side | 0.0625 | −0.1721 | 0.5000 |
| 16 | Suction-Side | 0.0727 | −0.1759 | 0.5000 |
| 17 | Suction-Side | 0.0830 | −0.1793 | 0.5000 |
| 18 | Suction-Side | 0.0935 | −0.1823 | 0.5000 |
| 19 | Suction-Side | 0.1041 | −0.1850 | 0.5000 |
| 20 | Suction-Side | 0.1147 | −0.1872 | 0.5000 |
| 21 | Suction-Side | 0.1255 | −0.1891 | 0.5000 |
| 22 | Suction-Side | 0.1363 | −0.1906 | 0.5000 |
| 23 | Suction-Side | 0.1471 | −0.1916 | 0.5000 |
| 24 | Suction-Side | 0.1580 | −0.1923 | 0.5000 |
| 25 | Suction-Side | 0.1689 | −0.1925 | 0.5000 |
| 26 | Suction-Side | 0.1798 | −0.1923 | 0.5000 |
| 27 | Suction-Side | 0.1906 | −0.1917 | 0.5000 |
| 28 | Suction-Side | 0.2015 | −0.1906 | 0.5000 |
| 29 | Suction-Side | 0.2123 | −0.1892 | 0.5000 |
| 30 | Suction-Side | 0.2230 | −0.1873 | 0.5000 |
| 31 | Suction-Side | 0.2337 | −0.1849 | 0.5000 |
| 32 | Suction-Side | 0.2442 | −0.1822 | 0.5000 |
| 33 | Suction-Side | 0.2546 | −0.1790 | 0.5000 |
| 34 | Suction-Side | 0.2649 | −0.1755 | 0.5000 |
| 35 | Suction-Side | 0.2751 | −0.1715 | 0.5000 |
| 36 | Suction-Side | 0.2851 | −0.1672 | 0.5000 |
| 37 | Suction-Side | 0.2949 | −0.1625 | 0.5000 |
| 38 | Suction-Side | 0.3046 | −0.1574 | 0.5000 |
| 39 | Suction-Side | 0.3141 | −0.1521 | 0.5000 |
| 40 | Suction-Side | 0.3233 | −0.1464 | 0.5000 |
| 41 | Suction-Side | 0.3324 | −0.1404 | 0.5000 |
| 42 | Suction-Side | 0.3413 | −0.1341 | 0.5000 |
| 43 | Suction-Side | 0.3501 | −0.1276 | 0.5000 |
| 44 | Suction-Side | 0.3586 | −0.1208 | 0.5000 |
| 45 | Suction-Side | 0.3669 | −0.1138 | 0.5000 |
| 46 | Suction-Side | 0.3751 | −0.1065 | 0.5000 |
| 47 | Suction-Side | 0.3831 | −0.0991 | 0.5000 |
| 48 | Suction-Side | 0.3909 | −0.0915 | 0.5000 |
| 49 | Suction-Side | 0.3985 | −0.0837 | 0.5000 |
| 50 | Suction-Side | 0.4059 | −0.0758 | 0.5000 |
| 51 | Suction-Side | 0.4132 | −0.0677 | 0.5000 |
| 52 | Suction-Side | 0.4204 | −0.0594 | 0.5000 |
| 53 | Suction-Side | 0.4274 | −0.0511 | 0.5000 |
| 54 | Suction-Side | 0.4342 | −0.0426 | 0.5000 |
| 55 | Suction-Side | 0.4409 | −0.0340 | 0.5000 |
| 56 | Suction-Side | 0.4475 | −0.0254 | 0.5000 |
| 57 | Suction-Side | 0.4540 | −0.0166 | 0.5000 |
| 58 | Suction-Side | 0.4603 | −0.0077 | 0.5000 |
| 59 | Suction-Side | 0.4666 | 0.0012 | 0.5000 |
| 60 | Suction-Side | 0.4727 | 0.0102 | 0.5000 |
| 61 | Suction-Side | 0.4787 | 0.0193 | 0.5000 |
| 62 | Suction-Side | 0.4846 | 0.0285 | 0.5000 |
| 63 | Suction-Side | 0.4904 | 0.0377 | 0.5000 |
| 64 | Suction-Side | 0.4962 | 0.0470 | 0.5000 |
| 65 | Suction-Side | 0.5018 | 0.0563 | 0.5000 |
| 66 | Suction-Side | 0.5074 | 0.0656 | 0.5000 |
| 67 | Suction-Side | 0.5129 | 0.0751 | 0.5000 |
| 68 | Suction-Side | 0.5183 | 0.0845 | 0.5000 |
| 69 | Suction-Side | 0.5237 | 0.0940 | 0.5000 |
| 70 | Suction-Side | 0.5289 | 0.1035 | 0.5000 |
| 71 | Suction-Side | 0.5342 | 0.1131 | 0.5000 |
| 72 | Suction-Side | 0.5393 | 0.1227 | 0.5000 |
| 73 | Suction-Side | 0.5444 | 0.1323 | 0.5000 |
| 74 | Suction-Side | 0.5495 | 0.1420 | 0.5000 |
| 75 | Suction-Side | 0.5545 | 0.1517 | 0.5000 |
| 76 | Suction-Side | 0.5594 | 0.1614 | 0.5000 |
| 77 | Suction-Side | 0.5643 | 0.1711 | 0.5000 |
| 78 | Suction-Side | 0.5692 | 0.1809 | 0.5000 |
| 79 | Suction-Side | 0.5740 | 0.1906 | 0.5000 |
| 80 | Suction-Side | 0.5787 | 0.2005 | 0.5000 |
| 81 | Suction-Side | 0.5835 | 0.2103 | 0.5000 |
| 82 | Suction-Side | 0.5881 | 0.2201 | 0.5000 |
| 83 | Suction-Side | 0.5928 | 0.2300 | 0.5000 |
| 84 | Suction-Side | 0.5974 | 0.2398 | 0.5000 |
| 85 | Suction-Side | 0.6020 | 0.2497 | 0.5000 |

TABLE I-continued

Non-Dimensionalized (X Y Z/Span Height)

| N | Location | X | Y | Z |
|---|---|---|---|---|
| 86 | Suction-Side | 0.6065 | 0.2596 | 0.5000 |
| 87 | Suction-Side | 0.6110 | 0.2696 | 0.5000 |
| 88 | Suction-Side | 0.6155 | 0.2795 | 0.5000 |
| 89 | Suction-Side | 0.6199 | 0.2895 | 0.5000 |
| 90 | Suction-Side | 0.6243 | 0.2994 | 0.5000 |
| 91 | Suction-Side | 0.6287 | 0.3094 | 0.5000 |
| 92 | Suction-Side | 0.6330 | 0.3194 | 0.5000 |
| 93 | Suction-Side | 0.6373 | 0.3294 | 0.5000 |
| 94 | Suction-Side | 0.6416 | 0.3394 | 0.5000 |
| 95 | Suction-Side | 0.6459 | 0.3494 | 0.5000 |
| 96 | Suction-Side | 0.6490 | 0.3566 | 0.5000 |
| 97 | Suction-Side | 0.6498 | 0.3604 | 0.5000 |
| 98 | Suction-Side | 0.6491 | 0.3644 | 0.5000 |
| 99 | Suction-Side | 0.6470 | 0.3677 | 0.5000 |
| 100 | Suction-Side | 0.6438 | 0.3701 | 0.5000 |
| 101 | Pressure-Side | −0.0424 | −0.0715 | 0.5000 |
| 102 | Pressure-Side | −0.0413 | −0.0626 | 0.5000 |
| 103 | Pressure-Side | −0.0383 | −0.0540 | 0.5000 |
| 104 | Pressure-Side | −0.0337 | −0.0463 | 0.5000 |
| 105 | Pressure-Side | −0.0276 | −0.0396 | 0.5000 |
| 106 | Pressure-Side | −0.0203 | −0.0342 | 0.5000 |
| 107 | Pressure-Side | −0.0122 | −0.0301 | 0.5000 |
| 108 | Pressure-Side | −0.0037 | −0.0269 | 0.5000 |
| 109 | Pressure-Side | 0.0050 | −0.0245 | 0.5000 |
| 110 | Pressure-Side | 0.0139 | −0.0227 | 0.5000 |
| 111 | Pressure-Side | 0.0228 | −0.0213 | 0.5000 |
| 112 | Pressure-Side | 0.0318 | −0.0202 | 0.5000 |
| 113 | Pressure-Side | 0.0408 | −0.0193 | 0.5000 |
| 114 | Pressure-Side | 0.0498 | −0.0185 | 0.5000 |
| 115 | Pressure-Side | 0.0589 | −0.0179 | 0.5000 |
| 116 | Pressure-Side | 0.0679 | −0.0173 | 0.5000 |
| 117 | Pressure-Side | 0.0770 | −0.0168 | 0.5000 |
| 118 | Pressure-Side | 0.0860 | −0.0163 | 0.5000 |
| 119 | Pressure-Side | 0.0950 | −0.0157 | 0.5000 |
| 120 | Pressure-Side | 0.1041 | −0.0151 | 0.5000 |
| 121 | Pressure-Side | 0.1131 | −0.0145 | 0.5000 |
| 122 | Pressure-Side | 0.1221 | −0.0138 | 0.5000 |
| 123 | Pressure-Side | 0.1312 | −0.0130 | 0.5000 |
| 124 | Pressure-Side | 0.1402 | −0.0122 | 0.5000 |
| 125 | Pressure-Side | 0.1492 | −0.0112 | 0.5000 |
| 126 | Pressure-Side | 0.1582 | −0.0101 | 0.5000 |
| 127 | Pressure-Side | 0.1672 | −0.0090 | 0.5000 |
| 128 | Pressure-Side | 0.1761 | −0.0076 | 0.5000 |
| 129 | Pressure-Side | 0.1851 | −0.0062 | 0.5000 |
| 130 | Pressure-Side | 0.1940 | −0.0046 | 0.5000 |
| 131 | Pressure-Side | 0.2029 | −0.0029 | 0.5000 |
| 132 | Pressure-Side | 0.2117 | −0.0010 | 0.5000 |
| 133 | Pressure-Side | 0.2206 | 0.0010 | 0.5000 |
| 134 | Pressure-Side | 0.2294 | 0.0032 | 0.5000 |
| 135 | Pressure-Side | 0.2381 | 0.0056 | 0.5000 |
| 136 | Pressure-Side | 0.2468 | 0.0081 | 0.5000 |
| 137 | Pressure-Side | 0.2555 | 0.0108 | 0.5000 |
| 138 | Pressure-Side | 0.2640 | 0.0137 | 0.5000 |
| 139 | Pressure-Side | 0.2726 | 0.0167 | 0.5000 |
| 140 | Pressure-Side | 0.2811 | 0.0199 | 0.5000 |
| 141 | Pressure-Side | 0.2895 | 0.0233 | 0.5000 |
| 142 | Pressure-Side | 0.2978 | 0.0268 | 0.5000 |
| 143 | Pressure-Side | 0.3061 | 0.0305 | 0.5000 |
| 144 | Pressure-Side | 0.3143 | 0.0344 | 0.5000 |
| 145 | Pressure-Side | 0.3224 | 0.0384 | 0.5000 |
| 146 | Pressure-Side | 0.3304 | 0.0426 | 0.5000 |
| 147 | Pressure-Side | 0.3383 | 0.0470 | 0.5000 |
| 148 | Pressure-Side | 0.3462 | 0.0515 | 0.5000 |
| 149 | Pressure-Side | 0.3539 | 0.0562 | 0.5000 |
| 150 | Pressure-Side | 0.3616 | 0.0610 | 0.5000 |
| 151 | Pressure-Side | 0.3692 | 0.0660 | 0.5000 |
| 152 | Pressure-Side | 0.3767 | 0.0711 | 0.5000 |
| 153 | Pressure-Side | 0.3841 | 0.0763 | 0.5000 |
| 154 | Pressure-Side | 0.3913 | 0.0817 | 0.5000 |
| 155 | Pressure-Side | 0.3986 | 0.0872 | 0.5000 |
| 156 | Pressure-Side | 0.4057 | 0.0928 | 0.5000 |
| 157 | Pressure-Side | 0.4127 | 0.0985 | 0.5000 |
| 158 | Pressure-Side | 0.4196 | 0.1044 | 0.5000 |
| 159 | Pressure-Side | 0.4264 | 0.1103 | 0.5000 |
| 160 | Pressure-Side | 0.4332 | 0.1164 | 0.5000 |
| 161 | Pressure-Side | 0.4398 | 0.1225 | 0.5000 |
| 162 | Pressure-Side | 0.4464 | 0.1287 | 0.5000 |
| 163 | Pressure-Side | 0.4529 | 0.1351 | 0.5000 |
| 164 | Pressure-Side | 0.4593 | 0.1415 | 0.5000 |
| 165 | Pressure-Side | 0.4656 | 0.1480 | 0.5000 |
| 166 | Pressure-Side | 0.4719 | 0.1545 | 0.5000 |
| 167 | Pressure-Side | 0.4780 | 0.1611 | 0.5000 |
| 168 | Pressure-Side | 0.4841 | 0.1678 | 0.5000 |
| 169 | Pressure-Side | 0.4902 | 0.1746 | 0.5000 |
| 170 | Pressure-Side | 0.4961 | 0.1814 | 0.5000 |
| 171 | Pressure-Side | 0.5020 | 0.1883 | 0.5000 |
| 172 | Pressure-Side | 0.5078 | 0.1953 | 0.5000 |
| 173 | Pressure-Side | 0.5136 | 0.2023 | 0.5000 |
| 174 | Pressure-Side | 0.5193 | 0.2093 | 0.5000 |
| 175 | Pressure-Side | 0.5249 | 0.2164 | 0.5000 |
| 176 | Pressure-Side | 0.5305 | 0.2235 | 0.5000 |
| 177 | Pressure-Side | 0.5361 | 0.2307 | 0.5000 |
| 178 | Pressure-Side | 0.5415 | 0.2379 | 0.5000 |
| 179 | Pressure-Side | 0.5470 | 0.2451 | 0.5000 |
| 180 | Pressure-Side | 0.5524 | 0.2524 | 0.5000 |
| 181 | Pressure-Side | 0.5577 | 0.2597 | 0.5000 |
| 182 | Pressure-Side | 0.5630 | 0.2671 | 0.5000 |
| 183 | Pressure-Side | 0.5683 | 0.2744 | 0.5000 |
| 184 | Pressure-Side | 0.5735 | 0.2818 | 0.5000 |
| 185 | Pressure-Side | 0.5787 | 0.2892 | 0.5000 |
| 186 | Pressure-Side | 0.5839 | 0.2967 | 0.5000 |
| 187 | Pressure-Side | 0.5890 | 0.3041 | 0.5000 |
| 188 | Pressure-Side | 0.5942 | 0.3116 | 0.5000 |
| 189 | Pressure-Side | 0.5992 | 0.3191 | 0.5000 |
| 190 | Pressure-Side | 0.6043 | 0.3266 | 0.5000 |
| 191 | Pressure-Side | 0.6094 | 0.3341 | 0.5000 |
| 192 | Pressure-Side | 0.6144 | 0.3417 | 0.5000 |
| 193 | Pressure-Side | 0.6194 | 0.3492 | 0.5000 |
| 194 | Pressure-Side | 0.6243 | 0.3568 | 0.5000 |
| 195 | Pressure-Side | 0.6293 | 0.3644 | 0.5000 |
| 196 | Pressure-Side | 0.6318 | 0.3679 | 0.5000 |
| 197 | Pressure-Side | 0.6344 | 0.3699 | 0.5000 |
| 198 | Pressure-Side | 0.6375 | 0.3709 | 0.5000 |
| 199 | Pressure-Side | 0.6407 | 0.3710 | 0.5000 |
| 200 | Pressure-Side | 0.6438 | 0.3701 | 0.5000 |
| 1 | Suction-Side | −0.0509 | −0.0847 | 0.6000 |
| 2 | Suction-Side | −0.0499 | −0.0958 | 0.6000 |
| 3 | Suction-Side | −0.0465 | −0.1064 | 0.6000 |
| 4 | Suction-Side | −0.0414 | −0.1164 | 0.6000 |
| 5 | Suction-Side | −0.0351 | −0.1256 | 0.6000 |
| 6 | Suction-Side | −0.0279 | −0.1341 | 0.6000 |
| 7 | Suction-Side | −0.0200 | −0.1420 | 0.6000 |
| 8 | Suction-Side | −0.0116 | −0.1494 | 0.6000 |
| 9 | Suction-Side | −0.0028 | −0.1562 | 0.6000 |
| 10 | Suction-Side | 0.0064 | −0.1626 | 0.6000 |
| 11 | Suction-Side | 0.0159 | −0.1685 | 0.6000 |
| 12 | Suction-Side | 0.0257 | −0.1740 | 0.6000 |
| 13 | Suction-Side | 0.0356 | −0.1791 | 0.6000 |
| 14 | Suction-Side | 0.0458 | −0.1837 | 0.6000 |
| 15 | Suction-Side | 0.0561 | −0.1880 | 0.6000 |
| 16 | Suction-Side | 0.0665 | −0.1919 | 0.6000 |
| 17 | Suction-Side | 0.0772 | −0.1954 | 0.6000 |
| 18 | Suction-Side | 0.0879 | −0.1985 | 0.6000 |
| 19 | Suction-Side | 0.0987 | −0.2012 | 0.6000 |
| 20 | Suction-Side | 0.1097 | −0.2036 | 0.6000 |
| 21 | Suction-Side | 0.1207 | −0.2055 | 0.6000 |
| 22 | Suction-Side | 0.1317 | −0.2070 | 0.6000 |
| 23 | Suction-Side | 0.1429 | −0.2081 | 0.6000 |
| 24 | Suction-Side | 0.1540 | −0.2088 | 0.6000 |
| 25 | Suction-Side | 0.1652 | −0.2090 | 0.6000 |
| 26 | Suction-Side | 0.1764 | −0.2088 | 0.6000 |
| 27 | Suction-Side | 0.1875 | −0.2082 | 0.6000 |
| 28 | Suction-Side | 0.1987 | −0.2071 | 0.6000 |
| 29 | Suction-Side | 0.2097 | −0.2055 | 0.6000 |
| 30 | Suction-Side | 0.2207 | −0.2036 | 0.6000 |
| 31 | Suction-Side | 0.2316 | −0.2011 | 0.6000 |
| 32 | Suction-Side | 0.2424 | −0.1983 | 0.6000 |
| 33 | Suction-Side | 0.2531 | −0.1950 | 0.6000 |
| 34 | Suction-Side | 0.2636 | −0.1912 | 0.6000 |
| 35 | Suction-Side | 0.2740 | −0.1871 | 0.6000 |
| 36 | Suction-Side | 0.2842 | −0.1826 | 0.6000 |
| 37 | Suction-Side | 0.2943 | −0.1777 | 0.6000 |

TABLE I-continued

Non-Dimensionalized (X Y Z/Span Height)

| N | Location | X | Y | Z |
|---|---|---|---|---|
| 38 | Suction-Side | 0.3041 | −0.1724 | 0.6000 |
| 39 | Suction-Side | 0.3138 | −0.1668 | 0.6000 |
| 40 | Suction-Side | 0.3233 | −0.1608 | 0.6000 |
| 41 | Suction-Side | 0.3325 | −0.1546 | 0.6000 |
| 42 | Suction-Side | 0.3416 | −0.1481 | 0.6000 |
| 43 | Suction-Side | 0.3505 | −0.1412 | 0.6000 |
| 44 | Suction-Side | 0.3591 | −0.1342 | 0.6000 |
| 45 | Suction-Side | 0.3676 | −0.1269 | 0.6000 |
| 46 | Suction-Side | 0.3759 | −0.1194 | 0.6000 |
| 47 | Suction-Side | 0.3840 | −0.1117 | 0.6000 |
| 48 | Suction-Side | 0.3919 | −0.1038 | 0.6000 |
| 49 | Suction-Side | 0.3996 | −0.0957 | 0.6000 |
| 50 | Suction-Side | 0.4072 | −0.0875 | 0.6000 |
| 51 | Suction-Side | 0.4145 | −0.0791 | 0.6000 |
| 52 | Suction-Side | 0.4218 | −0.0706 | 0.6000 |
| 53 | Suction-Side | 0.4289 | −0.0619 | 0.6000 |
| 54 | Suction-Side | 0.4358 | −0.0532 | 0.6000 |
| 55 | Suction-Side | 0.4426 | −0.0443 | 0.6000 |
| 56 | Suction-Side | 0.4493 | −0.0353 | 0.6000 |
| 57 | Suction-Side | 0.4558 | −0.0263 | 0.6000 |
| 58 | Suction-Side | 0.4623 | −0.0171 | 0.6000 |
| 59 | Suction-Side | 0.4686 | −0.0079 | 0.6000 |
| 60 | Suction-Side | 0.4748 | 0.0014 | 0.6000 |
| 61 | Suction-Side | 0.4809 | 0.0108 | 0.6000 |
| 62 | Suction-Side | 0.4869 | 0.0202 | 0.6000 |
| 63 | Suction-Side | 0.4928 | 0.0297 | 0.6000 |
| 64 | Suction-Side | 0.4986 | 0.0392 | 0.6000 |
| 65 | Suction-Side | 0.5043 | 0.0488 | 0.6000 |
| 66 | Suction-Side | 0.5099 | 0.0585 | 0.6000 |
| 67 | Suction-Side | 0.5155 | 0.0682 | 0.6000 |
| 68 | Suction-Side | 0.5210 | 0.0779 | 0.6000 |
| 69 | Suction-Side | 0.5264 | 0.0877 | 0.6000 |
| 70 | Suction-Side | 0.5318 | 0.0975 | 0.6000 |
| 71 | Suction-Side | 0.5371 | 0.1073 | 0.6000 |
| 72 | Suction-Side | 0.5423 | 0.1172 | 0.6000 |
| 73 | Suction-Side | 0.5474 | 0.1271 | 0.6000 |
| 74 | Suction-Side | 0.5526 | 0.1371 | 0.6000 |
| 75 | Suction-Side | 0.5576 | 0.1470 | 0.6000 |
| 76 | Suction-Side | 0.5626 | 0.1570 | 0.6000 |
| 77 | Suction-Side | 0.5676 | 0.1670 | 0.6000 |
| 78 | Suction-Side | 0.5725 | 0.1771 | 0.6000 |
| 79 | Suction-Side | 0.5773 | 0.1871 | 0.6000 |
| 80 | Suction-Side | 0.5821 | 0.1972 | 0.6000 |
| 81 | Suction-Side | 0.5869 | 0.2073 | 0.6000 |
| 82 | Suction-Side | 0.5916 | 0.2175 | 0.6000 |
| 83 | Suction-Side | 0.5963 | 0.2276 | 0.6000 |
| 84 | Suction-Side | 0.6010 | 0.2378 | 0.6000 |
| 85 | Suction-Side | 0.6056 | 0.2480 | 0.6000 |
| 86 | Suction-Side | 0.6101 | 0.2582 | 0.6000 |
| 87 | Suction-Side | 0.6147 | 0.2684 | 0.6000 |
| 88 | Suction-Side | 0.6192 | 0.2786 | 0.6000 |
| 89 | Suction-Side | 0.6236 | 0.2889 | 0.6000 |
| 90 | Suction-Side | 0.6280 | 0.2991 | 0.6000 |
| 91 | Suction-Side | 0.6324 | 0.3094 | 0.6000 |
| 92 | Suction-Side | 0.6368 | 0.3197 | 0.6000 |
| 93 | Suction-Side | 0.6412 | 0.3300 | 0.6000 |
| 94 | Suction-Side | 0.6455 | 0.3403 | 0.6000 |
| 95 | Suction-Side | 0.6498 | 0.3506 | 0.6000 |
| 96 | Suction-Side | 0.6529 | 0.3579 | 0.6000 |
| 97 | Suction-Side | 0.6537 | 0.3617 | 0.6000 |
| 98 | Suction-Side | 0.6531 | 0.3655 | 0.6000 |
| 99 | Suction-Side | 0.6511 | 0.3688 | 0.6000 |
| 100 | Suction-Side | 0.6481 | 0.3712 | 0.6000 |
| 101 | Pressure-Side | −0.0509 | −0.0847 | 0.6000 |
| 102 | Pressure-Side | −0.0496 | −0.0755 | 0.6000 |
| 103 | Pressure-Side | −0.0464 | −0.0669 | 0.6000 |
| 104 | Pressure-Side | −0.0414 | −0.0591 | 0.6000 |
| 105 | Pressure-Side | −0.0349 | −0.0525 | 0.6000 |
| 106 | Pressure-Side | −0.0273 | −0.0473 | 0.6000 |
| 107 | Pressure-Side | −0.0190 | −0.0432 | 0.6000 |
| 108 | Pressure-Side | −0.0103 | −0.0400 | 0.6000 |
| 109 | Pressure-Side | −0.0013 | −0.0376 | 0.6000 |
| 110 | Pressure-Side | 0.0077 | −0.0356 | 0.6000 |
| 111 | Pressure-Side | 0.0169 | −0.0341 | 0.6000 |
| 112 | Pressure-Side | 0.0260 | −0.0328 | 0.6000 |
| 113 | Pressure-Side | 0.0352 | −0.0318 | 0.6000 |
| 114 | Pressure-Side | 0.0445 | −0.0309 | 0.6000 |
| 115 | Pressure-Side | 0.0537 | −0.0301 | 0.6000 |
| 116 | Pressure-Side | 0.0629 | −0.0294 | 0.6000 |
| 117 | Pressure-Side | 0.0722 | −0.0288 | 0.6000 |
| 118 | Pressure-Side | 0.0814 | −0.0281 | 0.6000 |
| 119 | Pressure-Side | 0.0906 | −0.0275 | 0.6000 |
| 120 | Pressure-Side | 0.0999 | −0.0268 | 0.6000 |
| 121 | Pressure-Side | 0.1091 | −0.0260 | 0.6000 |
| 122 | Pressure-Side | 0.1184 | −0.0253 | 0.6000 |
| 123 | Pressure-Side | 0.1276 | −0.0244 | 0.6000 |
| 124 | Pressure-Side | 0.1368 | −0.0235 | 0.6000 |
| 125 | Pressure-Side | 0.1460 | −0.0224 | 0.6000 |
| 126 | Pressure-Side | 0.1552 | −0.0213 | 0.6000 |
| 127 | Pressure-Side | 0.1644 | −0.0201 | 0.6000 |
| 128 | Pressure-Side | 0.1735 | −0.0187 | 0.6000 |
| 129 | Pressure-Side | 0.1827 | −0.0172 | 0.6000 |
| 130 | Pressure-Side | 0.1918 | −0.0155 | 0.6000 |
| 131 | Pressure-Side | 0.2009 | −0.0137 | 0.6000 |
| 132 | Pressure-Side | 0.2099 | −0.0118 | 0.6000 |
| 133 | Pressure-Side | 0.2190 | −0.0097 | 0.6000 |
| 134 | Pressure-Side | 0.2279 | −0.0074 | 0.6000 |
| 135 | Pressure-Side | 0.2369 | −0.0050 | 0.6000 |
| 136 | Pressure-Side | 0.2458 | −0.0024 | 0.6000 |
| 137 | Pressure-Side | 0.2546 | 0.0004 | 0.6000 |
| 138 | Pressure-Side | 0.2634 | 0.0034 | 0.6000 |
| 139 | Pressure-Side | 0.2721 | 0.0065 | 0.6000 |
| 140 | Pressure-Side | 0.2807 | 0.0098 | 0.6000 |
| 141 | Pressure-Side | 0.2893 | 0.0133 | 0.6000 |
| 142 | Pressure-Side | 0.2978 | 0.0170 | 0.6000 |
| 143 | Pressure-Side | 0.3062 | 0.0208 | 0.6000 |
| 144 | Pressure-Side | 0.3146 | 0.0248 | 0.6000 |
| 145 | Pressure-Side | 0.3228 | 0.0290 | 0.6000 |
| 146 | Pressure-Side | 0.3310 | 0.0334 | 0.6000 |
| 147 | Pressure-Side | 0.3391 | 0.0380 | 0.6000 |
| 148 | Pressure-Side | 0.3471 | 0.0427 | 0.6000 |
| 149 | Pressure-Side | 0.3550 | 0.0475 | 0.6000 |
| 150 | Pressure-Side | 0.3627 | 0.0525 | 0.6000 |
| 151 | Pressure-Side | 0.3704 | 0.0577 | 0.6000 |
| 152 | Pressure-Side | 0.3780 | 0.0630 | 0.6000 |
| 153 | Pressure-Side | 0.3855 | 0.0684 | 0.6000 |
| 154 | Pressure-Side | 0.3929 | 0.0740 | 0.6000 |
| 155 | Pressure-Side | 0.4002 | 0.0797 | 0.6000 |
| 156 | Pressure-Side | 0.4074 | 0.0856 | 0.6000 |
| 157 | Pressure-Side | 0.4145 | 0.0915 | 0.6000 |
| 158 | Pressure-Side | 0.4215 | 0.0976 | 0.6000 |
| 159 | Pressure-Side | 0.4284 | 0.1037 | 0.6000 |
| 160 | Pressure-Side | 0.4352 | 0.1100 | 0.6000 |
| 161 | Pressure-Side | 0.4420 | 0.1164 | 0.6000 |
| 162 | Pressure-Side | 0.4486 | 0.1228 | 0.6000 |
| 163 | Pressure-Side | 0.4551 | 0.1294 | 0.6000 |
| 164 | Pressure-Side | 0.4616 | 0.1360 | 0.6000 |
| 165 | Pressure-Side | 0.4680 | 0.1427 | 0.6000 |
| 166 | Pressure-Side | 0.4743 | 0.1495 | 0.6000 |
| 167 | Pressure-Side | 0.4805 | 0.1564 | 0.6000 |
| 168 | Pressure-Side | 0.4867 | 0.1633 | 0.6000 |
| 169 | Pressure-Side | 0.4927 | 0.1703 | 0.6000 |
| 170 | Pressure-Side | 0.4988 | 0.1774 | 0.6000 |
| 171 | Pressure-Side | 0.5047 | 0.1844 | 0.6000 |
| 172 | Pressure-Side | 0.5106 | 0.1916 | 0.6000 |
| 173 | Pressure-Side | 0.5164 | 0.1988 | 0.6000 |
| 174 | Pressure-Side | 0.5222 | 0.2061 | 0.6000 |
| 175 | Pressure-Side | 0.5279 | 0.2134 | 0.6000 |
| 176 | Pressure-Side | 0.5335 | 0.2207 | 0.6000 |
| 177 | Pressure-Side | 0.5391 | 0.2281 | 0.6000 |
| 178 | Pressure-Side | 0.5446 | 0.2355 | 0.6000 |
| 179 | Pressure-Side | 0.5501 | 0.2430 | 0.6000 |
| 180 | Pressure-Side | 0.5556 | 0.2505 | 0.6000 |
| 181 | Pressure-Side | 0.5610 | 0.2580 | 0.6000 |
| 182 | Pressure-Side | 0.5663 | 0.2656 | 0.6000 |
| 183 | Pressure-Side | 0.5717 | 0.2731 | 0.6000 |
| 184 | Pressure-Side | 0.5770 | 0.2807 | 0.6000 |
| 185 | Pressure-Side | 0.5822 | 0.2884 | 0.6000 |
| 186 | Pressure-Side | 0.5874 | 0.2960 | 0.6000 |
| 187 | Pressure-Side | 0.5926 | 0.3037 | 0.6000 |
| 188 | Pressure-Side | 0.5978 | 0.3114 | 0.6000 |
| 189 | Pressure-Side | 0.6029 | 0.3191 | 0.6000 |

TABLE I-continued

Non-Dimensionalized (X Y Z/Span Height)

| N | Location | X | Y | Z |
|---|---|---|---|---|
| 190 | Pressure-Side | 0.6080 | 0.3268 | 0.6000 |
| 191 | Pressure-Side | 0.6131 | 0.3346 | 0.6000 |
| 192 | Pressure-Side | 0.6182 | 0.3423 | 0.6000 |
| 193 | Pressure-Side | 0.6232 | 0.3501 | 0.6000 |
| 194 | Pressure-Side | 0.6282 | 0.3579 | 0.6000 |
| 195 | Pressure-Side | 0.6332 | 0.3657 | 0.6000 |
| 196 | Pressure-Side | 0.6358 | 0.3693 | 0.6000 |
| 197 | Pressure-Side | 0.6385 | 0.3713 | 0.6000 |
| 198 | Pressure-Side | 0.6416 | 0.3723 | 0.6000 |
| 199 | Pressure-Side | 0.6450 | 0.3722 | 0.6000 |
| 200 | Pressure-Side | 0.6481 | 0.3712 | 0.6000 |
| 1 | Suction-Side | −0.0596 | −0.0993 | 0.7000 |
| 2 | Suction-Side | −0.0584 | −0.1107 | 0.7000 |
| 3 | Suction-Side | −0.0548 | −0.1217 | 0.7000 |
| 4 | Suction-Side | −0.0495 | −0.1319 | 0.7000 |
| 5 | Suction-Side | −0.0429 | −0.1413 | 0.7000 |
| 6 | Suction-Side | −0.0354 | −0.1500 | 0.7000 |
| 7 | Suction-Side | −0.0271 | −0.1581 | 0.7000 |
| 8 | Suction-Side | −0.0184 | −0.1656 | 0.7000 |
| 9 | Suction-Side | −0.0092 | −0.1725 | 0.7000 |
| 10 | Suction-Side | 0.0004 | −0.1789 | 0.7000 |
| 11 | Suction-Side | 0.0103 | −0.1849 | 0.7000 |
| 12 | Suction-Side | 0.0204 | −0.1904 | 0.7000 |
| 13 | Suction-Side | 0.0307 | −0.1955 | 0.7000 |
| 14 | Suction-Side | 0.0412 | −0.2002 | 0.7000 |
| 15 | Suction-Side | 0.0519 | −0.2044 | 0.7000 |
| 16 | Suction-Side | 0.0628 | −0.2083 | 0.7000 |
| 17 | Suction-Side | 0.0737 | −0.2118 | 0.7000 |
| 18 | Suction-Side | 0.0848 | −0.2149 | 0.7000 |
| 19 | Suction-Side | 0.0960 | −0.2176 | 0.7000 |
| 20 | Suction-Side | 0.1073 | −0.2198 | 0.7000 |
| 21 | Suction-Side | 0.1187 | −0.2217 | 0.7000 |
| 22 | Suction-Side | 0.1301 | −0.2231 | 0.7000 |
| 23 | Suction-Side | 0.1416 | −0.2241 | 0.7000 |
| 24 | Suction-Side | 0.1531 | −0.2246 | 0.7000 |
| 25 | Suction-Side | 0.1646 | −0.2247 | 0.7000 |
| 26 | Suction-Side | 0.1761 | −0.2244 | 0.7000 |
| 27 | Suction-Side | 0.1876 | −0.2236 | 0.7000 |
| 28 | Suction-Side | 0.1991 | −0.2223 | 0.7000 |
| 29 | Suction-Side | 0.2105 | −0.2205 | 0.7000 |
| 30 | Suction-Side | 0.2218 | −0.2183 | 0.7000 |
| 31 | Suction-Side | 0.2330 | −0.2156 | 0.7000 |
| 32 | Suction-Side | 0.2441 | −0.2125 | 0.7000 |
| 33 | Suction-Side | 0.2550 | −0.2089 | 0.7000 |
| 34 | Suction-Side | 0.2658 | −0.2049 | 0.7000 |
| 35 | Suction-Side | 0.2764 | −0.2004 | 0.7000 |
| 36 | Suction-Side | 0.2868 | −0.1956 | 0.7000 |
| 37 | Suction-Side | 0.2971 | −0.1903 | 0.7000 |
| 38 | Suction-Side | 0.3072 | −0.1847 | 0.7000 |
| 39 | Suction-Side | 0.3170 | −0.1787 | 0.7000 |
| 40 | Suction-Side | 0.3266 | −0.1724 | 0.7000 |
| 41 | Suction-Side | 0.3360 | −0.1657 | 0.7000 |
| 42 | Suction-Side | 0.3452 | −0.1588 | 0.7000 |
| 43 | Suction-Side | 0.3542 | −0.1516 | 0.7000 |
| 44 | Suction-Side | 0.3630 | −0.1441 | 0.7000 |
| 45 | Suction-Side | 0.3716 | −0.1365 | 0.7000 |
| 46 | Suction-Side | 0.3799 | −0.1285 | 0.7000 |
| 47 | Suction-Side | 0.3881 | −0.1204 | 0.7000 |
| 48 | Suction-Side | 0.3961 | −0.1121 | 0.7000 |
| 49 | Suction-Side | 0.4039 | −0.1037 | 0.7000 |
| 50 | Suction-Side | 0.4116 | −0.0950 | 0.7000 |
| 51 | Suction-Side | 0.4190 | −0.0863 | 0.7000 |
| 52 | Suction-Side | 0.4263 | −0.0774 | 0.7000 |
| 53 | Suction-Side | 0.4335 | −0.0683 | 0.7000 |
| 54 | Suction-Side | 0.4405 | −0.0592 | 0.7000 |
| 55 | Suction-Side | 0.4473 | −0.0499 | 0.7000 |
| 56 | Suction-Side | 0.4541 | −0.0406 | 0.7000 |
| 57 | Suction-Side | 0.4607 | −0.0311 | 0.7000 |
| 58 | Suction-Side | 0.4671 | −0.0216 | 0.7000 |
| 59 | Suction-Side | 0.4735 | −0.0120 | 0.7000 |
| 60 | Suction-Side | 0.4797 | −0.0023 | 0.7000 |
| 61 | Suction-Side | 0.4859 | 0.0074 | 0.7000 |
| 62 | Suction-Side | 0.4919 | 0.0172 | 0.7000 |
| 63 | Suction-Side | 0.4979 | 0.0271 | 0.7000 |
| 64 | Suction-Side | 0.5037 | 0.0370 | 0.7000 |
| 65 | Suction-Side | 0.5095 | 0.0470 | 0.7000 |
| 66 | Suction-Side | 0.5152 | 0.0570 | 0.7000 |
| 67 | Suction-Side | 0.5208 | 0.0670 | 0.7000 |
| 68 | Suction-Side | 0.5264 | 0.0771 | 0.7000 |
| 69 | Suction-Side | 0.5319 | 0.0873 | 0.7000 |
| 70 | Suction-Side | 0.5372 | 0.0974 | 0.7000 |
| 71 | Suction-Side | 0.5426 | 0.1076 | 0.7000 |
| 72 | Suction-Side | 0.5479 | 0.1179 | 0.7000 |
| 73 | Suction-Side | 0.5531 | 0.1282 | 0.7000 |
| 74 | Suction-Side | 0.5582 | 0.1385 | 0.7000 |
| 75 | Suction-Side | 0.5633 | 0.1488 | 0.7000 |
| 76 | Suction-Side | 0.5684 | 0.1591 | 0.7000 |
| 77 | Suction-Side | 0.5734 | 0.1695 | 0.7000 |
| 78 | Suction-Side | 0.5783 | 0.1799 | 0.7000 |
| 79 | Suction-Side | 0.5833 | 0.1903 | 0.7000 |
| 80 | Suction-Side | 0.5881 | 0.2008 | 0.7000 |
| 81 | Suction-Side | 0.5929 | 0.2112 | 0.7000 |
| 82 | Suction-Side | 0.5977 | 0.2217 | 0.7000 |
| 83 | Suction-Side | 0.6024 | 0.2322 | 0.7000 |
| 84 | Suction-Side | 0.6071 | 0.2427 | 0.7000 |
| 85 | Suction-Side | 0.6118 | 0.2533 | 0.7000 |
| 86 | Suction-Side | 0.6164 | 0.2638 | 0.7000 |
| 87 | Suction-Side | 0.6210 | 0.2744 | 0.7000 |
| 88 | Suction-Side | 0.6255 | 0.2850 | 0.7000 |
| 89 | Suction-Side | 0.6300 | 0.2956 | 0.7000 |
| 90 | Suction-Side | 0.6344 | 0.3062 | 0.7000 |
| 91 | Suction-Side | 0.6389 | 0.3169 | 0.7000 |
| 92 | Suction-Side | 0.6433 | 0.3275 | 0.7000 |
| 93 | Suction-Side | 0.6477 | 0.3382 | 0.7000 |
| 94 | Suction-Side | 0.6520 | 0.3488 | 0.7000 |
| 95 | Suction-Side | 0.6564 | 0.3595 | 0.7000 |
| 96 | Suction-Side | 0.6564 | 0.3595 | 0.7000 |
| 97 | Suction-Side | 0.6572 | 0.3632 | 0.7000 |
| 98 | Suction-Side | 0.6565 | 0.3670 | 0.7000 |
| 99 | Suction-Side | 0.6546 | 0.3703 | 0.7000 |
| 100 | Suction-Side | 0.6516 | 0.3727 | 0.7000 |
| 101 | Pressure-Side | −0.0596 | −0.0993 | 0.7000 |
| 102 | Pressure-Side | −0.0585 | −0.0899 | 0.7000 |
| 103 | Pressure-Side | −0.0554 | −0.0810 | 0.7000 |
| 104 | Pressure-Side | −0.0503 | −0.0731 | 0.7000 |
| 105 | Pressure-Side | −0.0436 | −0.0665 | 0.7000 |
| 106 | Pressure-Side | −0.0357 | −0.0612 | 0.7000 |
| 107 | Pressure-Side | −0.0272 | −0.0570 | 0.7000 |
| 108 | Pressure-Side | −0.0183 | −0.0538 | 0.7000 |
| 109 | Pressure-Side | −0.0092 | −0.0511 | 0.7000 |
| 110 | Pressure-Side | 0.0000 | −0.0490 | 0.7000 |
| 111 | Pressure-Side | 0.0093 | −0.0473 | 0.7000 |
| 112 | Pressure-Side | 0.0186 | −0.0458 | 0.7000 |
| 113 | Pressure-Side | 0.0280 | −0.0445 | 0.7000 |
| 114 | Pressure-Side | 0.0374 | −0.0434 | 0.7000 |
| 115 | Pressure-Side | 0.0468 | −0.0424 | 0.7000 |
| 116 | Pressure-Side | 0.0562 | −0.0414 | 0.7000 |
| 117 | Pressure-Side | 0.0656 | −0.0406 | 0.7000 |
| 118 | Pressure-Side | 0.0751 | −0.0397 | 0.7000 |
| 119 | Pressure-Side | 0.0845 | −0.0388 | 0.7000 |
| 120 | Pressure-Side | 0.0939 | −0.0379 | 0.7000 |
| 121 | Pressure-Side | 0.1033 | −0.0370 | 0.7000 |
| 122 | Pressure-Side | 0.1127 | −0.0361 | 0.7000 |
| 123 | Pressure-Side | 0.1221 | −0.0350 | 0.7000 |
| 124 | Pressure-Side | 0.1315 | −0.0339 | 0.7000 |
| 125 | Pressure-Side | 0.1409 | −0.0327 | 0.7000 |
| 126 | Pressure-Side | 0.1503 | −0.0314 | 0.7000 |
| 127 | Pressure-Side | 0.1597 | −0.0300 | 0.7000 |
| 128 | Pressure-Side | 0.1690 | −0.0285 | 0.7000 |
| 129 | Pressure-Side | 0.1783 | −0.0268 | 0.7000 |
| 130 | Pressure-Side | 0.1876 | −0.0251 | 0.7000 |
| 131 | Pressure-Side | 0.1969 | −0.0231 | 0.7000 |
| 132 | Pressure-Side | 0.2061 | −0.0210 | 0.7000 |
| 133 | Pressure-Side | 0.2153 | −0.0188 | 0.7000 |
| 134 | Pressure-Side | 0.2245 | −0.0164 | 0.7000 |
| 135 | Pressure-Side | 0.2336 | −0.0139 | 0.7000 |
| 136 | Pressure-Side | 0.2426 | −0.0111 | 0.7000 |
| 137 | Pressure-Side | 0.2516 | −0.0082 | 0.7000 |
| 138 | Pressure-Side | 0.2606 | −0.0052 | 0.7000 |
| 139 | Pressure-Side | 0.2695 | −0.0019 | 0.7000 |
| 140 | Pressure-Side | 0.2783 | 0.0015 | 0.7000 |
| 141 | Pressure-Side | 0.2870 | 0.0052 | 0.7000 |

TABLE I-continued

Non-Dimensionalized (X Y Z/Span Height)

| N | Location | X | Y | Z |
|---|---|---|---|---|
| 142 | Pressure-Side | 0.2957 | 0.0090 | 0.7000 |
| 143 | Pressure-Side | 0.3043 | 0.0129 | 0.7000 |
| 144 | Pressure-Side | 0.3128 | 0.0171 | 0.7000 |
| 145 | Pressure-Side | 0.3212 | 0.0214 | 0.7000 |
| 146 | Pressure-Side | 0.3295 | 0.0259 | 0.7000 |
| 147 | Pressure-Side | 0.3378 | 0.0306 | 0.7000 |
| 148 | Pressure-Side | 0.3459 | 0.0354 | 0.7000 |
| 149 | Pressure-Side | 0.3539 | 0.0404 | 0.7000 |
| 150 | Pressure-Side | 0.3619 | 0.0455 | 0.7000 |
| 151 | Pressure-Side | 0.3697 | 0.0509 | 0.7000 |
| 152 | Pressure-Side | 0.3775 | 0.0563 | 0.7000 |
| 153 | Pressure-Side | 0.3851 | 0.0619 | 0.7000 |
| 154 | Pressure-Side | 0.3926 | 0.0676 | 0.7000 |
| 155 | Pressure-Side | 0.4001 | 0.0735 | 0.7000 |
| 156 | Pressure-Side | 0.4074 | 0.0795 | 0.7000 |
| 157 | Pressure-Side | 0.4146 | 0.0856 | 0.7000 |
| 158 | Pressure-Side | 0.4218 | 0.0918 | 0.7000 |
| 159 | Pressure-Side | 0.4288 | 0.0981 | 0.7000 |
| 160 | Pressure-Side | 0.4357 | 0.1045 | 0.7000 |
| 161 | Pressure-Side | 0.4426 | 0.1111 | 0.7000 |
| 162 | Pressure-Side | 0.4493 | 0.1177 | 0.7000 |
| 163 | Pressure-Side | 0.4560 | 0.1244 | 0.7000 |
| 164 | Pressure-Side | 0.4626 | 0.1312 | 0.7000 |
| 165 | Pressure-Side | 0.4691 | 0.1381 | 0.7000 |
| 166 | Pressure-Side | 0.4755 | 0.1451 | 0.7000 |
| 167 | Pressure-Side | 0.4818 | 0.1521 | 0.7000 |
| 168 | Pressure-Side | 0.4881 | 0.1592 | 0.7000 |
| 169 | Pressure-Side | 0.4943 | 0.1663 | 0.7000 |
| 170 | Pressure-Side | 0.5004 | 0.1736 | 0.7000 |
| 171 | Pressure-Side | 0.5064 | 0.1809 | 0.7000 |
| 172 | Pressure-Side | 0.5124 | 0.1882 | 0.7000 |
| 173 | Pressure-Side | 0.5183 | 0.1956 | 0.7000 |
| 174 | Pressure-Side | 0.5241 | 0.2030 | 0.7000 |
| 175 | Pressure-Side | 0.5299 | 0.2105 | 0.7000 |
| 176 | Pressure-Side | 0.5357 | 0.2180 | 0.7000 |
| 177 | Pressure-Side | 0.5413 | 0.2256 | 0.7000 |
| 178 | Pressure-Side | 0.5470 | 0.2332 | 0.7000 |
| 179 | Pressure-Side | 0.5526 | 0.2409 | 0.7000 |
| 180 | Pressure-Side | 0.5581 | 0.2486 | 0.7000 |
| 181 | Pressure-Side | 0.5636 | 0.2563 | 0.7000 |
| 182 | Pressure-Side | 0.5690 | 0.2640 | 0.7000 |
| 183 | Pressure-Side | 0.5744 | 0.2718 | 0.7000 |
| 184 | Pressure-Side | 0.5797 | 0.2796 | 0.7000 |
| 185 | Pressure-Side | 0.5851 | 0.2874 | 0.7000 |
| 186 | Pressure-Side | 0.5903 | 0.2953 | 0.7000 |
| 187 | Pressure-Side | 0.5956 | 0.3031 | 0.7000 |
| 188 | Pressure-Side | 0.6008 | 0.3110 | 0.7000 |
| 189 | Pressure-Side | 0.6060 | 0.3190 | 0.7000 |
| 190 | Pressure-Side | 0.6111 | 0.3269 | 0.7000 |
| 191 | Pressure-Side | 0.6163 | 0.3348 | 0.7000 |
| 192 | Pressure-Side | 0.6214 | 0.3428 | 0.7000 |
| 193 | Pressure-Side | 0.6265 | 0.3508 | 0.7000 |
| 194 | Pressure-Side | 0.6315 | 0.3588 | 0.7000 |
| 195 | Pressure-Side | 0.6366 | 0.3668 | 0.7000 |
| 196 | Pressure-Side | 0.6391 | 0.3705 | 0.7000 |
| 197 | Pressure-Side | 0.6418 | 0.3726 | 0.7000 |
| 198 | Pressure-Side | 0.6450 | 0.3738 | 0.7000 |
| 199 | Pressure-Side | 0.6484 | 0.3738 | 0.7000 |
| 200 | Pressure-Side | 0.6516 | 0.3727 | 0.7000 |
| 1 | Suction-Side | −0.0681 | −0.1113 | 0.8000 |
| 2 | Suction-Side | −0.0673 | −0.1231 | 0.8000 |
| 3 | Suction-Side | −0.0640 | −0.1344 | 0.8000 |
| 4 | Suction-Side | −0.0588 | −0.1450 | 0.8000 |
| 5 | Suction-Side | −0.0522 | −0.1547 | 0.8000 |
| 6 | Suction-Side | −0.0446 | −0.1637 | 0.8000 |
| 7 | Suction-Side | −0.0362 | −0.1720 | 0.8000 |
| 8 | Suction-Side | −0.0273 | −0.1797 | 0.8000 |
| 9 | Suction-Side | −0.0178 | −0.1868 | 0.8000 |
| 10 | Suction-Side | −0.0080 | −0.1933 | 0.8000 |
| 11 | Suction-Side | 0.0021 | −0.1994 | 0.8000 |
| 12 | Suction-Side | 0.0124 | −0.2050 | 0.8000 |
| 13 | Suction-Side | 0.0230 | −0.2102 | 0.8000 |
| 14 | Suction-Side | 0.0338 | −0.2149 | 0.8000 |
| 15 | Suction-Side | 0.0448 | −0.2192 | 0.8000 |
| 16 | Suction-Side | 0.0559 | −0.2232 | 0.8000 |
| 17 | Suction-Side | 0.0672 | −0.2267 | 0.8000 |
| 18 | Suction-Side | 0.0785 | −0.2298 | 0.8000 |
| 19 | Suction-Side | 0.0900 | −0.2325 | 0.8000 |
| 20 | Suction-Side | 0.1016 | −0.2348 | 0.8000 |
| 21 | Suction-Side | 0.1132 | −0.2366 | 0.8000 |
| 22 | Suction-Side | 0.1249 | −0.2381 | 0.8000 |
| 23 | Suction-Side | 0.1367 | −0.2390 | 0.8000 |
| 24 | Suction-Side | 0.1485 | −0.2396 | 0.8000 |
| 25 | Suction-Side | 0.1603 | −0.2397 | 0.8000 |
| 26 | Suction-Side | 0.1721 | −0.2393 | 0.8000 |
| 27 | Suction-Side | 0.1838 | −0.2385 | 0.8000 |
| 28 | Suction-Side | 0.1955 | −0.2372 | 0.8000 |
| 29 | Suction-Side | 0.2072 | −0.2354 | 0.8000 |
| 30 | Suction-Side | 0.2188 | −0.2331 | 0.8000 |
| 31 | Suction-Side | 0.2302 | −0.2303 | 0.8000 |
| 32 | Suction-Side | 0.2416 | −0.2271 | 0.8000 |
| 33 | Suction-Side | 0.2528 | −0.2234 | 0.8000 |
| 34 | Suction-Side | 0.2638 | −0.2193 | 0.8000 |
| 35 | Suction-Side | 0.2747 | −0.2147 | 0.8000 |
| 36 | Suction-Side | 0.2853 | −0.2097 | 0.8000 |
| 37 | Suction-Side | 0.2958 | −0.2043 | 0.8000 |
| 38 | Suction-Side | 0.3061 | −0.1984 | 0.8000 |
| 39 | Suction-Side | 0.3161 | −0.1923 | 0.8000 |
| 40 | Suction-Side | 0.3260 | −0.1857 | 0.8000 |
| 41 | Suction-Side | 0.3356 | −0.1789 | 0.8000 |
| 42 | Suction-Side | 0.3449 | −0.1718 | 0.8000 |
| 43 | Suction-Side | 0.3541 | −0.1643 | 0.8000 |
| 44 | Suction-Side | 0.3630 | −0.1566 | 0.8000 |
| 45 | Suction-Side | 0.3718 | −0.1487 | 0.8000 |
| 46 | Suction-Side | 0.3803 | −0.1405 | 0.8000 |
| 47 | Suction-Side | 0.3886 | −0.1322 | 0.8000 |
| 48 | Suction-Side | 0.3967 | −0.1236 | 0.8000 |
| 49 | Suction-Side | 0.4046 | −0.1149 | 0.8000 |
| 50 | Suction-Side | 0.4124 | −0.1060 | 0.8000 |
| 51 | Suction-Side | 0.4199 | −0.0969 | 0.8000 |
| 52 | Suction-Side | 0.4273 | −0.0878 | 0.8000 |
| 53 | Suction-Side | 0.4346 | −0.0785 | 0.8000 |
| 54 | Suction-Side | 0.4417 | −0.0690 | 0.8000 |
| 55 | Suction-Side | 0.4486 | −0.0595 | 0.8000 |
| 56 | Suction-Side | 0.4554 | −0.0499 | 0.8000 |
| 57 | Suction-Side | 0.4621 | −0.0402 | 0.8000 |
| 58 | Suction-Side | 0.4686 | −0.0303 | 0.8000 |
| 59 | Suction-Side | 0.4751 | −0.0205 | 0.8000 |
| 60 | Suction-Side | 0.4814 | −0.0105 | 0.8000 |
| 61 | Suction-Side | 0.4876 | −0.0005 | 0.8000 |
| 62 | Suction-Side | 0.4937 | 0.0096 | 0.8000 |
| 63 | Suction-Side | 0.4997 | 0.0198 | 0.8000 |
| 64 | Suction-Side | 0.5056 | 0.0300 | 0.8000 |
| 65 | Suction-Side | 0.5115 | 0.0402 | 0.8000 |
| 66 | Suction-Side | 0.5172 | 0.0505 | 0.8000 |
| 67 | Suction-Side | 0.5229 | 0.0609 | 0.8000 |
| 68 | Suction-Side | 0.5285 | 0.0712 | 0.8000 |
| 69 | Suction-Side | 0.5340 | 0.0817 | 0.8000 |
| 70 | Suction-Side | 0.5395 | 0.0921 | 0.8000 |
| 71 | Suction-Side | 0.5448 | 0.1026 | 0.8000 |
| 72 | Suction-Side | 0.5502 | 0.1131 | 0.8000 |
| 73 | Suction-Side | 0.5554 | 0.1237 | 0.8000 |
| 74 | Suction-Side | 0.5606 | 0.1343 | 0.8000 |
| 75 | Suction-Side | 0.5658 | 0.1449 | 0.8000 |
| 76 | Suction-Side | 0.5709 | 0.1555 | 0.8000 |
| 77 | Suction-Side | 0.5759 | 0.1662 | 0.8000 |
| 78 | Suction-Side | 0.5809 | 0.1768 | 0.8000 |
| 79 | Suction-Side | 0.5859 | 0.1875 | 0.8000 |
| 80 | Suction-Side | 0.5908 | 0.1983 | 0.8000 |
| 81 | Suction-Side | 0.5957 | 0.2090 | 0.8000 |
| 82 | Suction-Side | 0.6005 | 0.2198 | 0.8000 |
| 83 | Suction-Side | 0.6052 | 0.2306 | 0.8000 |
| 84 | Suction-Side | 0.6100 | 0.2414 | 0.8000 |
| 85 | Suction-Side | 0.6147 | 0.2522 | 0.8000 |
| 86 | Suction-Side | 0.6193 | 0.2630 | 0.8000 |
| 87 | Suction-Side | 0.6239 | 0.2739 | 0.8000 |
| 88 | Suction-Side | 0.6285 | 0.2847 | 0.8000 |
| 89 | Suction-Side | 0.6330 | 0.2956 | 0.8000 |
| 90 | Suction-Side | 0.6375 | 0.3065 | 0.8000 |
| 91 | Suction-Side | 0.6420 | 0.3175 | 0.8000 |
| 92 | Suction-Side | 0.6464 | 0.3284 | 0.8000 |
| 93 | Suction-Side | 0.6508 | 0.3393 | 0.8000 |

TABLE I-continued

Non-Dimensionalized (X Y Z/Span Height)

| N | Location | X | Y | Z |
|---|---|---|---|---|
| 94 | Suction-Side | 0.6552 | 0.3503 | 0.8000 |
| 95 | Suction-Side | 0.6595 | 0.3612 | 0.8000 |
| 96 | Suction-Side | 0.6595 | 0.3612 | 0.8000 |
| 97 | Suction-Side | 0.6603 | 0.3650 | 0.8000 |
| 98 | Suction-Side | 0.6596 | 0.3687 | 0.8000 |
| 99 | Suction-Side | 0.6577 | 0.3720 | 0.8000 |
| 100 | Suction-Side | 0.6547 | 0.3744 | 0.8000 |
| 101 | Pressure-Side | −0.0681 | −0.1113 | 0.8000 |
| 102 | Pressure-Side | −0.0667 | −0.1018 | 0.8000 |
| 103 | Pressure-Side | −0.0631 | −0.0929 | 0.8000 |
| 104 | Pressure-Side | −0.0573 | −0.0852 | 0.8000 |
| 105 | Pressure-Side | −0.0501 | −0.0789 | 0.8000 |
| 106 | Pressure-Side | −0.0419 | −0.0739 | 0.8000 |
| 107 | Pressure-Side | −0.0331 | −0.0699 | 0.8000 |
| 108 | Pressure-Side | −0.0241 | −0.0666 | 0.8000 |
| 109 | Pressure-Side | −0.0149 | −0.0640 | 0.8000 |
| 110 | Pressure-Side | −0.0055 | −0.0617 | 0.8000 |
| 111 | Pressure-Side | 0.0039 | −0.0598 | 0.8000 |
| 112 | Pressure-Side | 0.0134 | −0.0581 | 0.8000 |
| 113 | Pressure-Side | 0.0229 | −0.0566 | 0.8000 |
| 114 | Pressure-Side | 0.0324 | −0.0552 | 0.8000 |
| 115 | Pressure-Side | 0.0420 | −0.0539 | 0.8000 |
| 116 | Pressure-Side | 0.0515 | −0.0528 | 0.8000 |
| 117 | Pressure-Side | 0.0611 | −0.0516 | 0.8000 |
| 118 | Pressure-Side | 0.0706 | −0.0505 | 0.8000 |
| 119 | Pressure-Side | 0.0802 | −0.0493 | 0.8000 |
| 120 | Pressure-Side | 0.0897 | −0.0482 | 0.8000 |
| 121 | Pressure-Side | 0.0993 | −0.0470 | 0.8000 |
| 122 | Pressure-Side | 0.1088 | −0.0458 | 0.8000 |
| 123 | Pressure-Side | 0.1184 | −0.0445 | 0.8000 |
| 124 | Pressure-Side | 0.1279 | −0.0432 | 0.8000 |
| 125 | Pressure-Side | 0.1374 | −0.0417 | 0.8000 |
| 126 | Pressure-Side | 0.1469 | −0.0402 | 0.8000 |
| 127 | Pressure-Side | 0.1564 | −0.0386 | 0.8000 |
| 128 | Pressure-Side | 0.1658 | −0.0368 | 0.8000 |
| 129 | Pressure-Side | 0.1753 | −0.0349 | 0.8000 |
| 130 | Pressure-Side | 0.1847 | −0.0329 | 0.8000 |
| 131 | Pressure-Side | 0.1941 | −0.0308 | 0.8000 |
| 132 | Pressure-Side | 0.2034 | −0.0285 | 0.8000 |
| 133 | Pressure-Side | 0.2127 | −0.0261 | 0.8000 |
| 134 | Pressure-Side | 0.2220 | −0.0235 | 0.8000 |
| 135 | Pressure-Side | 0.2312 | −0.0207 | 0.8000 |
| 136 | Pressure-Side | 0.2404 | −0.0178 | 0.8000 |
| 137 | Pressure-Side | 0.2495 | −0.0147 | 0.8000 |
| 138 | Pressure-Side | 0.2586 | −0.0115 | 0.8000 |
| 139 | Pressure-Side | 0.2676 | −0.0081 | 0.8000 |
| 140 | Pressure-Side | 0.2765 | −0.0045 | 0.8000 |
| 141 | Pressure-Side | 0.2853 | −0.0007 | 0.8000 |
| 142 | Pressure-Side | 0.2941 | 0.0033 | 0.8000 |
| 143 | Pressure-Side | 0.3028 | 0.0074 | 0.8000 |
| 144 | Pressure-Side | 0.3114 | 0.0117 | 0.8000 |
| 145 | Pressure-Side | 0.3199 | 0.0161 | 0.8000 |
| 146 | Pressure-Side | 0.3284 | 0.0208 | 0.8000 |
| 147 | Pressure-Side | 0.3367 | 0.0256 | 0.8000 |
| 148 | Pressure-Side | 0.3449 | 0.0305 | 0.8000 |
| 149 | Pressure-Side | 0.3531 | 0.0357 | 0.8000 |
| 150 | Pressure-Side | 0.3612 | 0.0409 | 0.8000 |
| 151 | Pressure-Side | 0.3691 | 0.0463 | 0.8000 |
| 152 | Pressure-Side | 0.3769 | 0.0519 | 0.8000 |
| 153 | Pressure-Side | 0.3847 | 0.0576 | 0.8000 |
| 154 | Pressure-Side | 0.3923 | 0.0635 | 0.8000 |
| 155 | Pressure-Side | 0.3999 | 0.0694 | 0.8000 |
| 156 | Pressure-Side | 0.4073 | 0.0755 | 0.8000 |
| 157 | Pressure-Side | 0.4147 | 0.0817 | 0.8000 |
| 158 | Pressure-Side | 0.4219 | 0.0881 | 0.8000 |
| 159 | Pressure-Side | 0.4291 | 0.0945 | 0.8000 |
| 160 | Pressure-Side | 0.4361 | 0.1010 | 0.8000 |
| 161 | Pressure-Side | 0.4431 | 0.1077 | 0.8000 |
| 162 | Pressure-Side | 0.4500 | 0.1144 | 0.8000 |
| 163 | Pressure-Side | 0.4568 | 0.1212 | 0.8000 |
| 164 | Pressure-Side | 0.4635 | 0.1281 | 0.8000 |
| 165 | Pressure-Side | 0.4701 | 0.1351 | 0.8000 |
| 166 | Pressure-Side | 0.4766 | 0.1422 | 0.8000 |
| 167 | Pressure-Side | 0.4830 | 0.1493 | 0.8000 |
| 168 | Pressure-Side | 0.4894 | 0.1566 | 0.8000 |
| 169 | Pressure-Side | 0.4957 | 0.1638 | 0.8000 |
| 170 | Pressure-Side | 0.5019 | 0.1712 | 0.8000 |
| 171 | Pressure-Side | 0.5081 | 0.1786 | 0.8000 |
| 172 | Pressure-Side | 0.5141 | 0.1861 | 0.8000 |
| 173 | Pressure-Side | 0.5201 | 0.1936 | 0.8000 |
| 174 | Pressure-Side | 0.5261 | 0.2011 | 0.8000 |
| 175 | Pressure-Side | 0.5320 | 0.2088 | 0.8000 |
| 176 | Pressure-Side | 0.5378 | 0.2164 | 0.8000 |
| 177 | Pressure-Side | 0.5435 | 0.2241 | 0.8000 |
| 178 | Pressure-Side | 0.5492 | 0.2319 | 0.8000 |
| 179 | Pressure-Side | 0.5549 | 0.2397 | 0.8000 |
| 180 | Pressure-Side | 0.5605 | 0.2475 | 0.8000 |
| 181 | Pressure-Side | 0.5660 | 0.2553 | 0.8000 |
| 182 | Pressure-Side | 0.5716 | 0.2632 | 0.8000 |
| 183 | Pressure-Side | 0.5770 | 0.2712 | 0.8000 |
| 184 | Pressure-Side | 0.5824 | 0.2791 | 0.8000 |
| 185 | Pressure-Side | 0.5878 | 0.2871 | 0.8000 |
| 186 | Pressure-Side | 0.5931 | 0.2951 | 0.8000 |
| 187 | Pressure-Side | 0.5984 | 0.3031 | 0.8000 |
| 188 | Pressure-Side | 0.6037 | 0.3112 | 0.8000 |
| 189 | Pressure-Side | 0.6089 | 0.3193 | 0.8000 |
| 190 | Pressure-Side | 0.6141 | 0.3274 | 0.8000 |
| 191 | Pressure-Side | 0.6193 | 0.3355 | 0.8000 |
| 192 | Pressure-Side | 0.6244 | 0.3437 | 0.8000 |
| 193 | Pressure-Side | 0.6295 | 0.3518 | 0.8000 |
| 194 | Pressure-Side | 0.6346 | 0.3600 | 0.8000 |
| 195 | Pressure-Side | 0.6396 | 0.3682 | 0.8000 |
| 196 | Pressure-Side | 0.6421 | 0.3720 | 0.8000 |
| 197 | Pressure-Side | 0.6448 | 0.3742 | 0.8000 |
| 198 | Pressure-Side | 0.6480 | 0.3755 | 0.8000 |
| 199 | Pressure-Side | 0.6514 | 0.3755 | 0.8000 |
| 200 | Pressure-Side | 0.6547 | 0.3744 | 0.8000 |
| 1 | Suction-Side | −0.0763 | −0.1256 | 0.8987 |
| 2 | Suction-Side | −0.0754 | −0.1379 | 0.8988 |
| 3 | Suction-Side | −0.0720 | −0.1497 | 0.8996 |
| 4 | Suction-Side | −0.0666 | −0.1607 | 0.9008 |
| 5 | Suction-Side | −0.0598 | −0.1708 | 0.9023 |
| 6 | Suction-Side | −0.0520 | −0.1802 | 0.9040 |
| 7 | Suction-Side | −0.0434 | −0.1888 | 0.9058 |
| 8 | Suction-Side | −0.0343 | −0.1968 | 0.9078 |
| 9 | Suction-Side | −0.0247 | −0.2042 | 0.9099 |
| 10 | Suction-Side | −0.0147 | −0.2111 | 0.9121 |
| 11 | Suction-Side | −0.0044 | −0.2175 | 0.9144 |
| 12 | Suction-Side | 0.0061 | −0.2234 | 0.9167 |
| 13 | Suction-Side | 0.0169 | −0.2288 | 0.9191 |
| 14 | Suction-Side | 0.0279 | −0.2338 | 0.9215 |
| 15 | Suction-Side | 0.0390 | −0.2384 | 0.9239 |
| 16 | Suction-Side | 0.0504 | −0.2426 | 0.9264 |
| 17 | Suction-Side | 0.0618 | −0.2463 | 0.9289 |
| 18 | Suction-Side | 0.0734 | −0.2496 | 0.9314 |
| 19 | Suction-Side | 0.0851 | −0.2526 | 0.9340 |
| 20 | Suction-Side | 0.0969 | −0.2551 | 0.9366 |
| 21 | Suction-Side | 0.1087 | −0.2571 | 0.9392 |
| 22 | Suction-Side | 0.1206 | −0.2588 | 0.9418 |
| 23 | Suction-Side | 0.1326 | −0.2600 | 0.9444 |
| 24 | Suction-Side | 0.1446 | −0.2607 | 0.9470 |
| 25 | Suction-Side | 0.1566 | −0.2610 | 0.9496 |
| 26 | Suction-Side | 0.1686 | −0.2609 | 0.9523 |
| 27 | Suction-Side | 0.1807 | −0.2602 | 0.9549 |
| 28 | Suction-Side | 0.1926 | −0.2591 | 0.9575 |
| 29 | Suction-Side | 0.2046 | −0.2574 | 0.9601 |
| 30 | Suction-Side | 0.2164 | −0.2553 | 0.9627 |
| 31 | Suction-Side | 0.2281 | −0.2527 | 0.9653 |
| 32 | Suction-Side | 0.2398 | −0.2496 | 0.9678 |
| 33 | Suction-Side | 0.2513 | −0.2461 | 0.9704 |
| 34 | Suction-Side | 0.2627 | −0.2420 | 0.9729 |
| 35 | Suction-Side | 0.2738 | −0.2375 | 0.9753 |
| 36 | Suction-Side | 0.2848 | −0.2325 | 0.9777 |
| 37 | Suction-Side | 0.2956 | −0.2271 | 0.9801 |
| 38 | Suction-Side | 0.3062 | −0.2213 | 0.9824 |
| 39 | Suction-Side | 0.3166 | −0.2150 | 0.9847 |
| 40 | Suction-Side | 0.3267 | −0.2084 | 0.9869 |
| 41 | Suction-Side | 0.3367 | −0.2015 | 0.9891 |
| 42 | Suction-Side | 0.3464 | −0.1942 | 0.9912 |
| 43 | Suction-Side | 0.3558 | −0.1866 | 0.9933 |
| 44 | Suction-Side | 0.3650 | −0.1786 | 0.9953 |
| 45 | Suction-Side | 0.3740 | −0.1705 | 0.9972 |

TABLE I-continued

Non-Dimensionalized (X Y Z/Span Height)

| N | Location | X | Y | Z |
|---|---|---|---|---|
| 46 | Suction-Side | 0.3828 | −0.1621 | 0.9992 |
| 47 | Suction-Side | 0.3913 | −0.1534 | 1.0010 |
| 48 | Suction-Side | 0.3997 | −0.1446 | 1.0029 |
| 49 | Suction-Side | 0.4078 | −0.1355 | 1.0047 |
| 50 | Suction-Side | 0.4158 | −0.1262 | 1.0064 |
| 51 | Suction-Side | 0.4236 | −0.1169 | 1.0081 |
| 52 | Suction-Side | 0.4311 | −0.1073 | 1.0097 |
| 53 | Suction-Side | 0.4386 | −0.0976 | 1.0114 |
| 54 | Suction-Side | 0.4458 | −0.0878 | 1.0130 |
| 55 | Suction-Side | 0.4529 | −0.0778 | 1.0145 |
| 56 | Suction-Side | 0.4599 | −0.0678 | 1.0160 |
| 57 | Suction-Side | 0.4667 | −0.0576 | 1.0175 |
| 58 | Suction-Side | 0.4733 | −0.0474 | 1.0190 |
| 59 | Suction-Side | 0.4799 | −0.0371 | 1.0204 |
| 60 | Suction-Side | 0.4863 | −0.0267 | 1.0218 |
| 61 | Suction-Side | 0.4926 | −0.0162 | 1.0232 |
| 62 | Suction-Side | 0.4989 | −0.0057 | 1.0246 |
| 63 | Suction-Side | 0.5050 | 0.0050 | 1.0259 |
| 64 | Suction-Side | 0.5110 | 0.0156 | 1.0272 |
| 65 | Suction-Side | 0.5169 | 0.0263 | 1.0285 |
| 66 | Suction-Side | 0.5227 | 0.0371 | 1.0298 |
| 67 | Suction-Side | 0.5285 | 0.0479 | 1.0311 |
| 68 | Suction-Side | 0.5341 | 0.0588 | 1.0323 |
| 69 | Suction-Side | 0.5397 | 0.0697 | 1.0335 |
| 70 | Suction-Side | 0.5452 | 0.0806 | 1.0347 |
| 71 | Suction-Side | 0.5507 | 0.0916 | 1.0359 |
| 72 | Suction-Side | 0.5561 | 0.1026 | 1.0371 |
| 73 | Suction-Side | 0.5614 | 0.1136 | 1.0383 |
| 74 | Suction-Side | 0.5666 | 0.1247 | 1.0394 |
| 75 | Suction-Side | 0.5718 | 0.1358 | 1.0406 |
| 76 | Suction-Side | 0.5770 | 0.1469 | 1.0417 |
| 77 | Suction-Side | 0.5821 | 0.1581 | 1.0428 |
| 78 | Suction-Side | 0.5871 | 0.1693 | 1.0439 |
| 79 | Suction-Side | 0.5921 | 0.1805 | 1.0450 |
| 80 | Suction-Side | 0.5971 | 0.1917 | 1.0461 |
| 81 | Suction-Side | 0.6020 | 0.2029 | 1.0471 |
| 82 | Suction-Side | 0.6068 | 0.2142 | 1.0482 |
| 83 | Suction-Side | 0.6116 | 0.2255 | 1.0493 |
| 84 | Suction-Side | 0.6164 | 0.2368 | 1.0503 |
| 85 | Suction-Side | 0.6211 | 0.2481 | 1.0513 |
| 86 | Suction-Side | 0.6258 | 0.2595 | 1.0524 |
| 87 | Suction-Side | 0.6304 | 0.2708 | 1.0534 |
| 88 | Suction-Side | 0.6350 | 0.2822 | 1.0544 |
| 89 | Suction-Side | 0.6395 | 0.2936 | 1.0554 |
| 90 | Suction-Side | 0.6440 | 0.3050 | 1.0564 |
| 91 | Suction-Side | 0.6485 | 0.3165 | 1.0573 |
| 92 | Suction-Side | 0.6529 | 0.3279 | 1.0583 |
| 93 | Suction-Side | 0.6572 | 0.3394 | 1.0593 |
| 94 | Suction-Side | 0.6616 | 0.3509 | 1.0602 |
| 95 | Suction-Side | 0.6659 | 0.3624 | 1.0611 |
| 96 | Suction-Side | 0.6679 | 0.3679 | 1.0616 |
| 97 | Suction-Side | 0.6693 | 0.3721 | 1.0619 |
| 98 | Suction-Side | 0.6693 | 0.3765 | 1.0619 |
| 99 | Suction-Side | 0.6675 | 0.3805 | 1.0615 |
| 100 | Suction-Side | 0.6643 | 0.3834 | 1.0608 |
| 101 | Pressure-Side | −0.0763 | −0.1256 | 0.8987 |
| 102 | Pressure-Side | −0.0747 | −0.1157 | 0.8990 |
| 103 | Pressure-Side | −0.0707 | −0.1066 | 0.8999 |
| 104 | Pressure-Side | −0.0645 | −0.0988 | 0.9012 |
| 105 | Pressure-Side | −0.0568 | −0.0926 | 0.9029 |
| 106 | Pressure-Side | −0.0483 | −0.0877 | 0.9048 |
| 107 | Pressure-Side | −0.0392 | −0.0837 | 0.9068 |
| 108 | Pressure-Side | −0.0299 | −0.0805 | 0.9088 |
| 109 | Pressure-Side | −0.0205 | −0.0779 | 0.9109 |
| 110 | Pressure-Side | −0.0109 | −0.0756 | 0.9130 |
| 111 | Pressure-Side | −0.0013 | −0.0737 | 0.9151 |
| 112 | Pressure-Side | 0.0084 | −0.0719 | 0.9172 |
| 113 | Pressure-Side | 0.0181 | −0.0703 | 0.9193 |
| 114 | Pressure-Side | 0.0278 | −0.0689 | 0.9214 |
| 115 | Pressure-Side | 0.0376 | −0.0675 | 0.9236 |
| 116 | Pressure-Side | 0.0473 | −0.0662 | 0.9257 |
| 117 | Pressure-Side | 0.0570 | −0.0648 | 0.9278 |
| 118 | Pressure-Side | 0.0668 | −0.0635 | 0.9300 |
| 119 | Pressure-Side | 0.0765 | −0.0622 | 0.9321 |
| 120 | Pressure-Side | 0.0862 | −0.0608 | 0.9342 |
| 121 | Pressure-Side | 0.0960 | −0.0594 | 0.9364 |
| 122 | Pressure-Side | 0.1057 | −0.0579 | 0.9385 |
| 123 | Pressure-Side | 0.1154 | −0.0564 | 0.9406 |
| 124 | Pressure-Side | 0.1251 | −0.0547 | 0.9427 |
| 125 | Pressure-Side | 0.1347 | −0.0530 | 0.9448 |
| 126 | Pressure-Side | 0.1444 | −0.0511 | 0.9470 |
| 127 | Pressure-Side | 0.1540 | −0.0492 | 0.9491 |
| 128 | Pressure-Side | 0.1636 | −0.0471 | 0.9512 |
| 129 | Pressure-Side | 0.1732 | −0.0448 | 0.9533 |
| 130 | Pressure-Side | 0.1827 | −0.0425 | 0.9554 |
| 131 | Pressure-Side | 0.1923 | −0.0400 | 0.9574 |
| 132 | Pressure-Side | 0.2017 | −0.0373 | 0.9595 |
| 133 | Pressure-Side | 0.2112 | −0.0345 | 0.9616 |
| 134 | Pressure-Side | 0.2206 | −0.0316 | 0.9636 |
| 135 | Pressure-Side | 0.2299 | −0.0285 | 0.9657 |
| 136 | Pressure-Side | 0.2392 | −0.0252 | 0.9677 |
| 137 | Pressure-Side | 0.2484 | −0.0218 | 0.9697 |
| 138 | Pressure-Side | 0.2576 | −0.0181 | 0.9718 |
| 139 | Pressure-Side | 0.2667 | −0.0144 | 0.9737 |
| 140 | Pressure-Side | 0.2757 | −0.0104 | 0.9757 |
| 141 | Pressure-Side | 0.2847 | −0.0063 | 0.9777 |
| 142 | Pressure-Side | 0.2936 | −0.0020 | 0.9796 |
| 143 | Pressure-Side | 0.3024 | 0.0024 | 0.9816 |
| 144 | Pressure-Side | 0.3111 | 0.0070 | 0.9835 |
| 145 | Pressure-Side | 0.3198 | 0.0118 | 0.9854 |
| 146 | Pressure-Side | 0.3283 | 0.0167 | 0.9872 |
| 147 | Pressure-Side | 0.3368 | 0.0218 | 0.9891 |
| 148 | Pressure-Side | 0.3452 | 0.0270 | 0.9909 |
| 149 | Pressure-Side | 0.3535 | 0.0324 | 0.9927 |
| 150 | Pressure-Side | 0.3617 | 0.0379 | 0.9945 |
| 151 | Pressure-Side | 0.3698 | 0.0436 | 0.9963 |
| 152 | Pressure-Side | 0.3778 | 0.0493 | 0.9981 |
| 153 | Pressure-Side | 0.3858 | 0.0553 | 0.9998 |
| 154 | Pressure-Side | 0.3936 | 0.0613 | 1.0015 |
| 155 | Pressure-Side | 0.4013 | 0.0675 | 1.0032 |
| 156 | Pressure-Side | 0.4090 | 0.0738 | 1.0049 |
| 157 | Pressure-Side | 0.4166 | 0.0802 | 1.0066 |
| 158 | Pressure-Side | 0.4240 | 0.0867 | 1.0082 |
| 159 | Pressure-Side | 0.4314 | 0.0934 | 1.0098 |
| 160 | Pressure-Side | 0.4387 | 0.1001 | 1.0114 |
| 161 | Pressure-Side | 0.4459 | 0.1069 | 1.0130 |
| 162 | Pressure-Side | 0.4530 | 0.1139 | 1.0145 |
| 163 | Pressure-Side | 0.4601 | 0.1209 | 1.0161 |
| 164 | Pressure-Side | 0.4670 | 0.1280 | 1.0176 |
| 165 | Pressure-Side | 0.4739 | 0.1352 | 1.0191 |
| 166 | Pressure-Side | 0.4807 | 0.1424 | 1.0206 |
| 167 | Pressure-Side | 0.4874 | 0.1498 | 1.0221 |
| 168 | Pressure-Side | 0.4940 | 0.1572 | 1.0235 |
| 169 | Pressure-Side | 0.5006 | 0.1647 | 1.0250 |
| 170 | Pressure-Side | 0.5071 | 0.1722 | 1.0264 |
| 171 | Pressure-Side | 0.5135 | 0.1799 | 1.0278 |
| 172 | Pressure-Side | 0.5198 | 0.1875 | 1.0292 |
| 173 | Pressure-Side | 0.5261 | 0.1953 | 1.0305 |
| 174 | Pressure-Side | 0.5323 | 0.2031 | 1.0319 |
| 175 | Pressure-Side | 0.5384 | 0.2109 | 1.0332 |
| 176 | Pressure-Side | 0.5445 | 0.2188 | 1.0346 |
| 177 | Pressure-Side | 0.5505 | 0.2268 | 1.0359 |
| 178 | Pressure-Side | 0.5564 | 0.2348 | 1.0372 |
| 179 | Pressure-Side | 0.5623 | 0.2429 | 1.0385 |
| 180 | Pressure-Side | 0.5681 | 0.2510 | 1.0397 |
| 181 | Pressure-Side | 0.5739 | 0.2591 | 1.0410 |
| 182 | Pressure-Side | 0.5796 | 0.2673 | 1.0422 |
| 183 | Pressure-Side | 0.5852 | 0.2755 | 1.0435 |
| 184 | Pressure-Side | 0.5908 | 0.2838 | 1.0447 |
| 185 | Pressure-Side | 0.5963 | 0.2921 | 1.0459 |
| 186 | Pressure-Side | 0.6018 | 0.3004 | 1.0471 |
| 187 | Pressure-Side | 0.6073 | 0.3088 | 1.0483 |
| 188 | Pressure-Side | 0.6126 | 0.3172 | 1.0495 |
| 189 | Pressure-Side | 0.6180 | 0.3256 | 1.0507 |
| 190 | Pressure-Side | 0.6233 | 0.3341 | 1.0518 |
| 191 | Pressure-Side | 0.6285 | 0.3426 | 1.0530 |
| 192 | Pressure-Side | 0.6337 | 0.3511 | 1.0541 |
| 193 | Pressure-Side | 0.6389 | 0.3597 | 1.0552 |
| 194 | Pressure-Side | 0.6440 | 0.3683 | 1.0564 |
| 195 | Pressure-Side | 0.6490 | 0.3769 | 1.0575 |
| 196 | Pressure-Side | 0.6515 | 0.3810 | 1.0580 |
| 197 | Pressure-Side | 0.6542 | 0.3833 | 1.0586 |

TABLE I-continued

Non-Dimensionalized (X Y Z/Span Height)

| N | Location | X | Y | Z |
|---|---|---|---|---|
| 198 | Pressure-Side | 0.6575 | 0.3846 | 1.0593 |
| 199 | Pressure-Side | 0.6610 | 0.3846 | 1.0601 |
| 200 | Pressure-Side | 0.6643 | 0.3834 | 1.0608 |
| 1 | Suction-Side | −0.0837 | −0.1397 | 0.9872 |
| 2 | Suction-Side | −0.0824 | −0.1527 | 0.9877 |
| 3 | Suction-Side | −0.0784 | −0.1651 | 0.9894 |
| 4 | Suction-Side | −0.0724 | −0.1764 | 0.9918 |
| 5 | Suction-Side | −0.0651 | −0.1869 | 0.9948 |
| 6 | Suction-Side | −0.0568 | −0.1964 | 0.9982 |
| 7 | Suction-Side | −0.0478 | −0.2052 | 1.0018 |
| 8 | Suction-Side | −0.0383 | −0.2133 | 1.0057 |
| 9 | Suction-Side | −0.0283 | −0.2208 | 1.0098 |
| 10 | Suction-Side | −0.0180 | −0.2278 | 1.0139 |
| 11 | Suction-Side | −0.0074 | −0.2342 | 1.0183 |
| 12 | Suction-Side | 0.0034 | −0.2401 | 1.0227 |
| 13 | Suction-Side | 0.0144 | −0.2455 | 1.0272 |
| 14 | Suction-Side | 0.0256 | −0.2505 | 1.0317 |
| 15 | Suction-Side | 0.0370 | −0.2551 | 1.0364 |
| 16 | Suction-Side | 0.0486 | −0.2592 | 1.0410 |
| 17 | Suction-Side | 0.0602 | −0.2629 | 1.0458 |
| 18 | Suction-Side | 0.0719 | −0.2661 | 1.0506 |
| 19 | Suction-Side | 0.0838 | −0.2689 | 1.0554 |
| 20 | Suction-Side | 0.0957 | −0.2713 | 1.0603 |
| 21 | Suction-Side | 0.1077 | −0.2733 | 1.0651 |
| 22 | Suction-Side | 0.1198 | −0.2748 | 1.0700 |
| 23 | Suction-Side | 0.1319 | −0.2759 | 1.0750 |
| 24 | Suction-Side | 0.1440 | −0.2765 | 1.0799 |
| 25 | Suction-Side | 0.1561 | −0.2766 | 1.0848 |
| 26 | Suction-Side | 0.1683 | −0.2763 | 1.0898 |
| 27 | Suction-Side | 0.1804 | −0.2756 | 1.0947 |
| 28 | Suction-Side | 0.1925 | −0.2743 | 1.0996 |
| 29 | Suction-Side | 0.2045 | −0.2726 | 1.1045 |
| 30 | Suction-Side | 0.2165 | −0.2704 | 1.1094 |
| 31 | Suction-Side | 0.2283 | −0.2677 | 1.1142 |
| 32 | Suction-Side | 0.2401 | −0.2645 | 1.1190 |
| 33 | Suction-Side | 0.2518 | −0.2609 | 1.1238 |
| 34 | Suction-Side | 0.2633 | −0.2568 | 1.1285 |
| 35 | Suction-Side | 0.2747 | −0.2522 | 1.1331 |
| 36 | Suction-Side | 0.2859 | −0.2471 | 1.1377 |
| 37 | Suction-Side | 0.2969 | −0.2417 | 1.1421 |
| 38 | Suction-Side | 0.3077 | −0.2358 | 1.1465 |
| 39 | Suction-Side | 0.3183 | −0.2294 | 1.1509 |
| 40 | Suction-Side | 0.3288 | −0.2227 | 1.1551 |
| 41 | Suction-Side | 0.3390 | −0.2156 | 1.1593 |
| 42 | Suction-Side | 0.3490 | −0.2082 | 1.1633 |
| 43 | Suction-Side | 0.3587 | −0.2004 | 1.1673 |
| 44 | Suction-Side | 0.3682 | −0.1923 | 1.1712 |
| 45 | Suction-Side | 0.3776 | −0.1839 | 1.1750 |
| 46 | Suction-Side | 0.3867 | −0.1752 | 1.1787 |
| 47 | Suction-Side | 0.3955 | −0.1663 | 1.1823 |
| 48 | Suction-Side | 0.4042 | −0.1571 | 1.1858 |
| 49 | Suction-Side | 0.4127 | −0.1477 | 1.1893 |
| 50 | Suction-Side | 0.4210 | −0.1382 | 1.1926 |
| 51 | Suction-Side | 0.4290 | −0.1284 | 1.1959 |
| 52 | Suction-Side | 0.4369 | −0.1184 | 1.1991 |
| 53 | Suction-Side | 0.4446 | −0.1083 | 1.2023 |
| 54 | Suction-Side | 0.4522 | −0.0980 | 1.2053 |
| 55 | Suction-Side | 0.4595 | −0.0876 | 1.2083 |
| 56 | Suction-Side | 0.4667 | −0.0771 | 1.2113 |
| 57 | Suction-Side | 0.4738 | −0.0664 | 1.2142 |
| 58 | Suction-Side | 0.4807 | −0.0557 | 1.2170 |
| 59 | Suction-Side | 0.4875 | −0.0448 | 1.2197 |
| 60 | Suction-Side | 0.4942 | −0.0338 | 1.2224 |
| 61 | Suction-Side | 0.5007 | −0.0228 | 1.2251 |
| 62 | Suction-Side | 0.5071 | −0.0117 | 1.2277 |
| 63 | Suction-Side | 0.5134 | −0.0005 | 1.2303 |
| 64 | Suction-Side | 0.5196 | 0.0108 | 1.2328 |
| 65 | Suction-Side | 0.5257 | 0.0221 | 1.2353 |
| 66 | Suction-Side | 0.5317 | 0.0335 | 1.2377 |
| 67 | Suction-Side | 0.5377 | 0.0449 | 1.2402 |
| 68 | Suction-Side | 0.5435 | 0.0564 | 1.2425 |
| 69 | Suction-Side | 0.5492 | 0.0680 | 1.2449 |
| 70 | Suction-Side | 0.5549 | 0.0796 | 1.2472 |
| 71 | Suction-Side | 0.5605 | 0.0912 | 1.2494 |
| 72 | Suction-Side | 0.5660 | 0.1029 | 1.2517 |
| 73 | Suction-Side | 0.5714 | 0.1146 | 1.2539 |
| 74 | Suction-Side | 0.5768 | 0.1263 | 1.2561 |
| 75 | Suction-Side | 0.5821 | 0.1381 | 1.2583 |
| 76 | Suction-Side | 0.5874 | 0.1499 | 1.2604 |
| 77 | Suction-Side | 0.5926 | 0.1618 | 1.2625 |
| 78 | Suction-Side | 0.5977 | 0.1736 | 1.2646 |
| 79 | Suction-Side | 0.6028 | 0.1855 | 1.2667 |
| 80 | Suction-Side | 0.6078 | 0.1975 | 1.2687 |
| 81 | Suction-Side | 0.6128 | 0.2094 | 1.2707 |
| 82 | Suction-Side | 0.6177 | 0.2214 | 1.2727 |
| 83 | Suction-Side | 0.6226 | 0.2334 | 1.2747 |
| 84 | Suction-Side | 0.6274 | 0.2454 | 1.2767 |
| 85 | Suction-Side | 0.6322 | 0.2575 | 1.2786 |
| 86 | Suction-Side | 0.6369 | 0.2696 | 1.2805 |
| 87 | Suction-Side | 0.6415 | 0.2816 | 1.2824 |
| 88 | Suction-Side | 0.6462 | 0.2938 | 1.2843 |
| 89 | Suction-Side | 0.6507 | 0.3059 | 1.2862 |
| 90 | Suction-Side | 0.6553 | 0.3180 | 1.2880 |
| 91 | Suction-Side | 0.6597 | 0.3302 | 1.2898 |
| 92 | Suction-Side | 0.6642 | 0.3424 | 1.2916 |
| 93 | Suction-Side | 0.6685 | 0.3547 | 1.2934 |
| 94 | Suction-Side | 0.6729 | 0.3669 | 1.2952 |
| 95 | Suction-Side | 0.6772 | 0.3791 | 1.2969 |
| 96 | Suction-Side | 0.6792 | 0.3850 | 1.2978 |
| 97 | Suction-Side | 0.6807 | 0.3895 | 1.2984 |
| 98 | Suction-Side | 0.6807 | 0.3941 | 1.2984 |
| 99 | Suction-Side | 0.6788 | 0.3983 | 1.2976 |
| 100 | Suction-Side | 0.6754 | 0.4012 | 1.2962 |
| 101 | Pressure-Side | −0.0837 | −0.1397 | 0.9872 |
| 102 | Pressure-Side | −0.0820 | −0.1292 | 0.9879 |
| 103 | Pressure-Side | −0.0777 | −0.1195 | 0.9896 |
| 104 | Pressure-Side | −0.0712 | −0.1114 | 0.9923 |
| 105 | Pressure-Side | −0.0632 | −0.1051 | 0.9956 |
| 106 | Pressure-Side | −0.0544 | −0.1001 | 0.9991 |
| 107 | Pressure-Side | −0.0451 | −0.0961 | 1.0029 |
| 108 | Pressure-Side | −0.0357 | −0.0928 | 1.0068 |
| 109 | Pressure-Side | −0.0260 | −0.0900 | 1.0107 |
| 110 | Pressure-Side | −0.0163 | −0.0877 | 1.0146 |
| 111 | Pressure-Side | −0.0066 | −0.0856 | 1.0186 |
| 112 | Pressure-Side | 0.0032 | −0.0837 | 1.0226 |
| 113 | Pressure-Side | 0.0131 | −0.0819 | 1.0266 |
| 114 | Pressure-Side | 0.0229 | −0.0802 | 1.0306 |
| 115 | Pressure-Side | 0.0327 | −0.0786 | 1.0346 |
| 116 | Pressure-Side | 0.0426 | −0.0770 | 1.0386 |
| 117 | Pressure-Side | 0.0524 | −0.0755 | 1.0426 |
| 118 | Pressure-Side | 0.0623 | −0.0739 | 1.0466 |
| 119 | Pressure-Side | 0.0721 | −0.0722 | 1.0506 |
| 120 | Pressure-Side | 0.0820 | −0.0705 | 1.0546 |
| 121 | Pressure-Side | 0.0918 | −0.0688 | 1.0586 |
| 122 | Pressure-Side | 0.1016 | −0.0669 | 1.0626 |
| 123 | Pressure-Side | 0.1114 | −0.0650 | 1.0666 |
| 124 | Pressure-Side | 0.1212 | −0.0630 | 1.0706 |
| 125 | Pressure-Side | 0.1309 | −0.0608 | 1.0746 |
| 126 | Pressure-Side | 0.1406 | −0.0586 | 1.0785 |
| 127 | Pressure-Side | 0.1503 | −0.0562 | 1.0825 |
| 128 | Pressure-Side | 0.1600 | −0.0537 | 1.0864 |
| 129 | Pressure-Side | 0.1697 | −0.0510 | 1.0904 |
| 130 | Pressure-Side | 0.1793 | −0.0482 | 1.0943 |
| 131 | Pressure-Side | 0.1889 | −0.0453 | 1.0982 |
| 132 | Pressure-Side | 0.1984 | −0.0422 | 1.1021 |
| 133 | Pressure-Side | 0.2079 | −0.0390 | 1.1059 |
| 134 | Pressure-Side | 0.2174 | −0.0356 | 1.1098 |
| 135 | Pressure-Side | 0.2267 | −0.0321 | 1.1136 |
| 136 | Pressure-Side | 0.2361 | −0.0284 | 1.1174 |
| 137 | Pressure-Side | 0.2454 | −0.0245 | 1.1212 |
| 138 | Pressure-Side | 0.2546 | −0.0205 | 1.1249 |
| 139 | Pressure-Side | 0.2638 | −0.0164 | 1.1287 |
| 140 | Pressure-Side | 0.2729 | −0.0120 | 1.1324 |
| 141 | Pressure-Side | 0.2820 | −0.0076 | 1.1361 |
| 142 | Pressure-Side | 0.2910 | −0.0030 | 1.1397 |
| 143 | Pressure-Side | 0.2999 | 0.0018 | 1.1434 |
| 144 | Pressure-Side | 0.3088 | 0.0067 | 1.1470 |
| 145 | Pressure-Side | 0.3175 | 0.0118 | 1.1505 |
| 146 | Pressure-Side | 0.3262 | 0.0170 | 1.1541 |
| 147 | Pressure-Side | 0.3349 | 0.0224 | 1.1576 |
| 148 | Pressure-Side | 0.3434 | 0.0279 | 1.1611 |
| 149 | Pressure-Side | 0.3519 | 0.0335 | 1.1645 |

TABLE I-continued

Non-Dimensionalized (X Y Z/Span Height)

| N | Location | X | Y | Z |
|---|---|---|---|---|
| 150 | Pressure-Side | 0.3603 | 0.0393 | 1.1680 |
| 151 | Pressure-Side | 0.3686 | 0.0452 | 1.1713 |
| 152 | Pressure-Side | 0.3769 | 0.0512 | 1.1747 |
| 153 | Pressure-Side | 0.3850 | 0.0574 | 1.1780 |
| 154 | Pressure-Side | 0.3931 | 0.0636 | 1.1813 |
| 155 | Pressure-Side | 0.4011 | 0.0700 | 1.1846 |
| 156 | Pressure-Side | 0.4090 | 0.0765 | 1.1878 |
| 157 | Pressure-Side | 0.4169 | 0.0832 | 1.1910 |
| 158 | Pressure-Side | 0.4246 | 0.0899 | 1.1941 |
| 159 | Pressure-Side | 0.4323 | 0.0968 | 1.1973 |
| 160 | Pressure-Side | 0.4399 | 0.1037 | 1.2004 |
| 161 | Pressure-Side | 0.4474 | 0.1107 | 1.2034 |
| 162 | Pressure-Side | 0.4549 | 0.1179 | 1.2065 |
| 163 | Pressure-Side | 0.4622 | 0.1251 | 1.2094 |
| 164 | Pressure-Side | 0.4695 | 0.1324 | 1.2124 |
| 165 | Pressure-Side | 0.4767 | 0.1399 | 1.2154 |
| 166 | Pressure-Side | 0.4839 | 0.1474 | 1.2183 |
| 167 | Pressure-Side | 0.4909 | 0.1549 | 1.2211 |
| 168 | Pressure-Side | 0.4979 | 0.1626 | 1.2240 |
| 169 | Pressure-Side | 0.5048 | 0.1704 | 1.2268 |
| 170 | Pressure-Side | 0.5116 | 0.1782 | 1.2296 |
| 171 | Pressure-Side | 0.5184 | 0.1861 | 1.2323 |
| 172 | Pressure-Side | 0.5251 | 0.1940 | 1.2350 |
| 173 | Pressure-Side | 0.5317 | 0.2021 | 1.2377 |
| 174 | Pressure-Side | 0.5382 | 0.2102 | 1.2404 |
| 175 | Pressure-Side | 0.5447 | 0.2183 | 1.2430 |
| 176 | Pressure-Side | 0.5511 | 0.2266 | 1.2456 |
| 177 | Pressure-Side | 0.5574 | 0.2349 | 1.2482 |
| 178 | Pressure-Side | 0.5637 | 0.2432 | 1.2508 |
| 179 | Pressure-Side | 0.5699 | 0.2516 | 1.2533 |
| 180 | Pressure-Side | 0.5760 | 0.2601 | 1.2558 |
| 181 | Pressure-Side | 0.5821 | 0.2686 | 1.2582 |
| 182 | Pressure-Side | 0.5881 | 0.2772 | 1.2607 |
| 183 | Pressure-Side | 0.5940 | 0.2859 | 1.2631 |
| 184 | Pressure-Side | 0.5999 | 0.2945 | 1.2655 |
| 185 | Pressure-Side | 0.6057 | 0.3033 | 1.2678 |
| 186 | Pressure-Side | 0.6114 | 0.3120 | 1.2702 |
| 187 | Pressure-Side | 0.6171 | 0.3209 | 1.2725 |
| 188 | Pressure-Side | 0.6227 | 0.3298 | 1.2748 |
| 189 | Pressure-Side | 0.6283 | 0.3387 | 1.2770 |
| 190 | Pressure-Side | 0.6338 | 0.3476 | 1.2793 |
| 191 | Pressure-Side | 0.6392 | 0.3567 | 1.2815 |
| 192 | Pressure-Side | 0.6445 | 0.3657 | 1.2837 |
| 193 | Pressure-Side | 0.6498 | 0.3748 | 1.2858 |
| 194 | Pressure-Side | 0.6551 | 0.3840 | 1.2879 |
| 195 | Pressure-Side | 0.6602 | 0.3932 | 1.2900 |
| 196 | Pressure-Side | 0.6627 | 0.3976 | 1.2910 |
| 197 | Pressure-Side | 0.6652 | 0.4003 | 1.2921 |
| 198 | Pressure-Side | 0.6684 | 0.4019 | 1.2934 |
| 199 | Pressure-Side | 0.6720 | 0.4022 | 1.2948 |
| 200 | Pressure-Side | 0.6754 | 0.4012 | 1.2962 |

Figure 7:
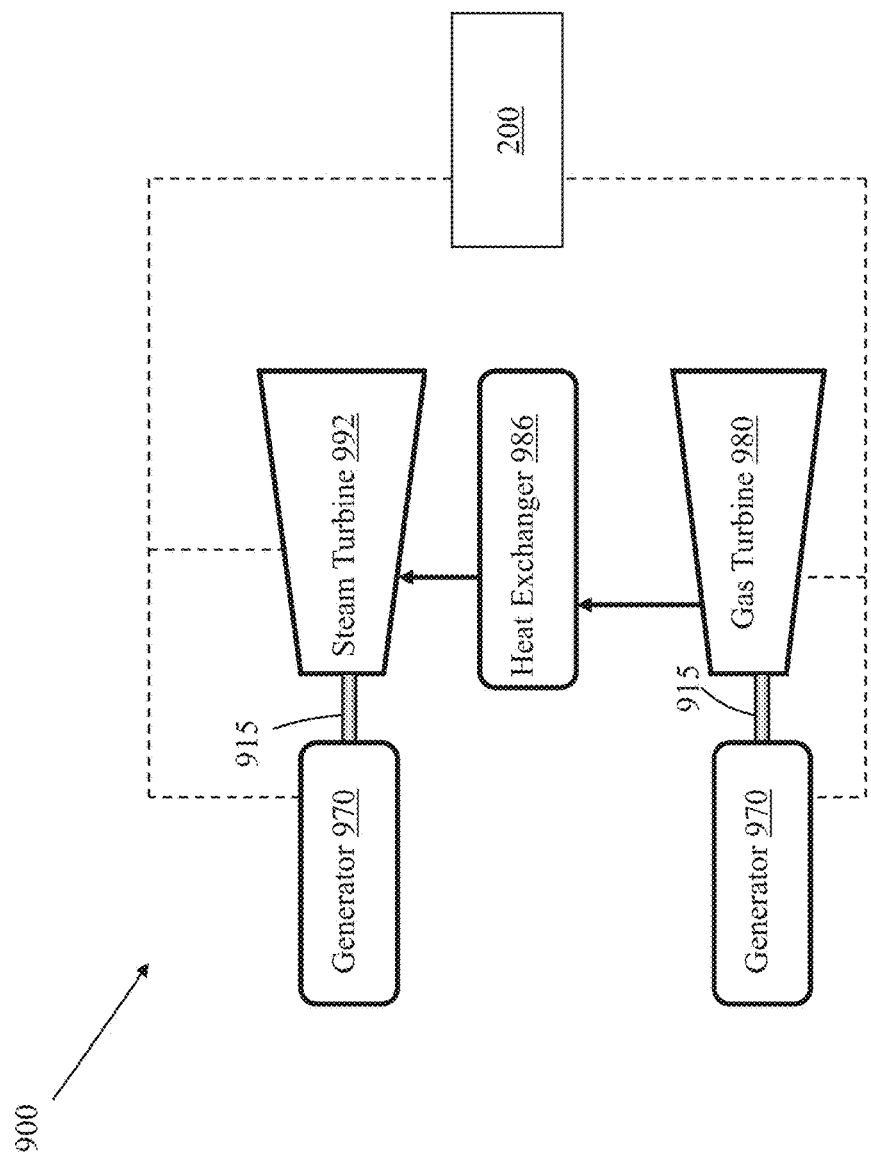
FIG. 7 shows a schematic block diagram illustrating portions of a multi-shaft combined cycle power plant system according to embodiments of the invention.
Figure 8:
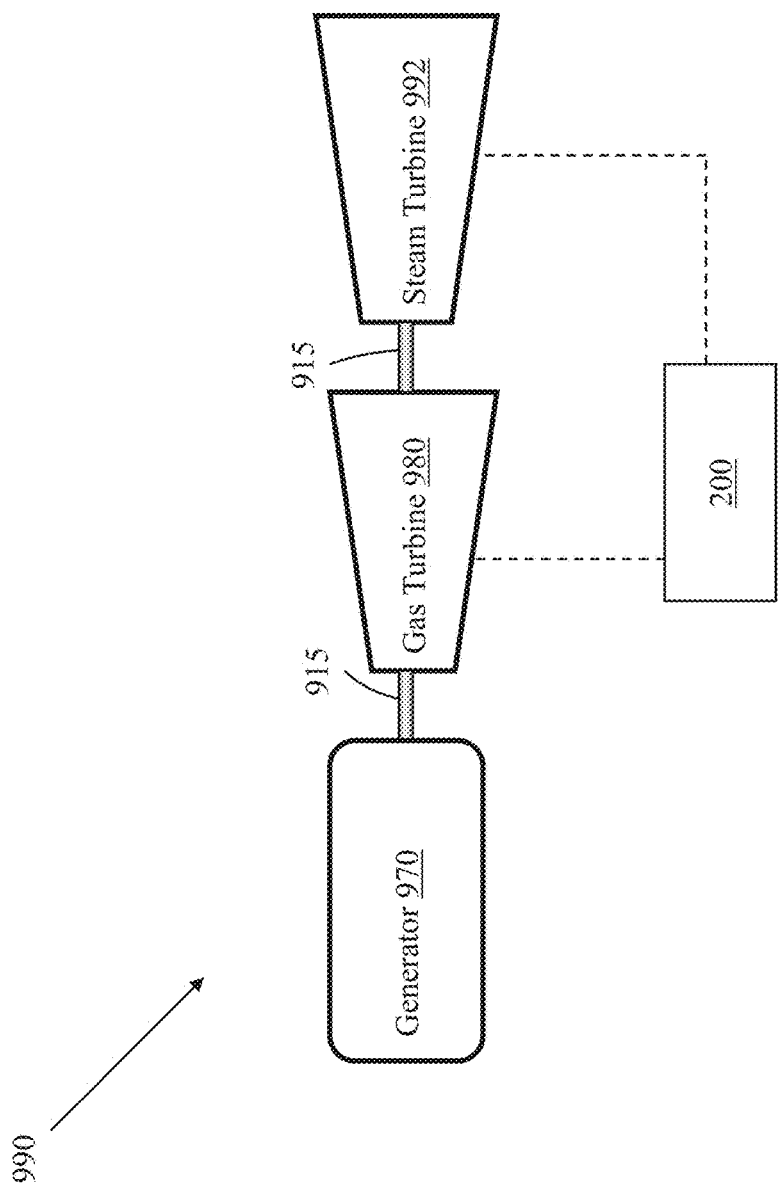
FIG. 8 shows a schematic block diagram illustrating portions of a single-shaft combined cycle power plant system according to embodiments of the invention.

Turning to FIG. 7, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 7 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more nozzles 200 as shown and described with reference to FIG. 2 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 8, a single shaft combined cycle power plant 990 may include a single generator 970 coupled to both gas turbine 980 and steam turbine 992 via a single shaft 915. Steam turbine 992 and/or gas turbine 980 may include one or more nozzles 200 shown and described with reference to FIG. 2 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbine nozzle comprising:
   an airfoil having: a suction side; a pressure side opposing the suction side; a leading edge spanning between the pressure side and the suction side; and a trailing edge opposing the leading edge and spanning between the pressure side and the suction side; and
   at least one endwall connected with the airfoil along the suction side, pressure side, trailing edge and the leading edge, the airfoil having an enhanced fillet at the trailing edge proximate the at least one endwall,
   wherein at least one of the suction side or the pressure side of the airfoil includes a nominal profile substantially in accordance with Cartesian coordinate values of X, Y and Z set forth in TABLE I, wherein the coordinate values are non-dimensional values convertible to distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

2. The turbine nozzle of claim 1, wherein the at least one endwall includes two endwalls, the turbine nozzle further comprising a second enhanced fillet at the trailing edge proximate the second endwall connecting a surface of the second endwall to a surface of the airfoil.

3. The turbine nozzle of claim 1, wherein the turbine nozzle includes a third stage nozzle.

4. The turbine nozzle of claim 1, wherein the at least one endwall directs flow of a working fluid through a throat region proximate the pressure side of the airfoil.

5. The turbine nozzle of claim 1, wherein the at least one endwall includes an inner endwall or an outer endwall.

6. A static nozzle section comprising:
   a set of static nozzles, the set of static nozzles including at least one nozzle having:
     an airfoil having: a suction side; a pressure side opposing the suction side; a leading edge spanning between the pressure side and the suction side; and a trailing edge opposing the leading edge and spanning between the pressure side and the suction side; and
     at least one endwall connected with the airfoil along the suction side, pressure side, trailing edge and the leading edge, the airfoil having a fillet at the trailing edge proximate the at least one endwall,
     wherein at least one of the suction side or the pressure side of the airfoil includes a nominal profile substantially in accordance with Cartesian coordinate values of X, Y and Z set forth in TABLE I, wherein the coordinate values are non-dimensional values convertible to distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

7. The static nozzle section of claim 6, wherein the at least one endwall includes two endwalls, the turbine nozzle further comprising second fillet at the trailing edge proximate the second endwall connecting a surface of the second endwall to a surface of the airfoil.

8. The static nozzle section of claim 6, wherein the turbine nozzle includes a third stage nozzle.

9. The static nozzle section of claim 6, wherein the airfoil includes a pinbank for permitting fluid flow therethrough.

10. The static nozzle section of claim 6, wherein the at least one endwall directs flow of a working fluid through a throat region proximate the pressure side of the airfoil and a suction side of an adjacent airfoil in the set of static nozzles.

11. A turbine nozzle comprising:
    an airfoil having: a suction side; a pressure side opposing the suction side; a leading edge spanning between the pressure side and the suction side; and a trailing edge opposing the leading edge and spanning between the pressure side and the suction side; and
    at least one endwall connected with the airfoil along the suction side, pressure side, trailing edge and the leading edge, wherein at least one of the pressure side or the suction side of the airfoil includes a nominal profile substantially in accordance with Cartesian coordinate values of X, Y and Z set forth in TABLE I, wherein the coordinate values are non-dimensional values convertible to distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

12. The turbine nozzle of claim 11, the airfoil having a fillet at the trailing edge proximate the at least one endwall.

13. The turbine nozzle of claim 12, wherein the airfoil includes a pinbank for permitting fluid flow therethrough.

* * * * *